US012745009B2

(12) United States Patent
Kurota et al.

(10) Patent No.: US 12,745,009 B2
(45) Date of Patent: Sep. 22, 2026

(54) IMAGE CAPTURING SYSTEM

(71) Applicant: CANON KABUSHIKI KAISHA, Tokyo (JP)

(72) Inventors: Masaru Kurota, Tokyo (JP); Fumihiko Kato, Kanagawa (JP); Masaharu Yamagishi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 18/821,258

(22) Filed: Aug. 30, 2024

(65) Prior Publication Data

US 2025/0088751 A1 Mar. 13, 2025

(30) Foreign Application Priority Data

Sep. 7, 2023 (JP) ................................ 2023-145577
Sep. 7, 2023 (JP) ................................ 2023-145578
May 15, 2024 (JP) ................................ 2024-079718

(51) Int. Cl.
*H04N 23/695* (2023.01)
*G06T 7/292* (2017.01)
(Continued)

(52) U.S. Cl.
CPC .......... *H04N 23/695* (2023.01); *G06T 7/292* (2017.01); *G06T 7/75* (2017.01); *H04N 23/61* (2023.01);
(Continued)

(58) Field of Classification Search
CPC . G06T 2207/20081; G06T 2207/20084; G06T 2207/30196; G06T 7/292;
(Continued)

(56) References Cited

U.S. PATENT DOCUMENTS

2022/0132023 A1* 4/2022 Kagaya .................. G06V 10/25
2022/0247919 A1* 8/2022 O'Leary ............. H04N 5/2628
(Continued)

FOREIGN PATENT DOCUMENTS

JP 2002290962 A 10/2002
JP 2003264822 A 9/2003
(Continued)

OTHER PUBLICATIONS

The above foreign patent document was cited in the Aug. 4, 2025 Japanese Office Action, a copy of which is enclosed without an English Translation, that issued in Japanese Patent Application No. 2024-079718.

*Primary Examiner* — Amy R Hsu
(74) *Attorney, Agent, or Firm* — Cowan, Liebowitz & Latman, P.C.

(57) ABSTRACT

A system which includes a first and second image capture apparatuses, and a first and second control apparatuses which control the second image capture apparatus to track a predetermined subject based on one of a first image of the first image capture apparatus and a second image of the second image capture apparatus. The first control apparatus decides the predetermined subject from subjects included in the first image, generates first feature information of a first region of the predetermined subject, and controls the second image capture apparatus to track the predetermined subject. The second control apparatus generates second feature information of a subject included in the second image, decides the predetermined subject based on the first feature information and the second feature information obtained from the first control apparatus, and controls the second image capture apparatus to track the predetermined subject.

18 Claims, 33 Drawing Sheets

(51) Int. Cl.
*G06T 7/73* (2017.01)
*H04N 23/61* (2023.01)
*H04N 23/611* (2023.01)
*H04N 23/90* (2023.01)

(52) U.S. Cl.
CPC ........... *H04N 23/611* (2023.01); *H04N 23/90* (2023.01); *G06T 2207/30196* (2013.01)

(58) Field of Classification Search
CPC ........ G06T 7/75; H04N 23/61; H04N 23/611; H04N 23/695; H04N 23/90
See application file for complete search history.

(56) References Cited

U.S. PATENT DOCUMENTS

2023/0012806 A1* 1/2023 Shin .......................... G06T 7/62
2023/0097348 A1* 3/2023 Hirvonen ................ G06F 21/32 348/78
2023/0113499 A1* 4/2023 Lee ........................... G06T 7/70 348/78

FOREIGN PATENT DOCUMENTS

JP 3814779 B2 8/2006
JP 2015061239 A 3/2015
JP 2015142181 A 8/2015

* cited by examiner

FIG. 1
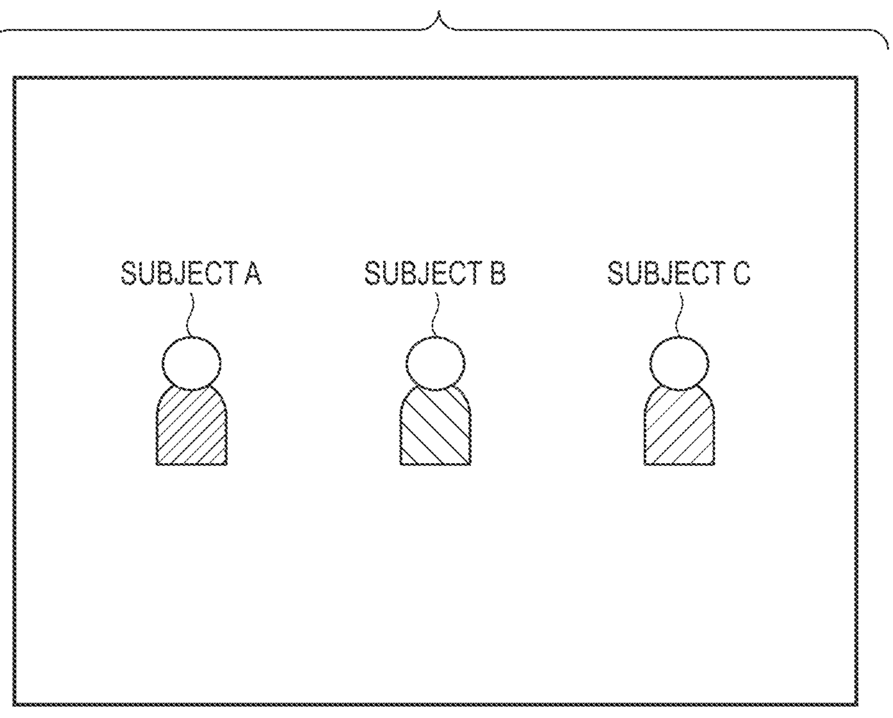
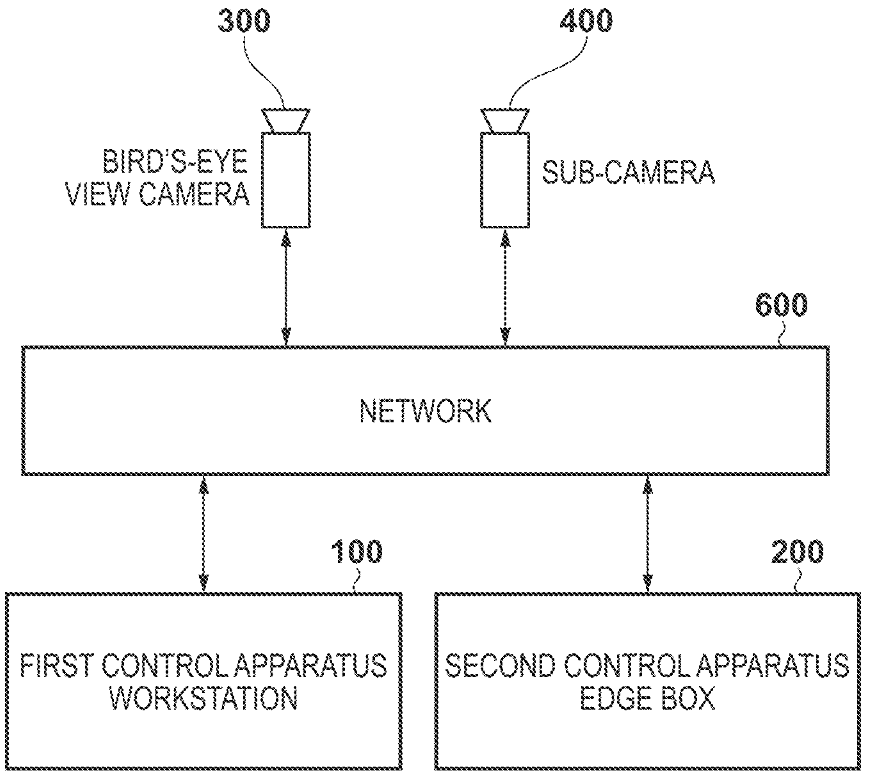

F I G. 2A
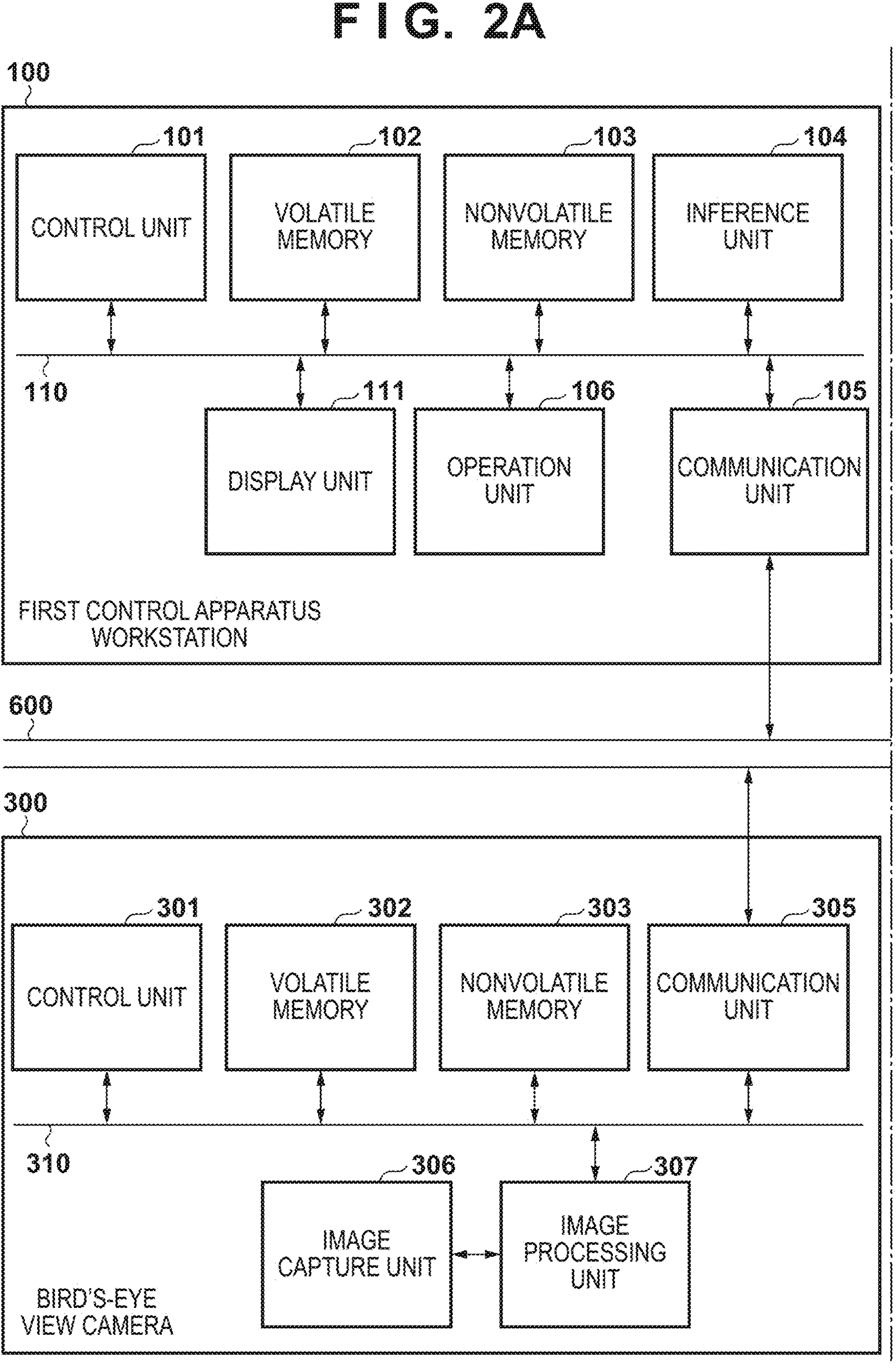

F I G. 2B
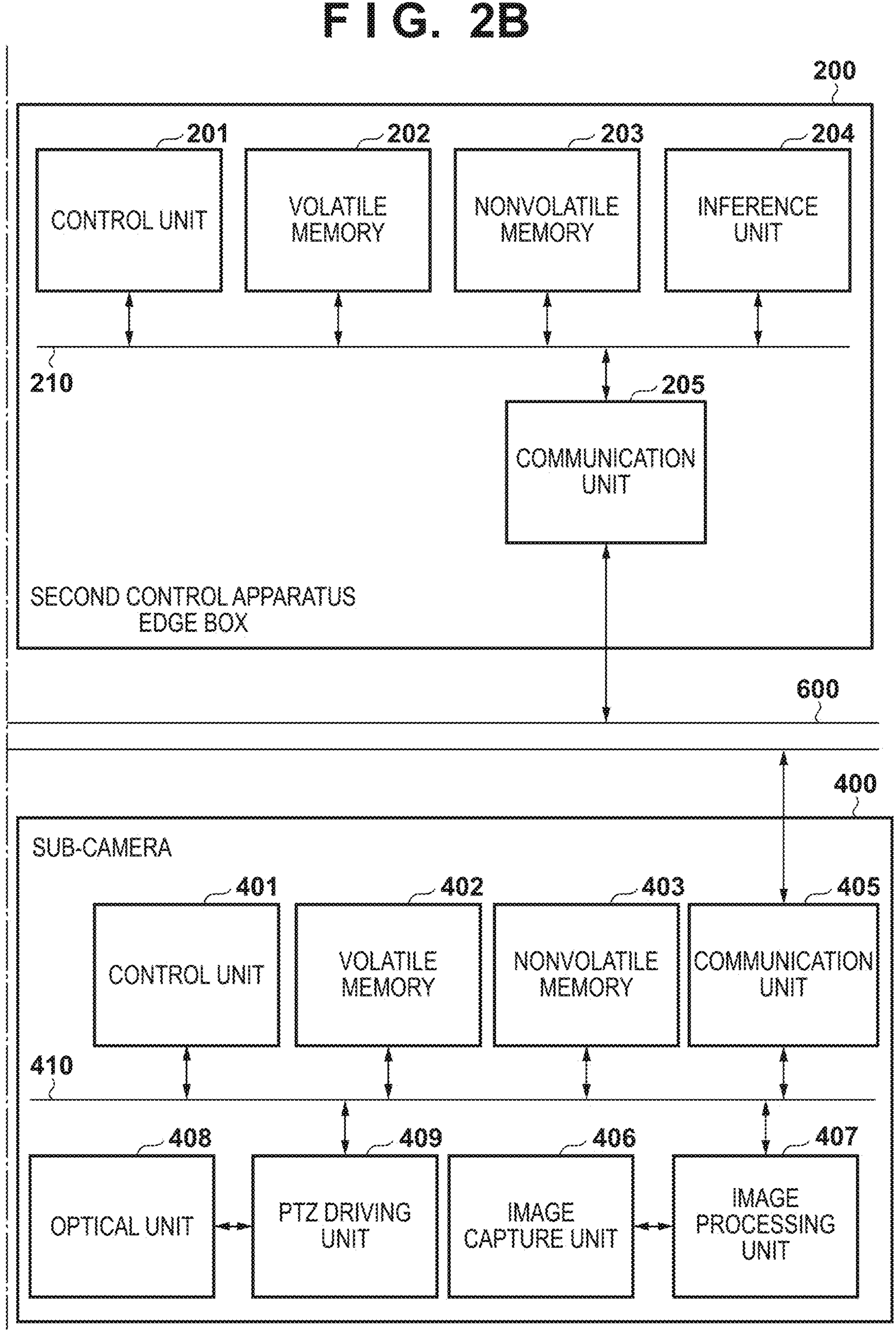

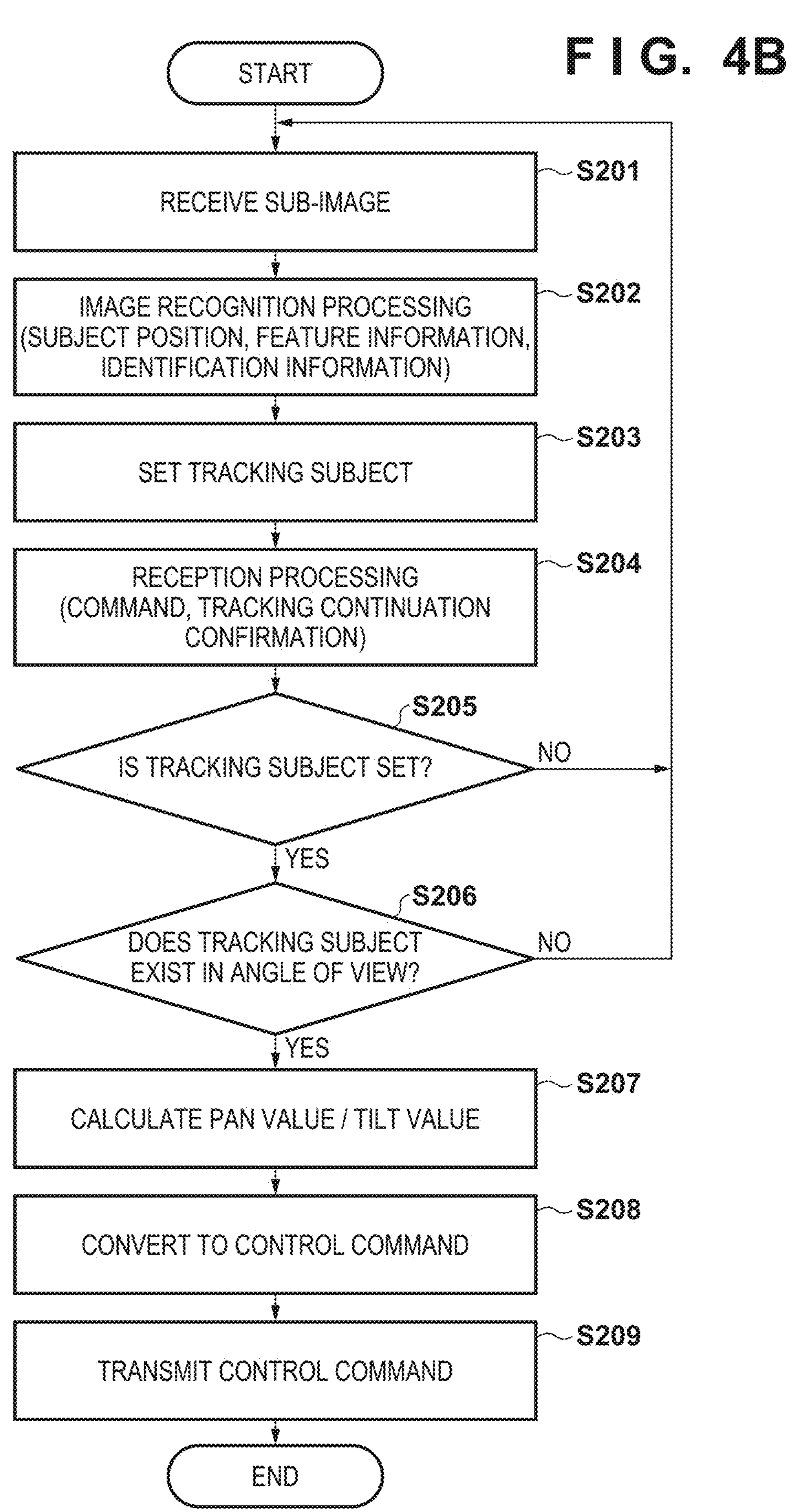
F I G. 4B
START
RECEIVE SUB-IMAGE
S201
IMAGE RECOGNITION PROCESSING (SUBJECT POSITION, FEATURE INFORMATION, IDENTIFICATION INFORMATION)
S202
SET TRACKING SUBJECT
S203
RECEPTION PROCESSING (COMMAND, TRACKING CONTINUATION CONFIRMATION)
S204
IS TRACKING SUBJECT SET?
S205
NO
YES
DOES TRACKING SUBJECT EXIST IN ANGLE OF VIEW?
S206
NO
YES
CALCULATE PAN VALUE / TILT VALUE
S207
CONVERT TO CONTROL COMMAND
S208
TRANSMIT CONTROL COMMAND
S209
END

FIG. 4C

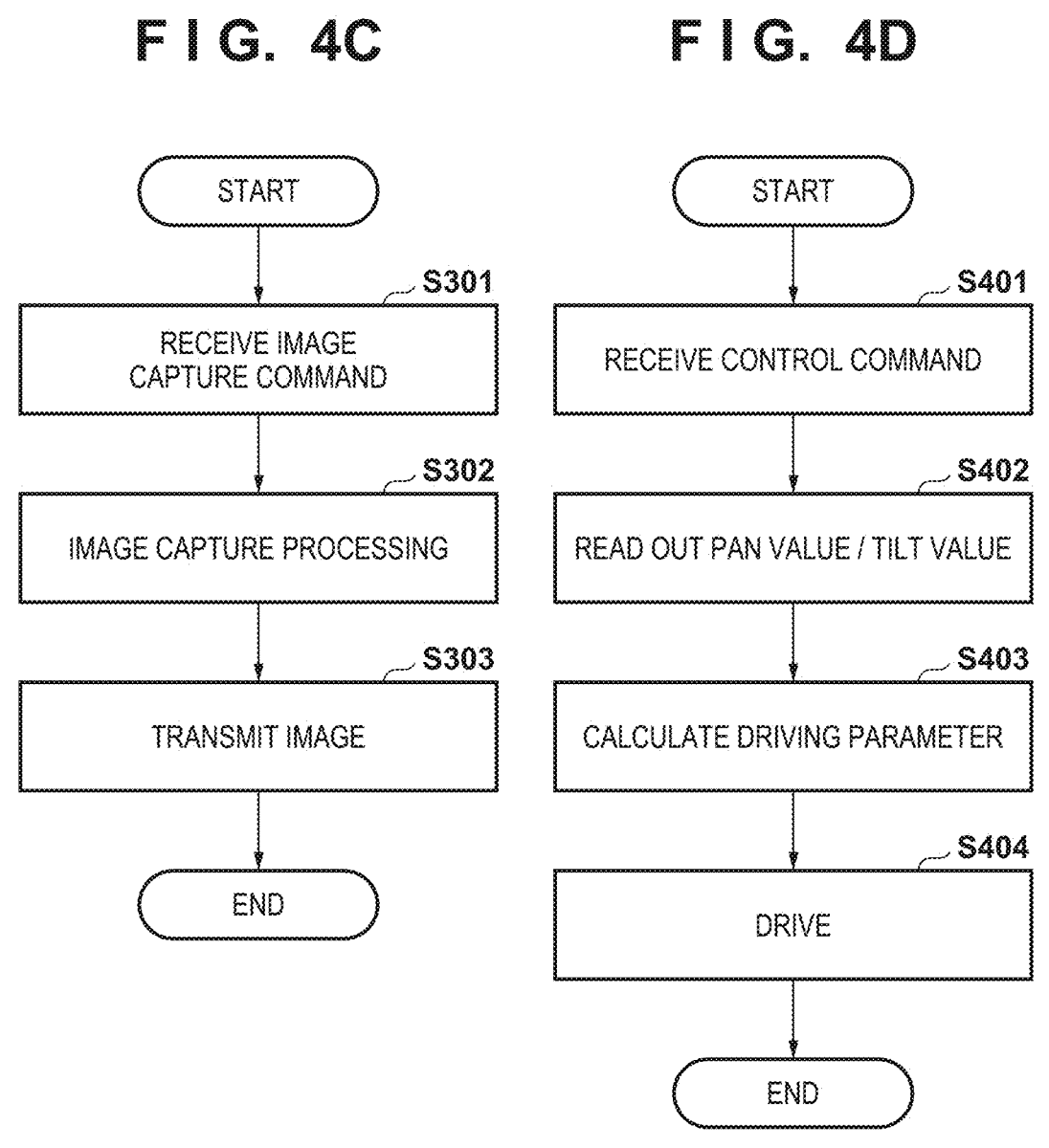

START
S301 RECEIVE IMAGE CAPTURE COMMAND
S302 IMAGE CAPTURE PROCESSING
S303 TRANSMIT IMAGE
END

FIG. 4D

START
S401 RECEIVE CONTROL COMMAND
S402 READ OUT PAN VALUE / TILT VALUE
S403 CALCULATE DRIVING PARAMETER
S404 DRIVE
END

BIRD'S-EYE VIEW IMAGE

COORDINATE TRANSFORMATION ON BIRD'S EYE VIEW IMAGE

BIRD'S-EYE VIEW IMAGE

COORDINATE TRANSFORMATION ON BIRD'S EYE VIEW IMAGE

FIG. 7
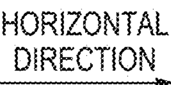
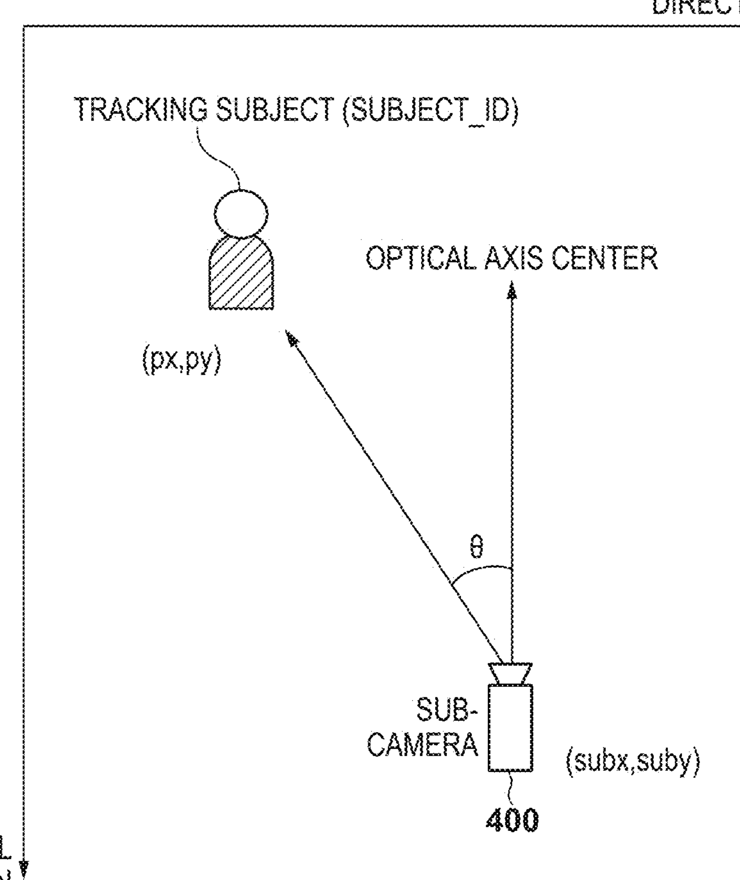
FIG. 8
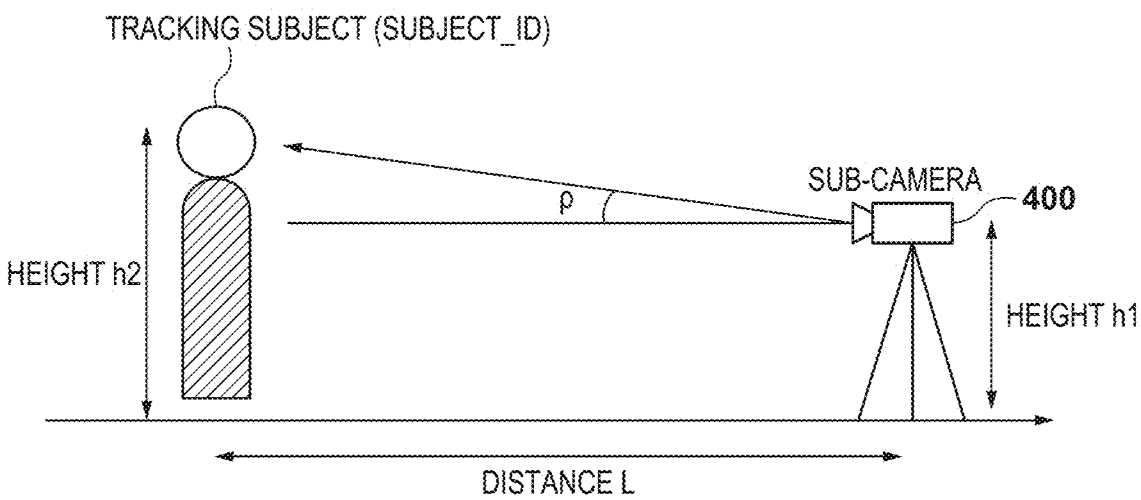

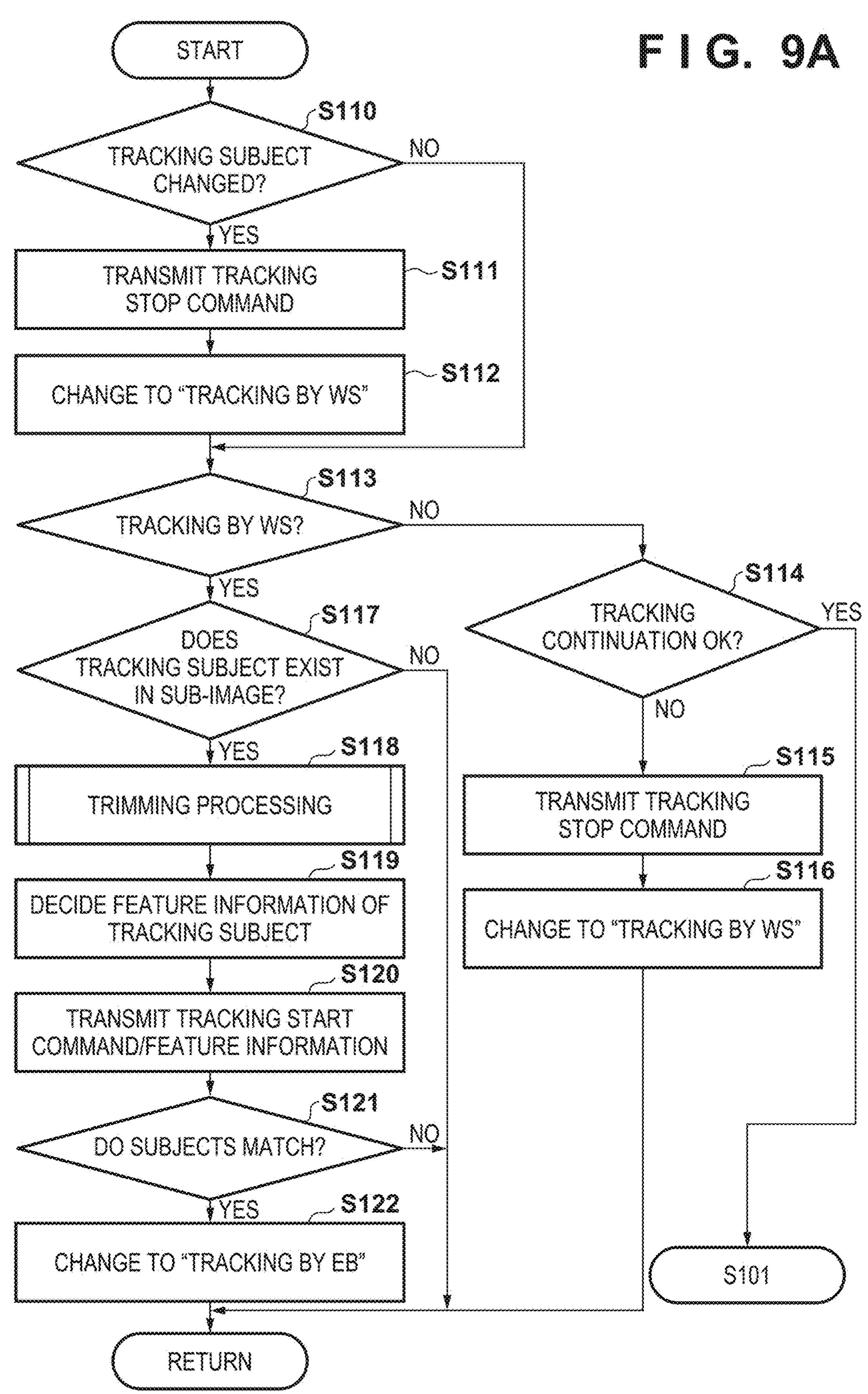

FIG. 9A
START
S110
TRACKING SUBJECT CHANGED?
NO
YES
TRANSMIT TRACKING STOP COMMAND
S111
CHANGE TO "TRACKING BY WS"
S112
S113
TRACKING BY WS?
NO
YES
S114
TRACKING CONTINUATION OK?
YES
NO
S117
DOES TRACKING SUBJECT EXIST IN SUB-IMAGE?
NO
YES
S118
TRIMMING PROCESSING
S115
TRANSMIT TRACKING STOP COMMAND
S119
DECIDE FEATURE INFORMATION OF TRACKING SUBJECT
S116
CHANGE TO "TRACKING BY WS"
S120
TRANSMIT TRACKING START COMMAND/FEATURE INFORMATION
S121
DO SUBJECTS MATCH?
NO
YES
S122
CHANGE TO "TRACKING BY EB"
S101
RETURN

START
S220
RECEIVE TRACKING STOP COMMAND?
YES
NO
S223
RECEIVE TRACKING CONTINUATION CONFIRMATION REQUEST?
NO
YES
S224
DOES TRACKING SUBJECT EXIST IN ANGLE OF VIEW?
NO
YES
S226
TRANSMIT TRACKING CONTINUATION OK
RETURN
S221
TRANSMIT PAN / TILT STOP COMMAND
S225
TRANSMIT TRACKING CONTINUATION NG
S222
DELETE TRACKING SUBJECT SETTING
S201
S201

| DETECTED SUBJECT OF SUB-IMAGE | SIMILARITY | COLLATION RESULT |
|---|---|---|
| SUBJECT A | 0.3 | NON-MATCHING |
| SUBJECT B | 0.4 | NON-MATCHING |

| DETECTED SUBJECT OF SUB-IMAGE | SIMILARITY | COLLATION RESULT |
|---|---|---|
| SUBJECT B | 0.4 | NON-MATCHING |
| SUBJECT C | 0.8 | MATCHING |

FIG. 13A
| DEGREE r OF MATCHING TO BIRD'S-EYE VIEW IMAGE | TRIMMING AMOUNT |
|---|---|
| 1/2 ≤ m ≤ 1 | 0 |
| 1/3 ≤ m < 1/2 | 1/2 |
| m < 1/3 | 2/3 |
FIG. 13B
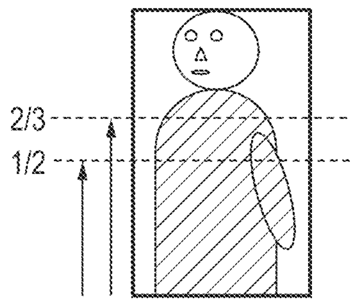
FIG. 13C
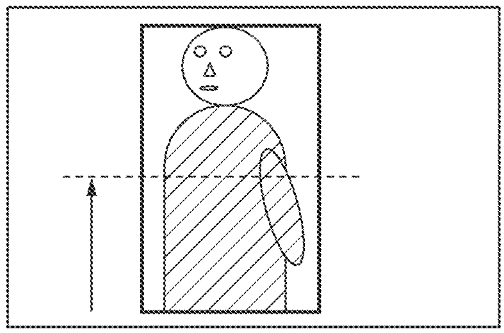
FIG. 13D
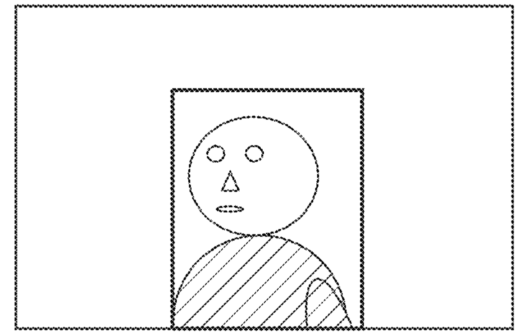
FIG. 13E
| TRIMMING AMOUNT | SIMILARITY | COLLATION RESULT |
|---|---|---|
| 0 | 0.4 | NON-MATCHING |
| 1/2 | 0.8 | MATCHING |
| 2/3 | 0.6 | NON-MATCHING |

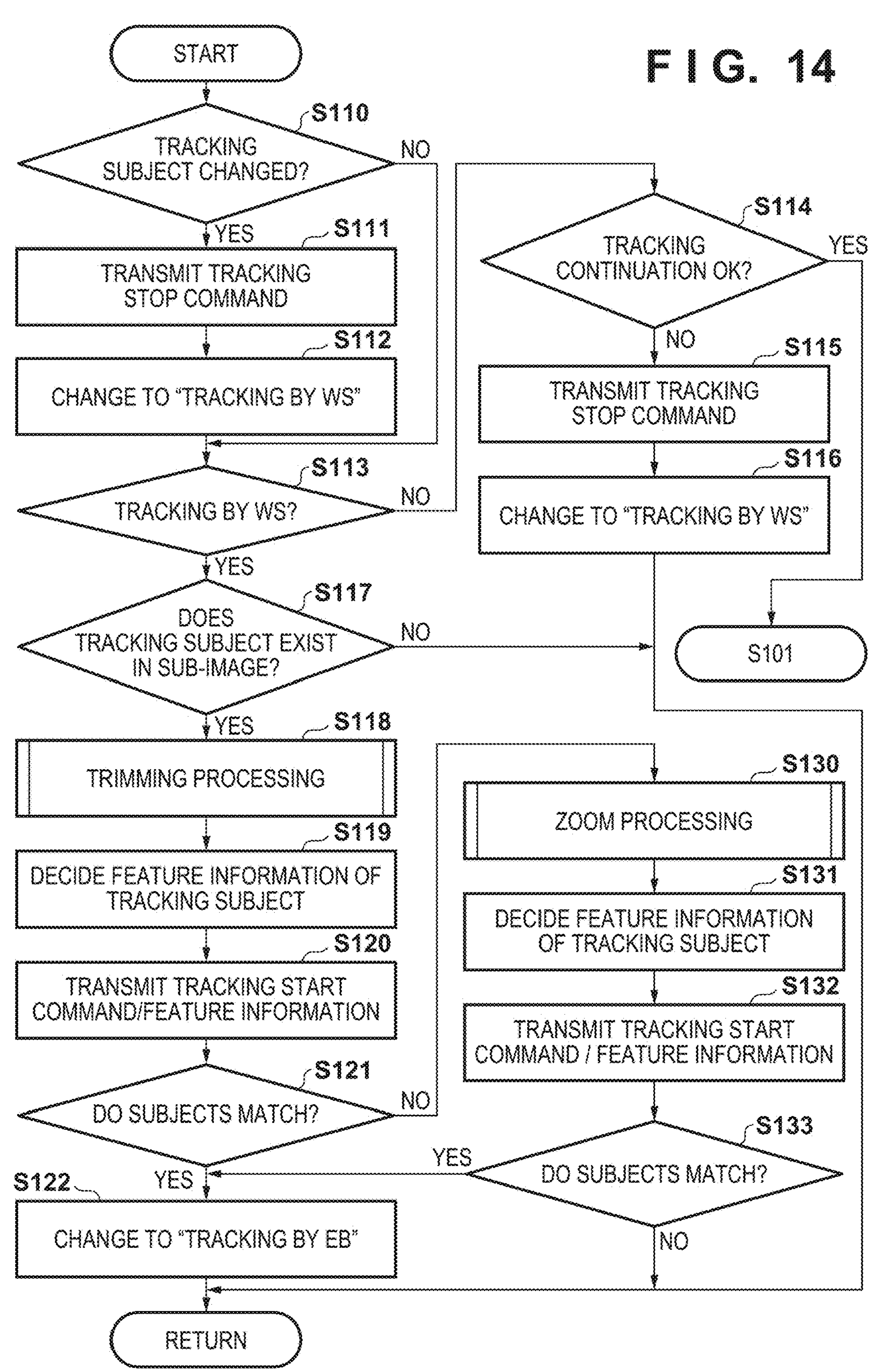

FIG. 14
START
S110
TRACKING SUBJECT CHANGED?
NO
YES
S111
TRANSMIT TRACKING STOP COMMAND
S112
CHANGE TO "TRACKING BY WS"
S113
TRACKING BY WS?
NO
YES
S114
TRACKING CONTINUATION OK?
YES
NO
S115
TRANSMIT TRACKING STOP COMMAND
S116
CHANGE TO "TRACKING BY WS"
S117
DOES TRACKING SUBJECT EXIST IN SUB-IMAGE?
NO
YES
S101
S118
TRIMMING PROCESSING
S119
DECIDE FEATURE INFORMATION OF TRACKING SUBJECT
S120
TRANSMIT TRACKING START COMMAND/FEATURE INFORMATION
S121
DO SUBJECTS MATCH?
NO
YES
S130
ZOOM PROCESSING
S131
DECIDE FEATURE INFORMATION OF TRACKING SUBJECT
S132
TRANSMIT TRACKING START COMMAND / FEATURE INFORMATION
S133
DO SUBJECTS MATCH?
YES
NO
S122
CHANGE TO "TRACKING BY EB"
RETURN

F I G. 15
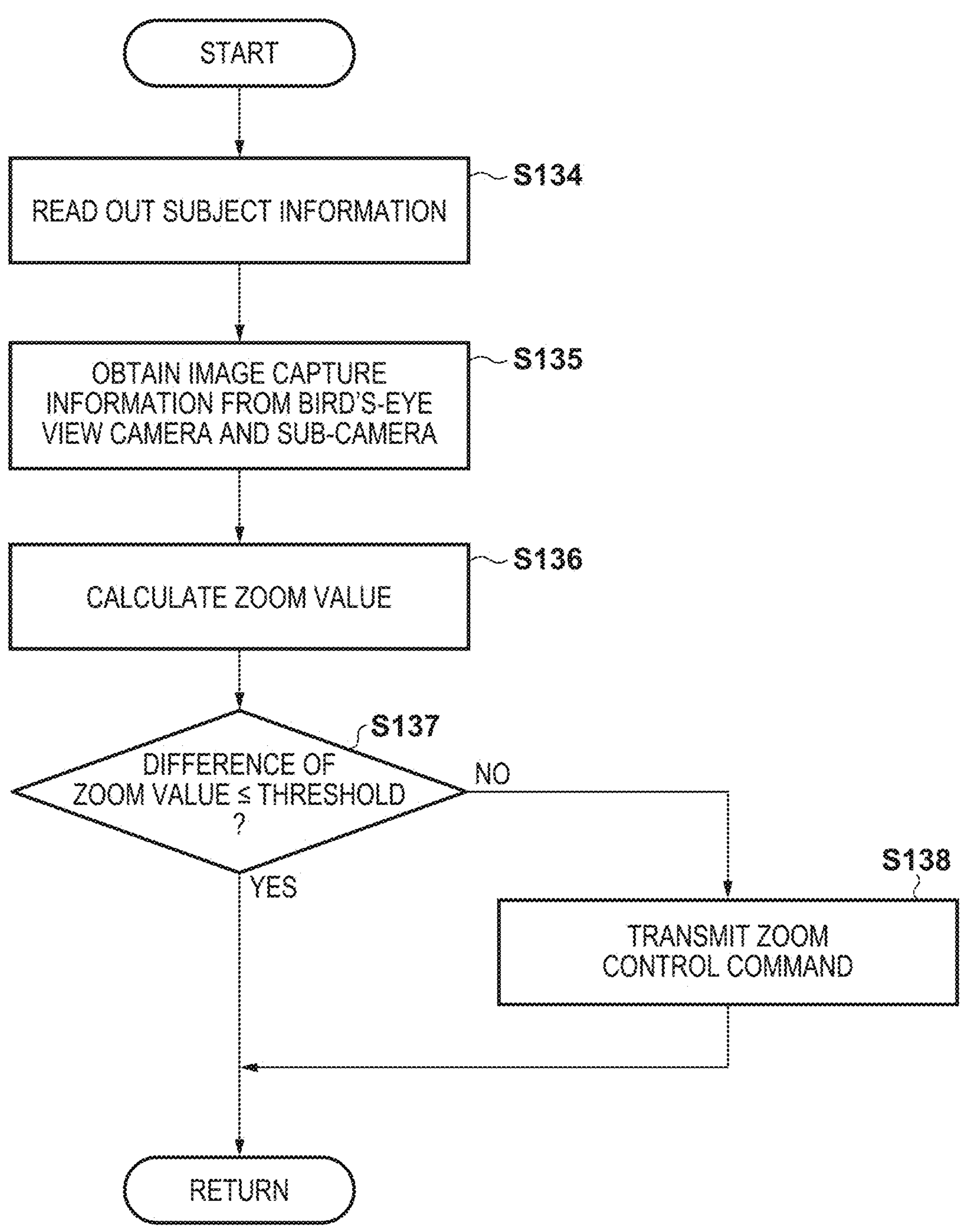

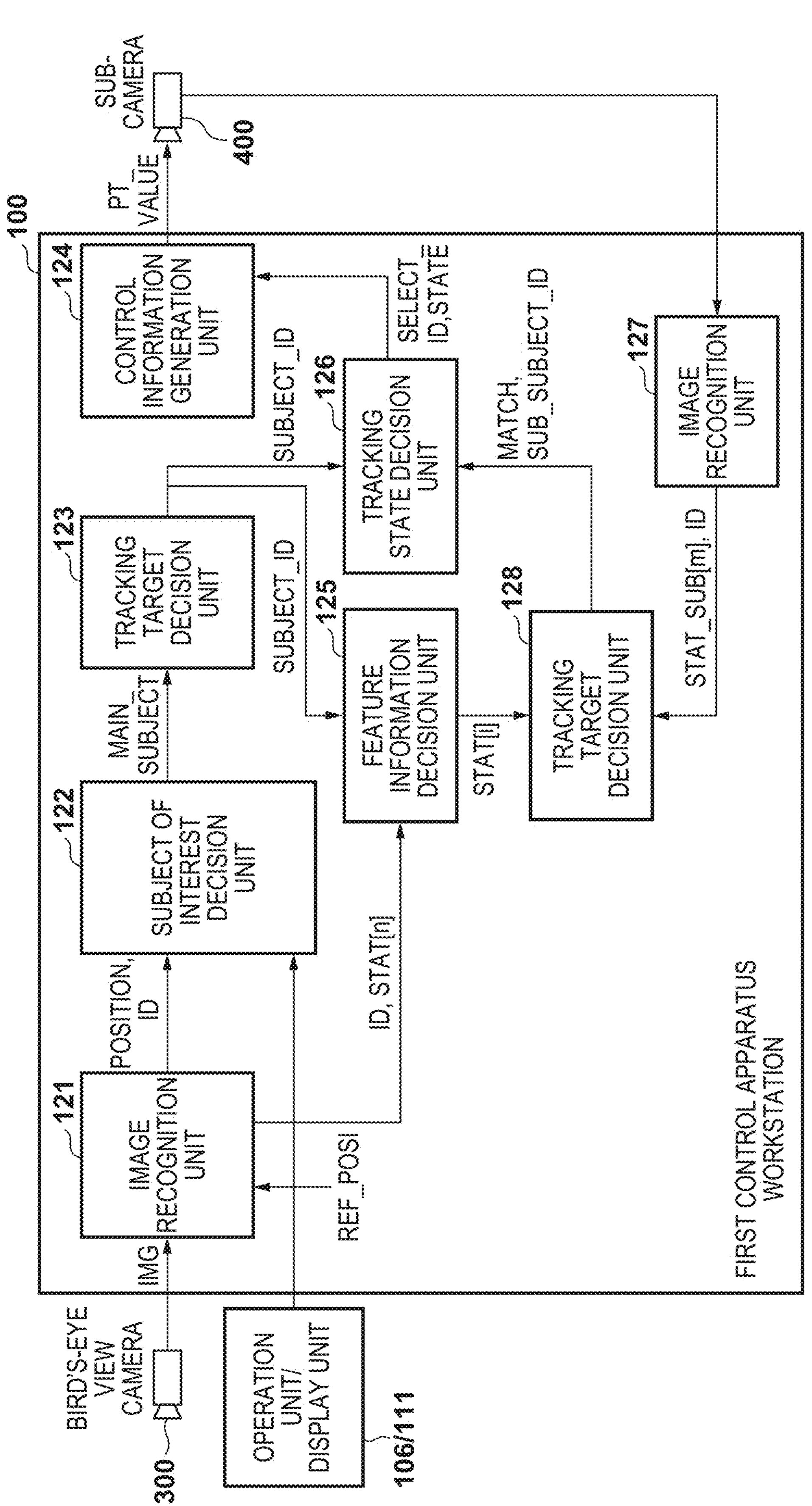

FIG. 16
100
FIRST CONTROL APPARATUS WORKSTATION
300
BIRD'S-EYE VIEW CAMERA
IMG
106/111
OPERATION UNIT/ DISPLAY UNIT
121
IMAGE RECOGNITION UNIT
REF_POSI
POSITION, ID
ID, STAT[n]
122
SUBJECT OF INTEREST DECISION UNIT
MAIN_SUBJECT
123
TRACKING TARGET DECISION UNIT
SUBJECT_ID
SUBJECT_ID
124
CONTROL INFORMATION GENERATION UNIT
PT_VALUE
400
SUB-CAMERA
125
FEATURE INFORMATION DECISION UNIT
STAT[i]
126
TRACKING STATE DECISION UNIT
SELECT_ID,STATE
MATCH, SUB_SUBJECT_ID
127
IMAGE RECOGNITION UNIT
STAT_SUB[m], ID
128
TRACKING TARGET DECISION UNIT

FIG. 17

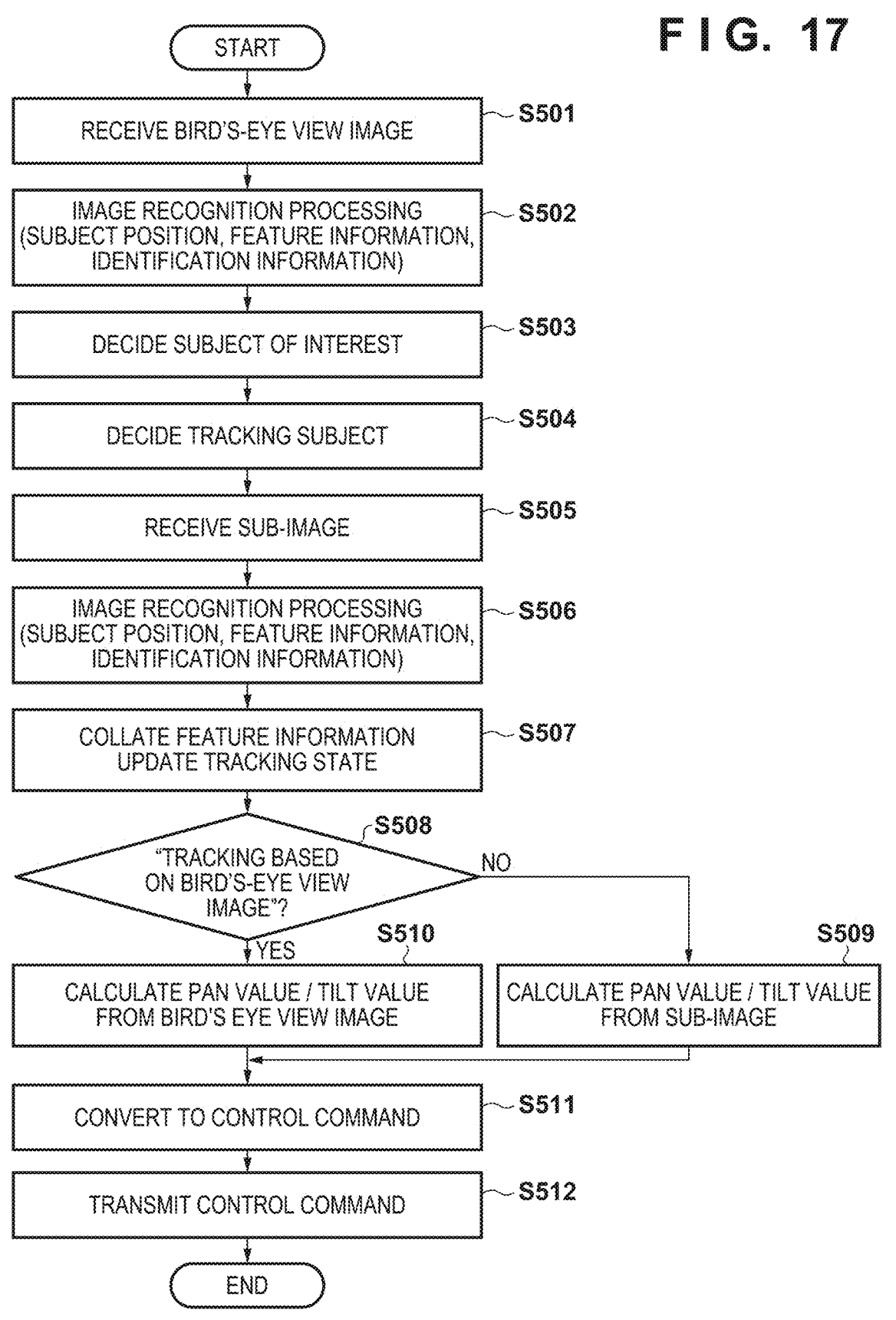

START

S501 RECEIVE BIRD'S-EYE VIEW IMAGE

S502 IMAGE RECOGNITION PROCESSING (SUBJECT POSITION, FEATURE INFORMATION, IDENTIFICATION INFORMATION)

S503 DECIDE SUBJECT OF INTEREST

S504 DECIDE TRACKING SUBJECT

S505 RECEIVE SUB-IMAGE

S506 IMAGE RECOGNITION PROCESSING (SUBJECT POSITION, FEATURE INFORMATION, IDENTIFICATION INFORMATION)

S507 COLLATE FEATURE INFORMATION UPDATE TRACKING STATE

S508 "TRACKING BASED ON BIRD'S-EYE VIEW IMAGE"?

YES → S510 CALCULATE PAN VALUE / TILT VALUE FROM BIRD'S EYE VIEW IMAGE

NO → S509 CALCULATE PAN VALUE / TILT VALUE FROM SUB-IMAGE

S511 CONVERT TO CONTROL COMMAND

S512 TRANSMIT CONTROL COMMAND

END

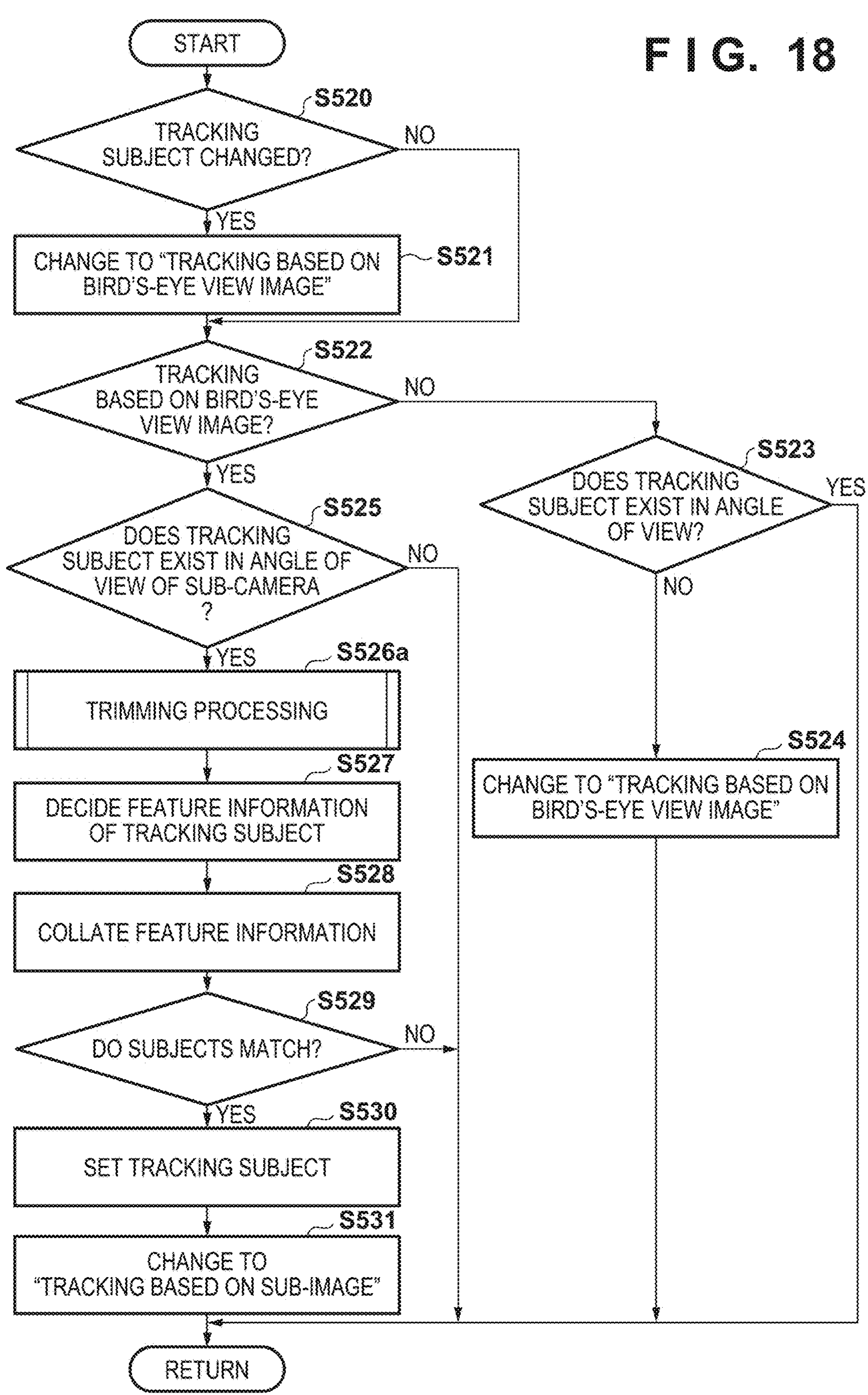
F I G. 18
START
S520
TRACKING SUBJECT CHANGED?
NO
YES
CHANGE TO "TRACKING BASED ON BIRD'S-EYE VIEW IMAGE"
S521
S522
TRACKING BASED ON BIRD'S-EYE VIEW IMAGE?
NO
YES
S523
DOES TRACKING SUBJECT EXIST IN ANGLE OF VIEW?
YES
NO
S525
DOES TRACKING SUBJECT EXIST IN ANGLE OF VIEW OF SUB-CAMERA ?
NO
YES
S526a
TRIMMING PROCESSING
S527
DECIDE FEATURE INFORMATION OF TRACKING SUBJECT
S528
COLLATE FEATURE INFORMATION
S529
DO SUBJECTS MATCH?
NO
YES
S530
SET TRACKING SUBJECT
S531
CHANGE TO "TRACKING BASED ON SUB-IMAGE"
S524
CHANGE TO "TRACKING BASED ON BIRD'S-EYE VIEW IMAGE"
RETURN

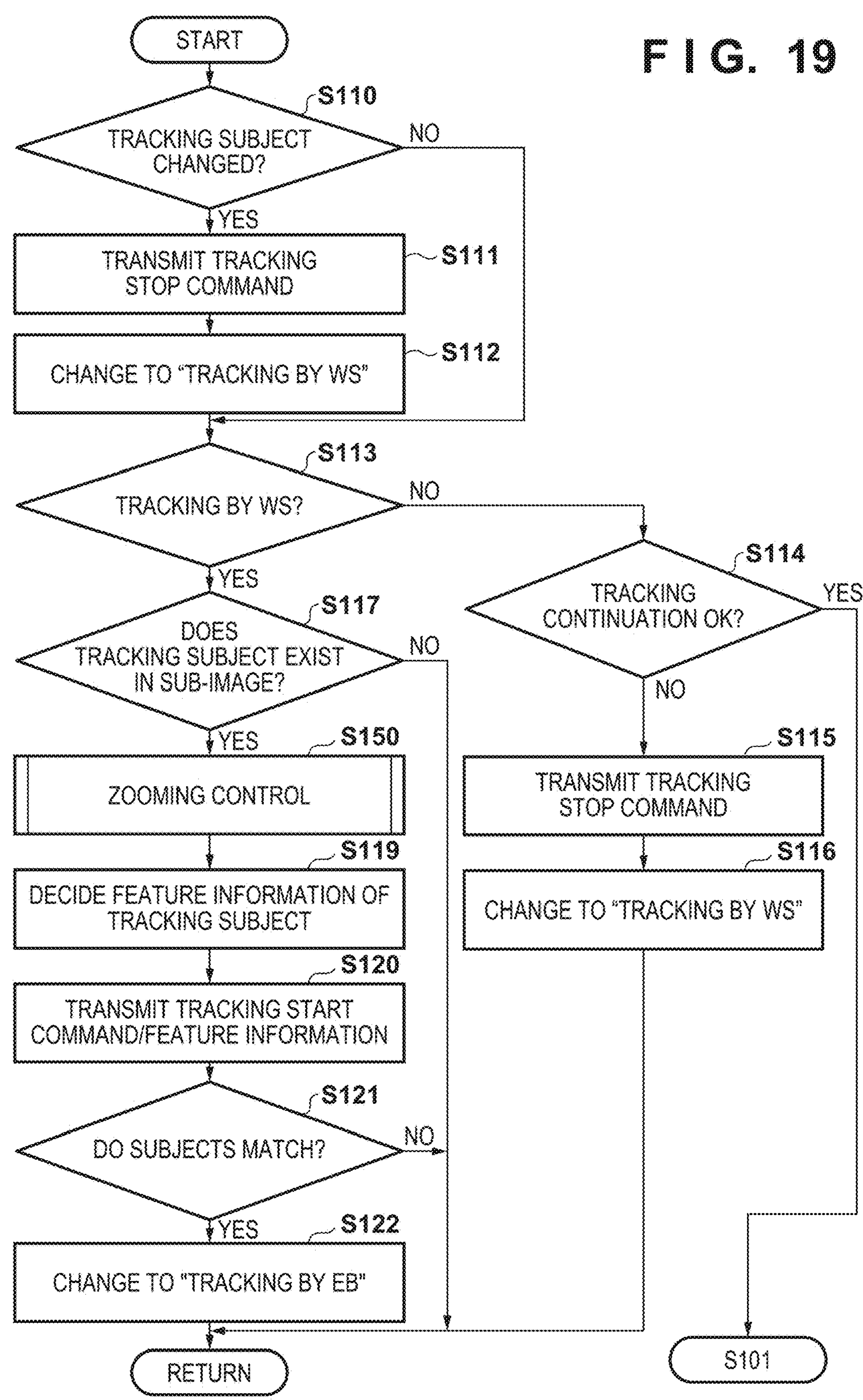
F I G. 19

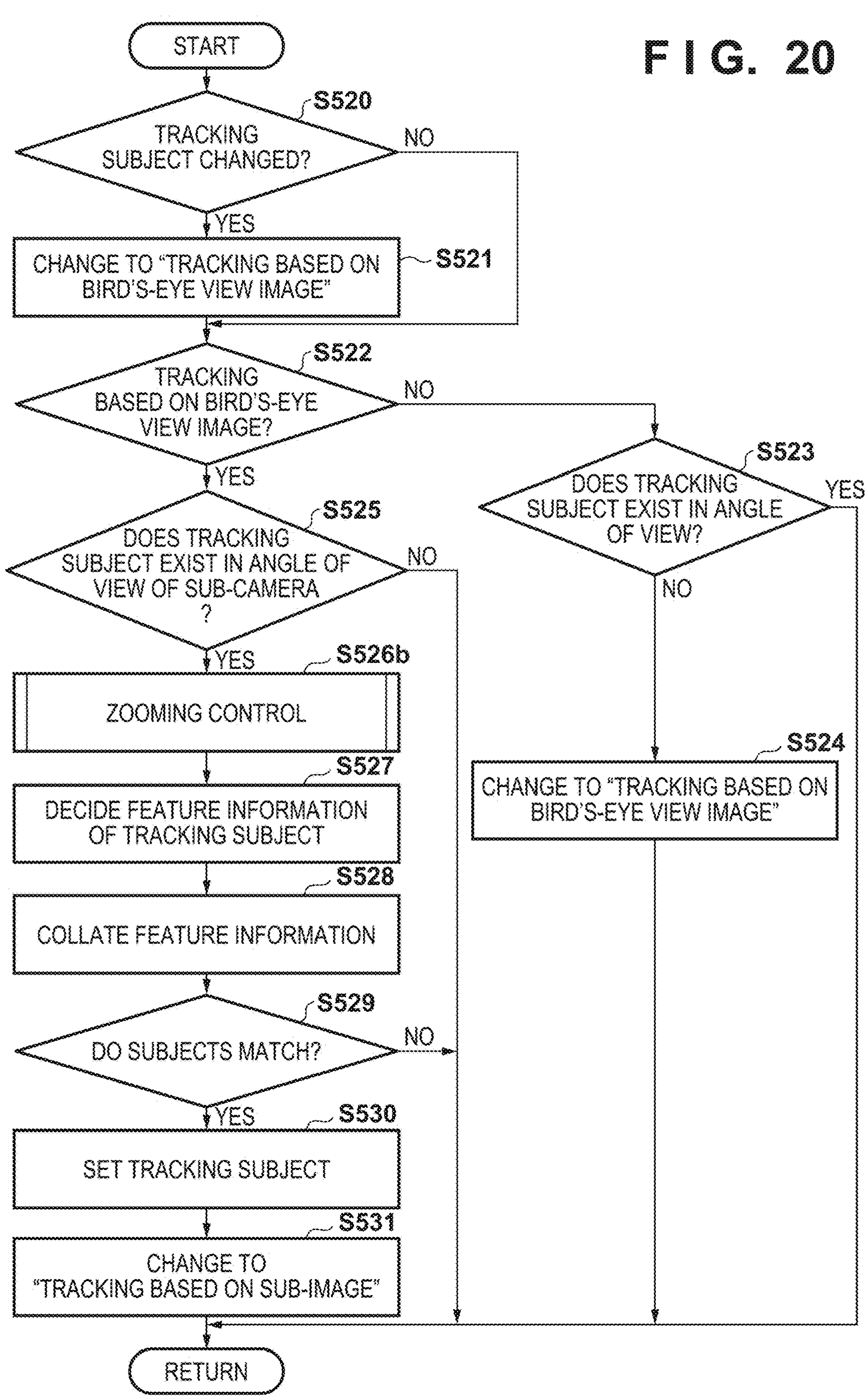

F I G. 20
START
S520
TRACKING SUBJECT CHANGED?
NO
YES
CHANGE TO "TRACKING BASED ON BIRD'S-EYE VIEW IMAGE"
S521
S522
TRACKING BASED ON BIRD'S-EYE VIEW IMAGE?
NO
YES
S523
DOES TRACKING SUBJECT EXIST IN ANGLE OF VIEW?
YES
NO
S525
DOES TRACKING SUBJECT EXIST IN ANGLE OF VIEW OF SUB-CAMERA ?
NO
YES
S526b
ZOOMING CONTROL
S527
DECIDE FEATURE INFORMATION OF TRACKING SUBJECT
S528
COLLATE FEATURE INFORMATION
S529
DO SUBJECTS MATCH?
NO
YES
S530
SET TRACKING SUBJECT
S531
CHANGE TO "TRACKING BASED ON SUB-IMAGE"
S524
CHANGE TO "TRACKING BASED ON BIRD'S-EYE VIEW IMAGE"
RETURN

| ROLE | ROLE OF SUB-CAMERA (CAMERA_ROLE) | |
|---|---|---|
| | TRACKING SUBJECT | ZOOM |
| MAIN FOLLOW | SAME TO MAIN CAMERA | SAME PHASE AS MAIN CAMERA |
| MAIN COUNTER | SAME TO MAIN CAMERA | OPPOSITE PHASE TO MAIN CAMERA |
| ASSIST FOLLOW | DIFFERENT TO MAIN CAMERA (LEFT SIDE) | SAME PHASE AS MAIN CAMERA |
| ASSIST COUNTER | DIFFERENT TO MAIN CAMERA (LEFT SIDE) | OPPOSITE PHASE TO MAIN CAMERA |

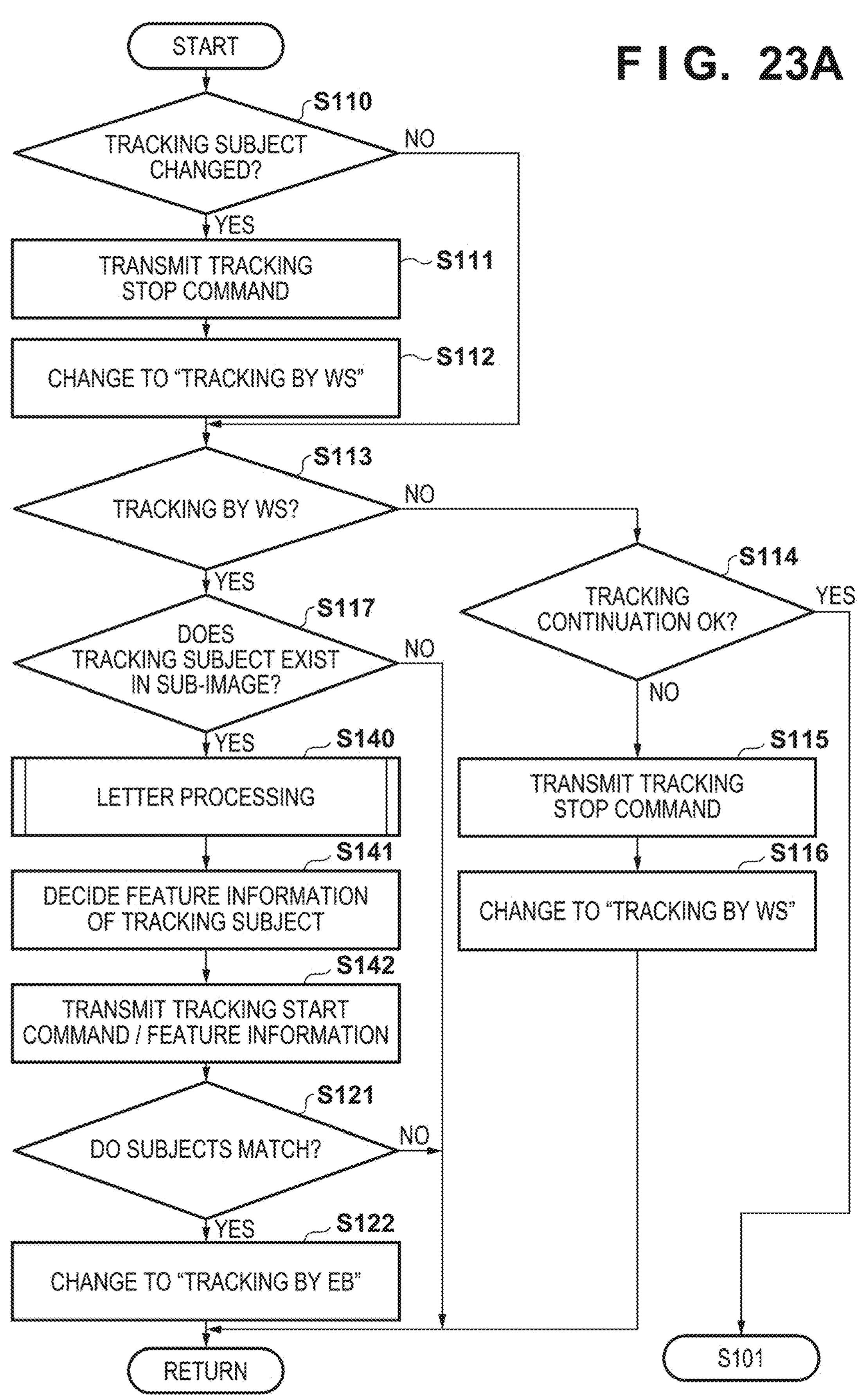
F I G. 23A

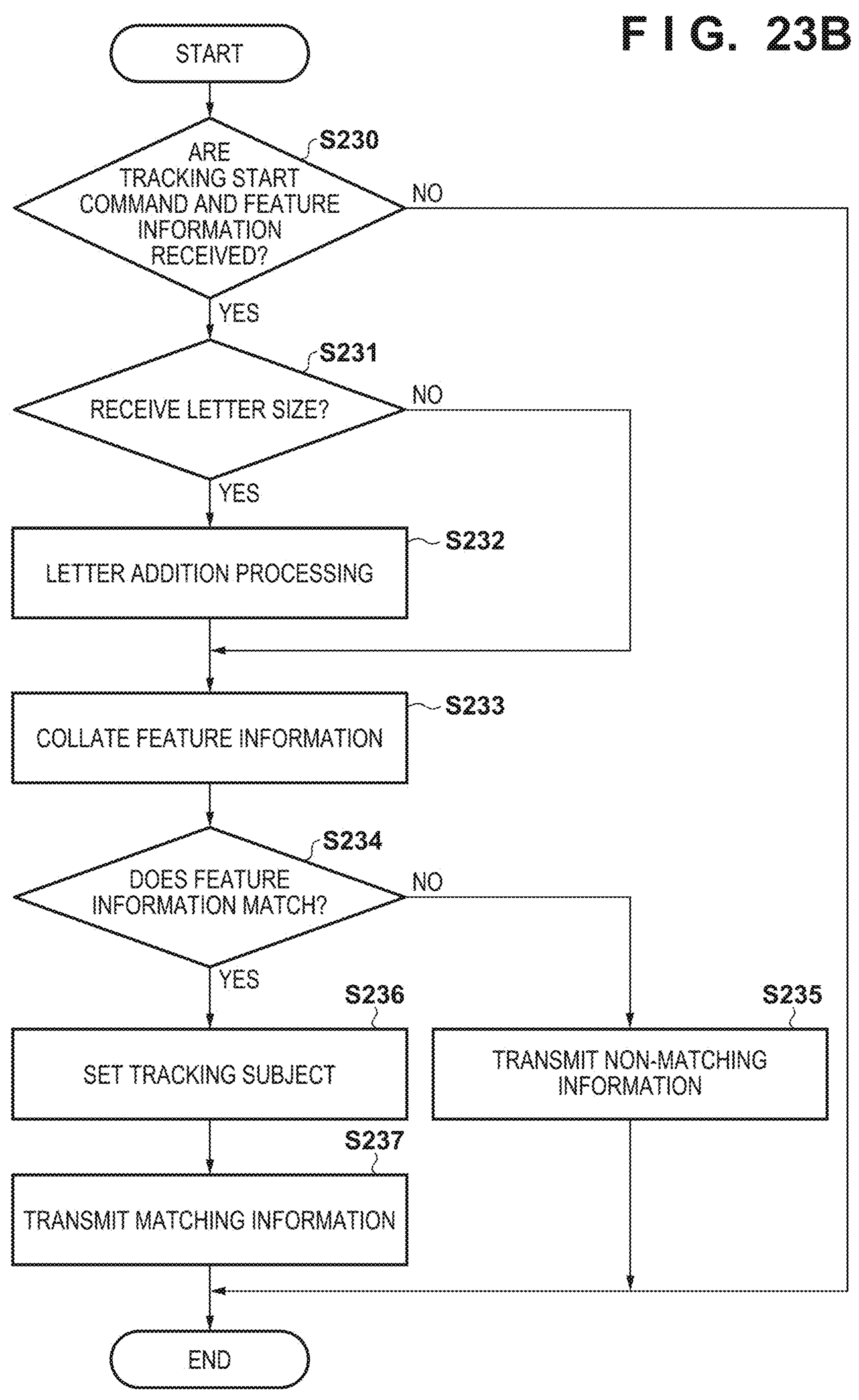
F I G. 23B
START
S230
ARE TRACKING START COMMAND AND FEATURE INFORMATION RECEIVED?
NO
YES
S231
RECEIVE LETTER SIZE?
NO
YES
S232
LETTER ADDITION PROCESSING
S233
COLLATE FEATURE INFORMATION
S234
DOES FEATURE INFORMATION MATCH?
NO
YES
S236
SET TRACKING SUBJECT
S235
TRANSMIT NON-MATCHING INFORMATION
S237
TRANSMIT MATCHING INFORMATION
END FIG. 24
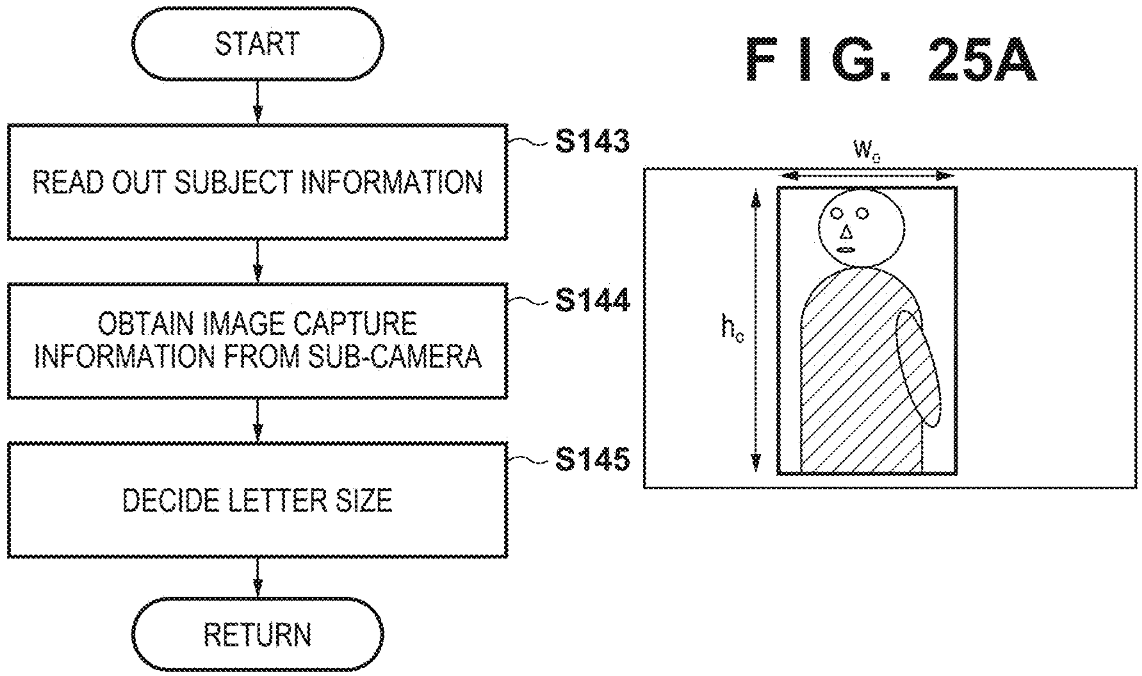
FIG. 25A
FIG. 25B
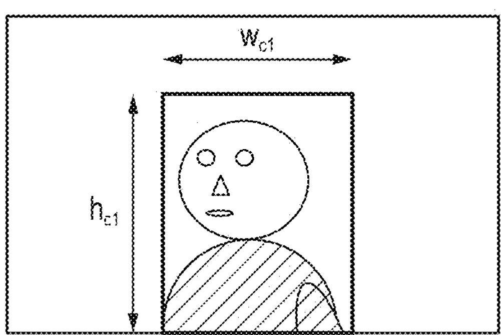
FIG. 25C
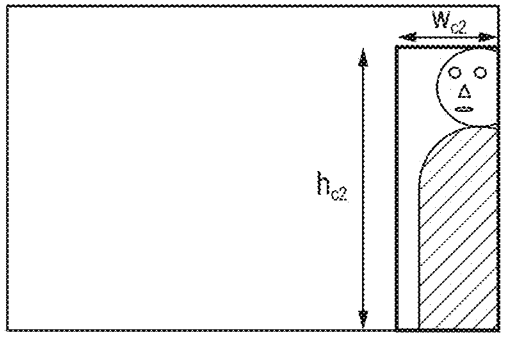
FIG. 25D
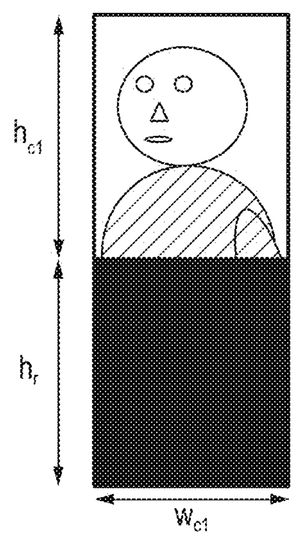
FIG. 25E
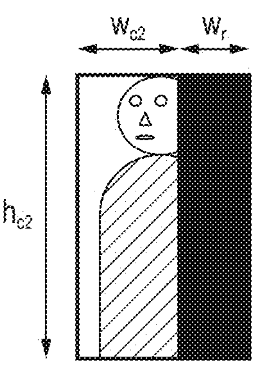

FIG. 26A FIG. 26B

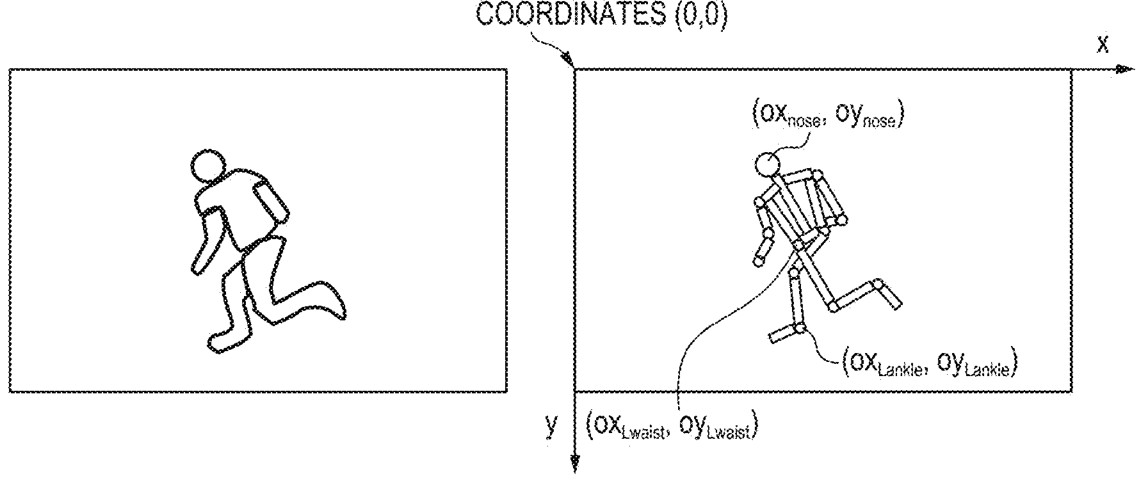

FIG. 26C

| | |
|---|---|
| NOSE | [$ox_{nose}$, $oy_{nose}$, $os_{nose}$] |
| LEFT SHOULDER | [$ox_{Lsholder}$, $oy_{Lsholder}$, $os_{Lsholder}$] |
| RIGHT SHOULDER | [$ox_{Rsholder}$, $oy_{Rsholder}$, $os_{Rsholder}$] |
| LEFT ELBOW | [$ox_{Lelbow}$, $oy_{Lelbow}$, $os_{Lelbow}$] |
| RIGHT ELBOW | [$ox_{Relbow}$, $oy_{Relbow}$, $os_{Relbow}$] |
| LEFT WRIST | [$ox_{Lwrist}$, $oy_{Lwrist}$, $os_{Lwrist}$] |
| RIGHT WRIST | [$ox_{Rwrist}$, $oy_{Rwrist}$, $os_{Rwrist}$] |
| LEFT WAIST | [$ox_{Lwaist}$, $oy_{Lwaist}$, $os_{Lwaist}$] |
| RIGHT WAIST | [$ox_{Rwaist}$, $oy_{Rwaist}$, $os_{Rwaist}$] |
| ... | ... |
| LEFT ANKLE | [$ox_{Lankle}$, $oy_{Lankle}$, $os_{Lankle}$] |
| RIGHT ANKLE | [$ox_{Rankle}$, $oy_{Rankle}$, $os_{Rankle}$] |

FIG. 26D FIG. 26E

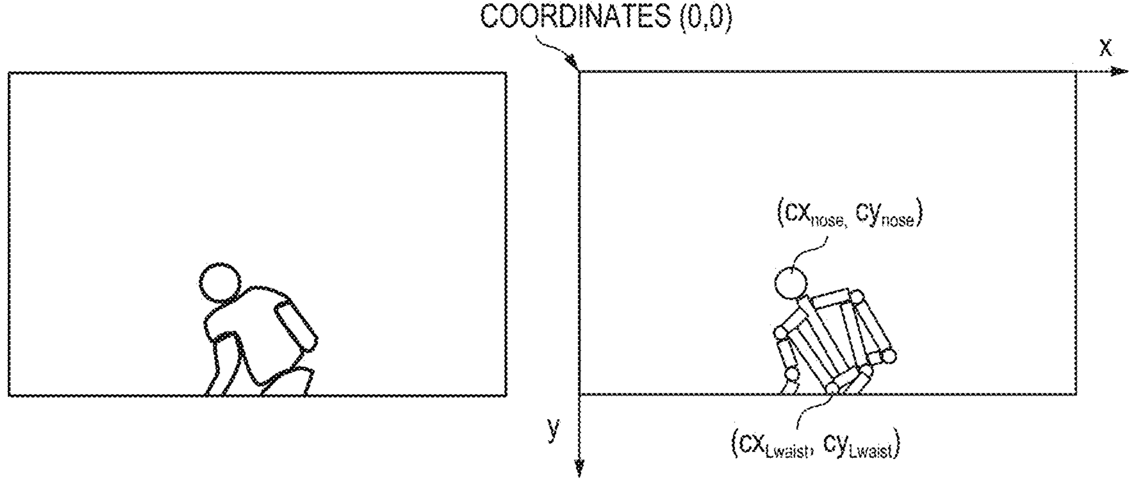

FIG. 26F

| NOSE | $[cx_{nose}, cy_{nose}, cs_{nose}]$ |
|---|---|
| LEFT SHOULDER | $[cx_{Lsholder}, cy_{Lsholder}, cs_{Lsholder}]$ |
| RIGHT SHOULDER | $[cx_{Rsholder}, cy_{Rsholder}, cs_{Rsholder}]$ |
| LEFT ELBOW | $[cx_{Lelbow}, cy_{Lelbow}, cs_{Lelbow}]$ |
| RIGHT ELBOW | $[cx_{Relbow}, cy_{Relbow}, cs_{Relbow}]$ |
| LEFT WRIST | $[cx_{Lwrist}, cy_{Lwrist}, cs_{Lwrist}]$ |
| RIGHT WRIST | $[cx_{Rwrist}, cy_{Rwrist}, cs_{Rwrist}]$ |
| LEFT WAIST | $[cx_{Lwaist}, cy_{Lwaist}, cs_{Lwaist}]$ |
| RIGHT WAIST | $[cx_{Rwaist}, cy_{Rwaist}, cs_{Rwaist}]$ |

IMAGE CAPTURING SYSTEM

BACKGROUND OF THE INVENTION

Field of the Invention

The present invention relates to a system that tracks a specific subject using a plurality of image capture apparatuses having different image capture positions or image capture directions.

Description of the Related Art

There is a technique of tracking a specific subject using an image capture apparatus capable of automatically controlling pan/tilt/zoom (PTZ) from a remote site. In such automatic tracking control, PTZ is automatically controlled such that the tracking target subject is arranged at a desired position in an image capture angle of view.

Japanese Patent Laid-Open No. 2015-142181 describes a technique of, when detecting a specific subject by image recognition processing, changing parameters used in the image recognition processing in accordance with a zoom magnification so that the specific subject is not undetected due to the change of the zoom magnification.

Also, Japanese Patent Laid-Open No. 2002-290962 describes a technique of, when a tracking target subject moves near the boundary of the image capture range of a first image capture apparatus, transmitting the template data of the tracking target subject generated by the first image capture apparatus to a second image capture apparatus and making the second image capture apparatus take over the tracking target.

Japanese Patent Laid-Open No. 2015-61239 describes a technique of, when a specific subject cannot be detected from a captured image, extending the image capture range and searching for the specific subject.

However, since the tracking target subject is discriminated by template matching in Japanese Patent Laid-Open Nos. 2015-142181 and 2002-290962, when tracking the specific subject using a plurality of image capture apparatuses, the plurality of image capture apparatuses need to be arranged such that these have close image capture positions or image capture directions. For this reason, when image capture positions or image capture directions of the plurality of image capture apparatuses are arranged far apart, it is difficult to track the specific subject by the plurality of image capture apparatuses.

Also, when the image capture region of the tracking target subject changes between the plurality of image capture apparatuses, the similarity of the tracking target subject may lower between the plurality of image capture apparatuses. For example, when the entire subject is the image capture region for the image capture angle of view of the first image capture apparatus, and a part of the subject is the image capture region for the image capture angle of view of the second image capture apparatus, or when a part of the subject falls out of the image capture angle of view, it is difficult to recognize the same subject by the plurality of image capture apparatuses.

Also, in Japanese Patent Laid-Open Nos. 2002-290962 and 2015-61239, when the size of the tracking target subject in an image changes between the plurality of image capture apparatuses, the similarity of the tracking target subject may lower between the plurality of image capture apparatuses, and it may be difficult to recognize the same subject by the plurality of image capture apparatuses.

SUMMARY OF THE INVENTION

The present invention has been made in consideration of the aforementioned problems, and realizes a system capable of tracking a specific subject using a plurality of image capture apparatuses having different image capture positions or image capture directions.

In order to solve the aforementioned problems, the present invention provides a system which includes a first image capture apparatus and a second image capture apparatus, which have different image capture directions, and a first control apparatus and a second control apparatus, which control the second image capture apparatus such that a predetermined subject is tracked based on one of a first image captured by the first image capture apparatus and a second image captured by the second image capture apparatus, wherein the first control apparatus comprises: a first decision unit that decides the predetermined subject from subjects included in the first image; a first generation unit that generates first feature information of a first region of the predetermined subject; and a first control unit that controls the second image capture apparatus to track the predetermined subject, and the second control apparatus comprises: a second generation unit that generates second feature information of a subject included in the second image; a second decision unit that decides the predetermined subject based on the first feature information and the second feature information obtained from the first control apparatus; and a second control unit that controls the second image capture apparatus to track the predetermined subject.

According to the present invention, it is possible to track a specific subject using a plurality of image capture apparatuses having different image capture positions or image capture directions.

Further features of the present invention will become apparent from the following description of exemplary embodiments (with reference to the attached drawings).

BRIEF DESCRIPTION OF THE DRAWINGS

FIG. 1 is a view exemplifying a system configuration according to the first embodiment;

FIGS. 2A and 2B are views exemplifying the hardware configurations of apparatuses that constitute the system according to the first embodiment;

FIGS. 4A to 4D are flowcharts exemplifying the basic operations of the apparatuses that constitute the system according to the first embodiment;

FIG. 7 is a view illustrating pan control according to the first embodiment;

FIG. 8 is a view illustrating tilt control according to the first embodiment;

FIGS. 9A to 9C are flowcharts exemplifying control processing according to the first embodiment;

FIGS. 13A to 13E are views illustrating trimming processing according to the first embodiment;

FIG. 14 is a flowchart exemplifying control processing according to the third embodiment;

FIG. 15 is a flowchart exemplifying zoom control according to the third embodiment;

FIG. 16 is a view exemplifying the functional configurations of apparatuses that constitute a system according to the fourth embodiment;

FIG. 17 is a flowchart exemplifying control processing according to the fourth embodiment;

FIG. 18 is a flowchart exemplifying control processing according to the fourth embodiment;

FIG. 19 is a flowchart exemplifying control processing according to the fifth embodiment;

FIG. 20 is a flowchart exemplifying control processing according to the sixth embodiment;

FIGS. 23A and 23B are flowcharts exemplifying control processing according to the eighth embodiment;

FIG. 24 is a flowchart exemplifying letter addition processing according to the eighth embodiment;

FIGS. 25A to 25E are views illustrating letter addition according to the eighth embodiment;

FIGS. 26A to 26F are views exemplifying skeleton estimation processing according to the ninth embodiment.

DESCRIPTION OF THE EMBODIMENTS

Figure 3:
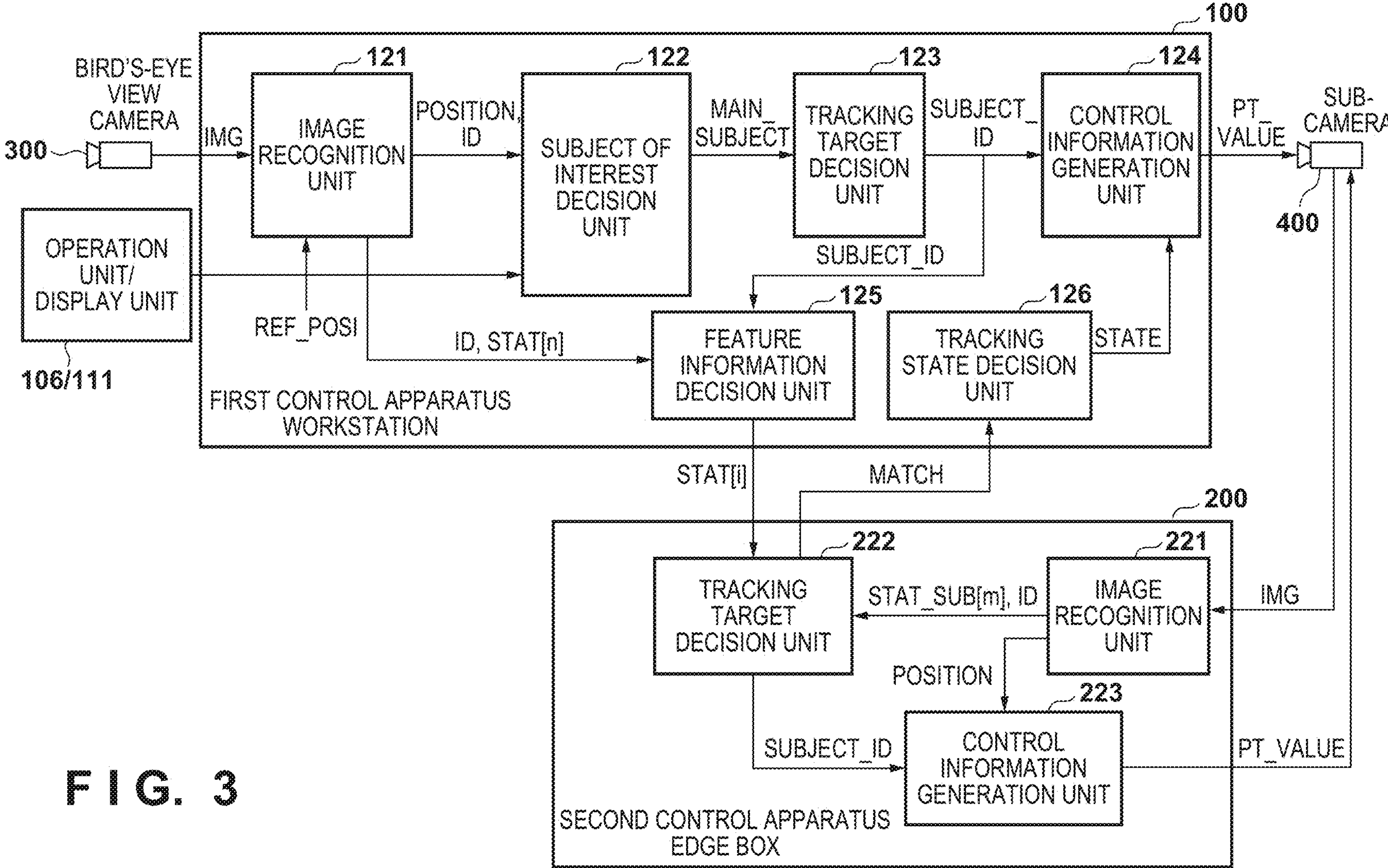
FIG. 3 is a view exemplifying the functional configurations of the apparatuses that constitute the system according to the first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<System Configuration>

A system configuration according to the first embodiment will be described first with reference to FIG. 1.

The system according to this embodiment includes a first control apparatus 100, a second control apparatus 200, a first image capture apparatus 300, and a second image capture apparatus 400. The system according to this embodiment controls the second image capture apparatus 400 by one of the first control apparatus 100 and the second control apparatus 200 to track a specific subject. In this embodiment, the specific subject is, for example, a person but may be an animal or an object.

The first control apparatus 100 detects a tracking target subject from an overview (herein after a bird's eye view) image captured by the first image capture apparatus 300, and controls the second image capture apparatus 400 based on the detection result. The first control apparatus 100 is also called a workstation. The tracking target subject is set, for example, by a user operation or automatically.

The second control apparatus 200 controls the second image capture apparatus 400 based on a tracking target subject recognition result by a bird's eye view image captured by the first image capture apparatus 300 and a tracking target subject recognition result by a sub-image captured by the second image capture apparatus 400. The second control apparatus 200 is also called an edge box.

The first image capture apparatus 300 has an image capture angle of view set to a wide angle, and can capture a bird's eye view image including all a subject A, a subject B, and a subject C. The first image capture apparatus 300 is also called a bird's eye view camera. The second image capture apparatus 400 has a variable image capture angle of view, and can capture at least one of the subject A, the subject B, and the subject C. The second image capture apparatus 400 is called a sub-camera. The first image capture apparatus 300 and the second image capture apparatus 400 are arranged at positions apart from each other such that these have different image capture positions and/or image capture directions.

The first control apparatus 100, the second control apparatus 200, the first image capture apparatus 300, and the second image capture apparatus 400 are connected so as to be able to communicate therewith via a network 600 such as a local area network (LAN). Note that in this embodiment, an example in which the first control apparatus 100, the second control apparatus 200, the first image capture apparatus 300, and the second image capture apparatus 400 are connected via the network 600 will be described, but these may be connected by a connection cable (not shown). Also, in this embodiment, an example in which one second image capture apparatus 400 is provided will be described, but two or more second image capture apparatuses 400 may be provided. When there are a plurality of second image capture apparatuses 400, the second control apparatus 200 is provided in consideration of each second image capture apparatus 400.

The basic function of the system according to this embodiment will be described next.

The first image capture apparatus 300 captures a bird's eye view image, and transmits the bird's eye view image to the first control apparatus 100 via the network 600.

The second image capture apparatus 400 captures a sub-image including a tracking target subject (tracking subject), and transmits the sub-image to the second control apparatus 200 via the network 600. Note that the second image capture apparatus 400 has a PTZ function. The PTZ function is a function capable of controlling pan, tilt, and zoom of the image capture apparatus. PTZ is an acronym for Panoramic, Tilt, and Zoom. Pan (Panoramic) is movement of the optical axis of the image capture apparatus in the horizontal direction. Tilt is movement of the optical axis of the image capture apparatus in the vertical direction. Zoom indicates zoom-up (telephoto) and zoom-out (wide angle). Pan and tilt are functions of changing the image capture direction of the image capture apparatus. Zoom is a function of changing the image capture range (image capture angle of view) of the image capture apparatus.

The first control apparatus 100 decides a tracking subject from a subject detected from the bird's-eye view image received from the first image capture apparatus 300, and calculates first feature information of the tracking subject from the bird's-eye view image. The first control apparatus controls the second image capture apparatus 400 to change the image capture direction and the image capture range of the second image capture apparatus 400 to the image capture direction and the image capture range of the tracking subject based on the first feature information of tracking subject.

After the image capture direction and the image capture range of the second image capture apparatus 400 are changed to the image capture direction and the image capture range of the tracking subject, the first control apparatus 100 transmits the first feature information of the tracking subject calculated from the bird's-eye view image to the second control apparatus 200.

The second control apparatus 200 detects a subject from the sub-image received from the second image capture apparatus 400, and calculates second feature information of the detected subject. The second control apparatus 200 compares the second feature information of the subject detected from the sub-image with the first feature information of the tracking subject received from the first control apparatus 100.

When the similarity between the first feature information of the tracking subject and the second feature information of the subject detected from the sub-image is low, the first control apparatus 100 controls the second image capture apparatus 400 to change the image capture direction and the image capture range of the second image capture apparatus 400 to the image capture direction and the image capture range of the tracking subject based on the first feature information of the tracking subject.

When the similarity between the first feature information of the tracking subject and the second feature information of the subject detected from the sub-image is high, the second control apparatus 200 controls the second image capture apparatus 400 to change the image capture direction and the image capture range of the second image capture apparatus 400 to the image capture direction and the image capture range of the tracking subject based on the second feature information of the subject detected from the sub-image having a high similarity to the first feature information of the tracking subject.

The feature information is information capable of specifying that the subject is the same subject in a case where the same subject is captured by a plurality of image capture apparatuses having different image capture positions and/or image capture directions. The feature information is an inference result output by performing image recognition in inference processing using a learned model, to which a plurality of images obtained by capturing the same subject by the plurality of image capture apparatuses having different image capture positions and/or image capture directions are input. When an inference result indicating that the subject is the same subject is obtained, it can be specified that subjects included in the plurality of images captured by the plurality of image capture apparatuses having different image capture positions and/or image capture directions are the same subjects.

The first control apparatus 100 will be referred to as a workstation (WS), the second control apparatus 200 as an edge box (EB), the first image capture apparatus 300 as a bird's-eye view camera, and the second image capture apparatus 400 as a sub-camera hereinafter.

<Apparatus Configuration>

The hardware configurations of the WS 100, the EB 200, the bird's-eye view camera 300, and the sub-camera 400 will be described next in detail with reference to FIGS. 2A and 2B.

First, the configuration of the WS 100 will be described. The WS 100 includes a control unit 101, a volatile memory 102, a nonvolatile memory 103, an inference unit 104, a communication unit 105, and an operation unit 106, and the units are connected to be able to transmit/receive data via an internal bus 110.

The control unit 101 includes a processor (CPU) that performs arithmetic processing and control processing of the WS 100, and executes control programs stored in the nonvolatile memory 103, thereby controlling the components of the WS 100.

The volatile memory 102 is a main storage device such as a RAM. Constants and variables for the operations of the control unit 101 and control programs and an inference program read out from the nonvolatile memory 103 are loaded into the volatile memory 102. Also, the volatile memory 102 stores pieces of information such as image data that the communication unit 105 receives from an external apparatus and the inference program. Additionally, the volatile memory 102 stores bird's-eye view image data received from the bird's-eye view camera 300. The volatile memory 102 has a sufficient storage capacity to hold these pieces of information.

The nonvolatile memory 103 is an auxiliary storage device such as an EEPROM, a flash memory, a hard disk drive (HDD), a solid state drive (SSD), or a memory card. The nonvolatile memory 103 stores an operating system (OS) that is basic software to be executed by the control unit 101, control programs including applications that implement applied functions in cooperation with the OS, and the inference program to be used by the inference unit 104 for inference processing.

The inference unit 104 executes inference processing using a learned inference model and inference parameters in accordance with the inference program. The inference unit 104 executes inference processing of estimating the presence/absence or the position of a specific subject and the feature information of the subject from a bird's-eye view image received from the bird's-eye view camera 300. The inference processing in the inference unit 104 can be executed by an arithmetic processing device such as a Graphics Processing Unit (GPU) specialized to image processing or inference processing. The GPU is a processor capable of performing many product-sum operations, and has an arithmetic processing capability for performing a matrix operation of a neural network in a short time. The inference processing in the inference unit 104 may be implemented by a reconfigurable logic circuit such as a Field-Programmable Gate Array (FPGA). Note that for the inference processing, the CPU of the control unit 101 and the GPU may perform operations in cooperation, or one of the CPU of the control unit 101 and the GPU may perform operations.

The communication unit 105 is an interface (I/F) complying with a wired communication standard such as Ethernet® or an interface complying with a wireless communication standard such as Wi-Fi®. The communication unit 105 can be connected to an external apparatus such as the EB 200, the bird's-eye view camera 300, or the sub-camera 400 via the network 600 such as a wired LAN or a wireless LAN and transmit/receive data to/from the external apparatus. The control unit 101 controls the communication unit 105, thereby implementing communication with the external apparatus. Note that the communication method is not limited to Ethernet® or Wi-Fi®, and a communication standard such as IEEE 1394 may be used.

The operation unit 106 is an operation member such as various switches, buttons, or a touch panel, which accepts various kinds of operations of the user and outputs operation information to the control unit 101. Also, the operation unit 106 provides a user interface used by the user to operate the WS 100.

A display unit 111 displays a bird's-eye view image or a subject recognition result, and displays a Graphical User Interface (GUI) for an interactive operation. The display unit 111 is a display device such as a liquid crystal display or an organic EL display. The display unit 111 may be integrated with the WS 100 or may be an external device connected to the WS 100.

The configuration of the EB 200 will be described next.

The EB 200 includes a control unit 201, a volatile memory 202, a nonvolatile memory 203, an inference unit 204, and a communication unit 205, and the units are connected to be able to transmit/receive data via an internal bus 210.

The control unit 201 includes a processor (CPU) that performs arithmetic processing and control processing of the EB 200, and executes control programs stored in the nonvolatile memory 203, thereby controlling the components of the EB 200.

The volatile memory 202 is a main storage device such as a RAM. Constants and variables for the operations of the control unit 201 and control programs and an inference program read out from the nonvolatile memory 203 are loaded into the volatile memory 202. Also, the volatile memory 202 stores pieces of information such as image data that the communication unit 205 receives from an external apparatus and the inference program. Additionally, the volatile memory 202 stores sub-image data received from the sub-camera 400. The volatile memory 202 has a sufficient storage capacity to hold these pieces of information.

The nonvolatile memory 203 is an auxiliary storage device such as an EEPROM, a flash memory, a hard disk drive (HDD), a solid state drive (SSD), or a memory card. The nonvolatile memory 203 stores an operating system (OS) that is basic software to be executed by the control unit 201, control programs including applications that implement applied functions in cooperation with the OS, and the inference program to be used by the inference unit 204 for inference processing.

The inference unit 204 executes inference processing using a learned inference model and inference parameters in accordance with the inference program. The inference unit 204 executes inference processing of estimating the presence/absence or the position of a specific subject and the feature information of the subject from a sub-image received from the sub-camera 400. The inference processing in the inference unit 204 can be executed by an arithmetic processing device such as a Graphics Processing Unit (GPU) specialized to image processing or inference processing. The GPU is a processor capable of performing many product-sum operations, and has an arithmetic processing capability for performing a matrix operation of a neural network in a short time. The inference processing in the inference unit 204 may be implemented by a reconfigurable logic circuit such as a Field-Programmable Gate Array (FPGA). Note that for the inference processing, the CPU of the control unit 201 and the GPU may perform operations in cooperation, or one of the CPU of the control unit 201 and the GPU may perform operations.

The communication unit 205 is an interface (I/F) complying with a wired communication standard such as Ethernet® or an interface complying with a wireless communication standard such as Wi-Fi®. The communication unit 205 can be connected to an external apparatus such as the WS 100 or the sub-camera 400 via the network 600 such as a wired LAN or a wireless LAN and transmit/receive data to/from the external apparatus. The control unit 201 controls the communication unit 205, thereby implementing communication with the external apparatus. Note that the communication method is not limited to Ethernet® or Wi-Fi®, and a communication standard such as IEEE 1394 may be used.

The configuration of the bird's-eye view camera 300 will be described next.

The bird's-eye view camera 300 includes a control unit 301, a volatile memory 302, a nonvolatile memory 303, a communication unit 305, an image capture unit 306, and an image processing unit 307, and the units are connected to be able to transmit/receive data via an internal bus 310.

The control unit 301 comprehensively controls the whole bird's-eye view camera 300 under the control of the WS 100. The control unit 301 includes a processor (CPU) that performs arithmetic processing and control processing of the bird's-eye view camera 300, and executes control programs stored in the nonvolatile memory 303, thereby controlling the components of the bird's-eye view camera 300.

The volatile memory 302 is a main storage device such as a RAM. Constants and variables for the operations of the control unit 301 and control programs and an inference program read out from the nonvolatile memory 303 are loaded into the volatile memory 302. Also, the volatile memory 302 stores bird's-eye view image data captured by the image capture unit 306 and processed by the image processing unit 307. The volatile memory 302 has a sufficient storage capacity to hold these pieces of information.

The nonvolatile memory 303 is an auxiliary storage device such as an EEPROM, a flash memory, a hard disk drive (HDD), a solid state drive (SSD), or a memory card. The nonvolatile memory 303 stores an operating system (OS) that is basic software to be executed by the control unit 301, and control programs including applications that implement applied functions in cooperation with the OS.

The image capture unit 306 includes an image sensor formed by a Charge Coupled Device (CCD) or a Complementary Metal-Oxide-Semiconductor (CMOS) element, and converts an optical image of a subject into an electrical signal. In this embodiment, the image capture angle of view of the bird's-eye view camera 300 is fixed such that it can capture a bird's-eye view image including a plurality of subjects including a tracking subject.

The image processing unit 307 executes various kinds of image processing for image data output from the image capture unit 306 or image data read out from the volatile memory 302. The various kinds of image processing include, for example, image processing such as noise removal, edge enhancement, and enlargement/reduction, image correction processing such as contrast correction, brightness correction, and color correction, and trimming processing or crop processing of cutting out a part of image data. The image processing unit 307 converts the image data that has undergone the image processing into an image file having a predetermined format (for example, JPEG) and records it in the nonvolatile memory 303. Also, the image processing unit 307 performs predetermined arithmetic processing using image data, and the control unit 301 performs auto-focus (AF) processing and auto-exposure (AE) processing based on the operation result.

The communication unit 305 is an interface (I/F) complying with a wired communication standard such as Ethernet® or an interface complying with a wireless communication standard such as Wi-Fi®. The communication unit 305 can be connected to an external apparatus such as the WS 100 via the network 600 such as a wired LAN or a wireless LAN and transmit/receive data to/from the external apparatus. The control unit 301 controls the communication unit 305, thereby implementing communication with the external apparatus. Note that the communication method is not limited to Ethernet® or Wi-Fi®, and a communication standard such as IEEE 1394 may be used.

The configuration of the sub-camera 400 will be described next.

The sub-camera 400 includes a control unit 401, a volatile memory 402, a nonvolatile memory 403, a communication unit 405, an image capture unit 406, an image processing unit 407, an optical unit 408, and a PTZ driving unit 409, and the units are connected to be able to transmit/receive data via an internal bus 410.

The control unit 401 generally controls the whole sub-camera 400 under the control of the WS 100 or the EB 200. The control unit 401 includes a processor (CPU) that performs arithmetic processing and control processing of the sub-camera 400, and executes control programs stored in the nonvolatile memory 403, thereby controlling the components of the sub-camera 400.

The volatile memory 402 is a main storage device such as a RAM. Constants and variables for the operations of the control unit 401 and control programs and an inference program read out from the nonvolatile memory 403 are loaded into the volatile memory 402. Also, the volatile memory 402 stores bird's-eye view image data captured by the image capture unit 406 and processed by the image processing unit 407. The volatile memory 402 has a sufficient storage capacity to hold these pieces of information.

The nonvolatile memory 403 is an auxiliary storage device such as an EEPROM, a flash memory, a hard disk drive (HDD), a solid state drive (SSD), or a memory card. The nonvolatile memory 403 stores an operating system (OS) that is basic software to be executed by the control unit 401, and control programs including applications that implement applied functions in cooperation with the OS.

The image capture unit 406 includes an image sensor formed by a Charge Coupled Device (CCD) or a Complementary Metal-Oxide-Semiconductor (CMOS) element, and converts an optical image of a subject into an electrical signal.

The image processing unit 407 executes various kinds of image processing for image data output from the image capture unit 406 or image data read out from the volatile memory 402. The various kinds of image processing include, for example, image processing such as noise removal, edge enhancement, and enlargement/reduction, image correction processing such as contrast correction, brightness correction, and color correction, and trimming processing or crop processing of cutting out a part of image data. The image processing unit 407 converts the image data that has undergone the image processing into an image file having a predetermined format (for example, JPEG) and records it in the nonvolatile memory 403. Also, the image processing unit 407 performs predetermined arithmetic processing using image data, and the control unit 401 performs auto-focus (AF) processing and auto-exposure (AE) processing based on the operation result.

The communication unit 405 is an interface (I/F) complying with a wired communication standard such as Ethernet® or an interface complying with a wireless communication standard such as Wi-Fi®. The communication unit 405 can be connected to an external apparatus such as the EB 200 via the network 600 such as a wired LAN or a wireless LAN and transmit/receive data to/from the external apparatus. The control unit 401 controls the communication unit 405, thereby implementing communication with the external apparatus. Note that the communication method is not limited to Ethernet® or Wi-Fi®, and a communication standard such as IEEE 1394 may be used.

The optical unit 408 includes a lens group including a zoom lens and a focus lens, a shutter having an aperture function, and a mechanism that drives these optical members. The optical unit 408 drives the optical members to perform at least one of rotating the image capture direction of the sub-camera 400 about a pan (P) axis (horizontal direction) or a tilt (T) axis (vertical direction) and changing the image capture range (image capture angle of view) of the sub-camera 400 along a zoom (Z) axis (enlargement/reduction direction).

The PTZ driving unit 409 includes mechanical elements configured to drive the optical unit 408 in the PTZ direction and an actuator such as a motor, and drives the optical unit 408 in the PTZ direction under the control of the control unit 401.

Note that the zoom function according to this embodiment is not limited to optical zoom that changes the focal length by moving the zoom lens and may be digital zoom that extracts a part of captured image data and enlarges it, or optical zoom and digital zoom may be combined.

[Control Processing]

Control processing of tracking a tracking subject by switching between a mode in which the WS 100 controls the sub-camera 400 based on a bird's-eye view image and a mode in which the EB 200 controls the sub-camera 400 based on a sub-image will be described next with reference to FIGS. 3 to 10A to 10F.

First, the functional configurations of the WS 100 and the EB 200 configured to implement the control processing according to this embodiment will be described with reference to FIGS. 3 and 4A to 4D.

The functions of the WS 100 and the EB 200 are implemented by hardware and/or software. Note that when the function units shown in FIG. 3 are not implemented by software but configured by hardware, a circuit configuration corresponding to each function unit shown in FIG. 3 is provided.

The WS 100 includes an image recognition unit 121, a subject of interest decision unit 122, a tracking target decision unit 123, a control information generation unit 124, a feature information decision unit 125, and a tracking state decision unit 126. The pieces of software configured to implement these functions are stored in the nonvolatile memory 103, and the control unit 101 loads these into the volatile memory 102 and executes them.

The EB 200 includes an image recognition unit 221, a tracking target decision unit 222, and a control information generation unit 223. These pieces of software are stored in the nonvolatile memory 203, and the control unit 201 loads these into the volatile memory 202 and executes them.

Figure 4A:
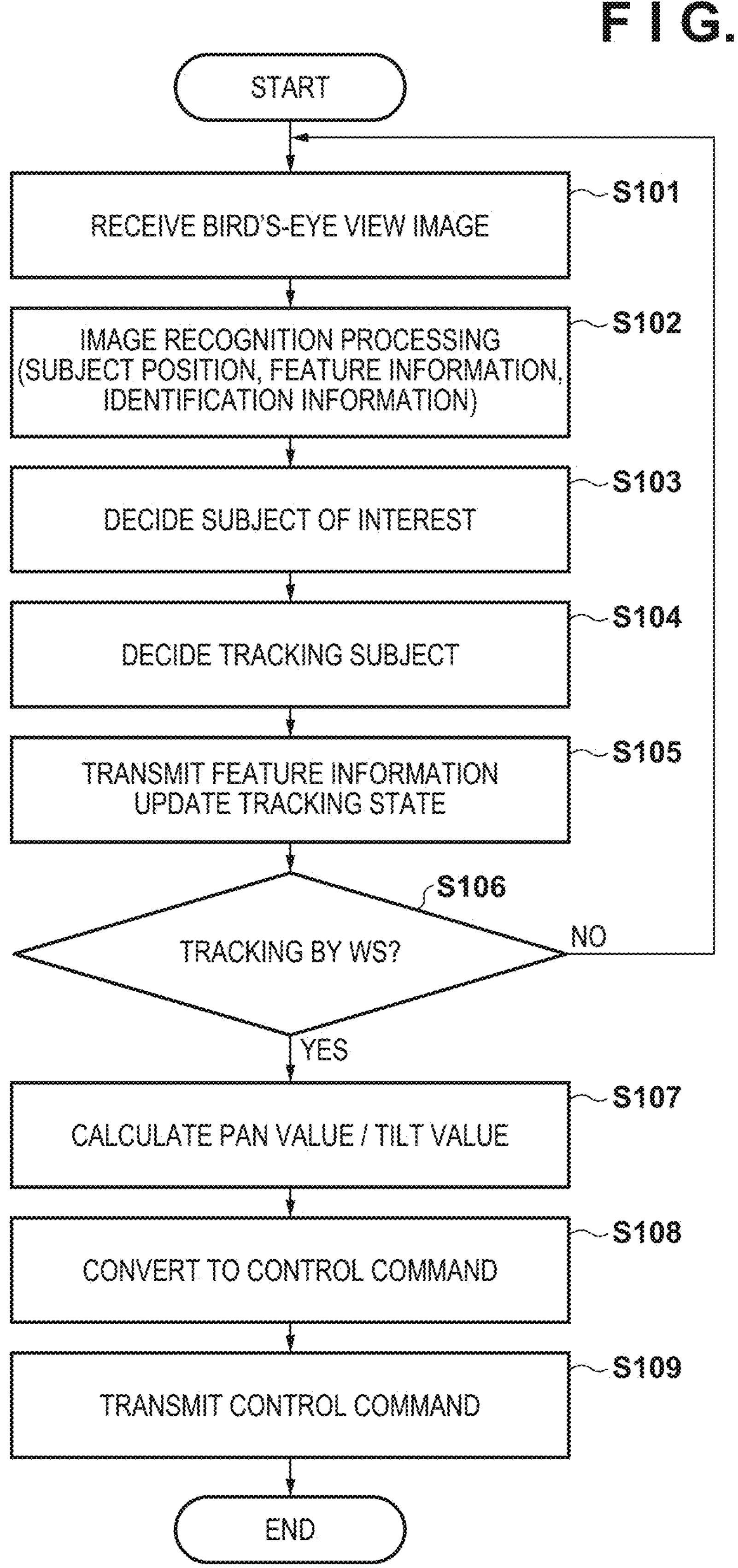

FIG. 4A is a flowchart showing the basic operation of the WS 100. FIG. 4B is a flowchart showing the basic operation of the EB 200. FIG. 4C is a flowchart showing the operation of the bird's-eye view camera 300. FIG. 4D is a flowchart showing the operation of the sub-camera 400.

First, the functions and the basic operation of the software of the WS 100 will be described with reference to FIGS. 3 and 4A.

In step S101, the control unit 101 transmits an image capture command to the bird's-eye view camera 300 via the communication unit 105 using a predetermined protocol, receives a bird's-eye view image from the bird's-eye view camera 300, stores it in the volatile memory 102, and advances the process to step S102.

In step S102, the control unit 101 executes the function of the image recognition unit 121 shown in FIG. 3, and advances the process to step S103.

The image recognition unit 121 controls the inference unit 104, the volatile memory 102, and the nonvolatile memory 103 and performs following subject recognition processing.

A bird's-eye view image IMG of the bird's-eye view camera 300 and reference position information REF_POSI of the bird's-eye view camera 300, which are read out from the volatile memory 102, are input to the image recognition unit 121. The reference position information REF_POSI of the bird's-eye view camera 300 includes the information of the position of the bird's-eye view camera 300 and marker coordinates. The image recognition unit 121 performs detection of a subject and calculation of feature information based on the bird's-eye view image IMG and the reference position information REF_POSI of the bird's-eye view camera 300. The image recognition unit 121 then outputs coordinate information POSITION[n] indicating the position of the detected subject, ID[n] indicating the identification information of the detected subject, and STAT[n] indicating the feature information of the detected subject.

The position of the bird's-eye view camera 300 is a position in a coordinate space that views the image capture region of the bird's-eye view camera 300 from directly above, and the position is measured in advance by a user operation or a sensor (not shown) and known. The marker coordinates are the position information of a marker set in the coordinate space that views the image capture region of the bird's-eye view camera 300 from directly above to calculate a homography transformation matrix to be described later and are known values measured in advance manually or using a sensor (not shown). The marker is a mark having a color different from the color of a floor or ground, and any marker can be used when it can be measured by a user operation or a sensor (not shown). For example, when the sensor (not shown) is a camera, a mark having an arbitrary color is used as a marker, and the marker position is obtained by extracting the color of the marker from a captured image.

Also, a user may input the position of the bird's-eye view camera 300 and the marker coordinates via the operation unit 106 of the WS 100, and the control unit 101 may store these in the volatile memory 102. The reference position information REF_POSI and the coordinate information POSITION[n] of the subject are represented on a coordinate system converted into the coordinate space that views the image capture region of the bird's-eye view camera 300 from directly above. n is an index indicating the number of detected subjects. For example, when the inference unit 104 detects three persons, POSITION, ID, and STAT of the three persons are output as the inference result. The control unit 101 stores, in the volatile memory 102, the subject recognition result by the image recognition unit 121. Details of subject detection processing and feature information calculation processing will be described later.

A calculation method of the coordinate information POSITION of a subject by the image recognition unit 121 will be described here.

First, the relationship between the coordinate system of the bird's-eye view image of the bird's-eye view camera 300 and the coordinate system that views the image capture region of the bird's-eye view camera 300 from directly above will be described with reference to FIGS. 5A and 5B.

To calculate a pan value with which the image capture direction of the sub-camera 400 is the direction of the tracking subject, the operation can be facilitated by calculating an angle in a plane coordinate space perpendicular to the axis to perform the pan operation by the sub-camera 400. For example, when the sub-camera 400 is installed perpendicular to a ground surface (reference position) such as a floor or ground, the coordinate space perpendicular to the axis to perform the pan operation by the sub-camera 400 is a coordinate space parallel to the reference position (a coordinate space that views the space where the sub-camera 400 or a subject exists from directly above) shown in FIG. 5B.

In this embodiment, the sub-camera 400 is installed perpendicular to the reference position, and the pan value is calculated on a coordinate system that views the image capture region of the bird's-eye view camera 300 from directly above. That is, the coordinates of a subject position detected in the coordinate system of a bird's-eye view image of the bird's-eye view camera 300 (to be referred to as a bird's-eye view camera coordinate system hereinafter) shown in FIG. 6A are transformed to those in the coordinate system that views the image capture region of the bird's-eye view camera 300 from directly above (to be referred to as a plane coordinate system hereinafter) shown in FIG. 5B. The coordinate transformation is performed, using a homography transformation matrix H, by $$\begin{pmatrix} X \\ Y \\ W \end{pmatrix} = H \begin{pmatrix} x \\ y \\ 1 \end{pmatrix} \quad (1)$$

In equation (1), x and y are the horizontal and vertical coordinates on the bird's-eye view camera coordinate system, and X and Y are the horizontal and vertical coordinates on the plane coordinate system.

Figure 5A:
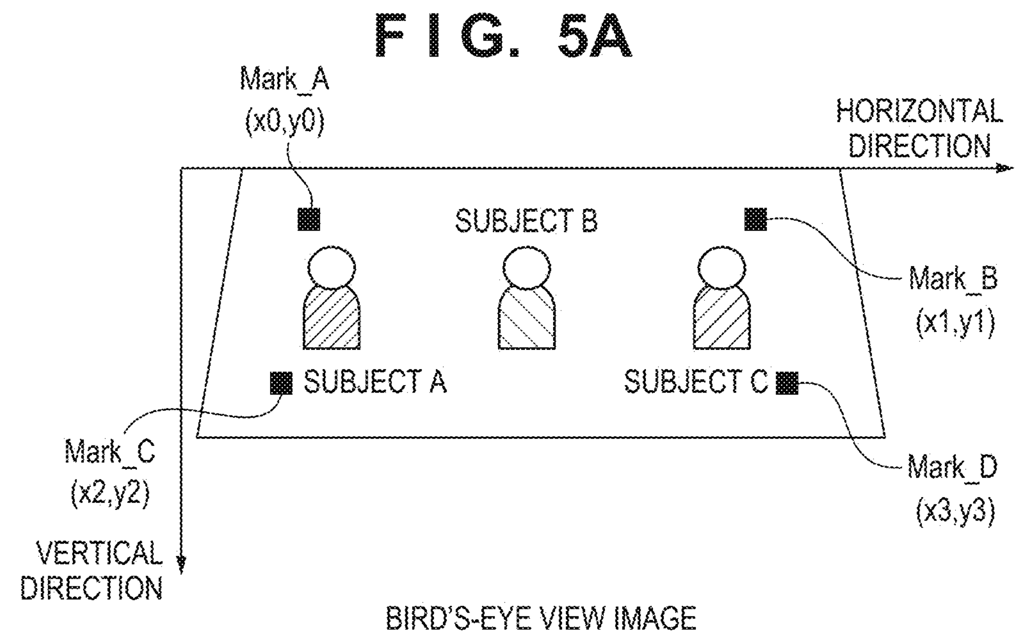
FIGS. 5A and 5B are views illustrating a coordinate transformation method of a captured image according to the first embodiment.
Figure 5B:
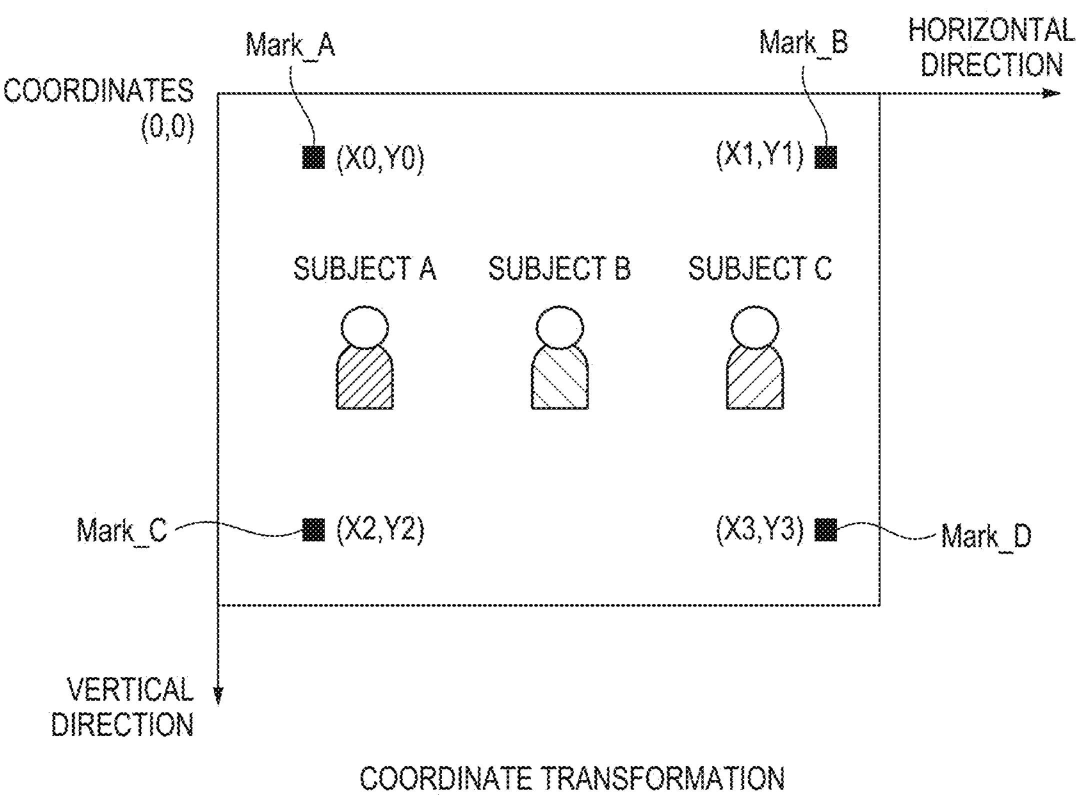
Figure 6A:
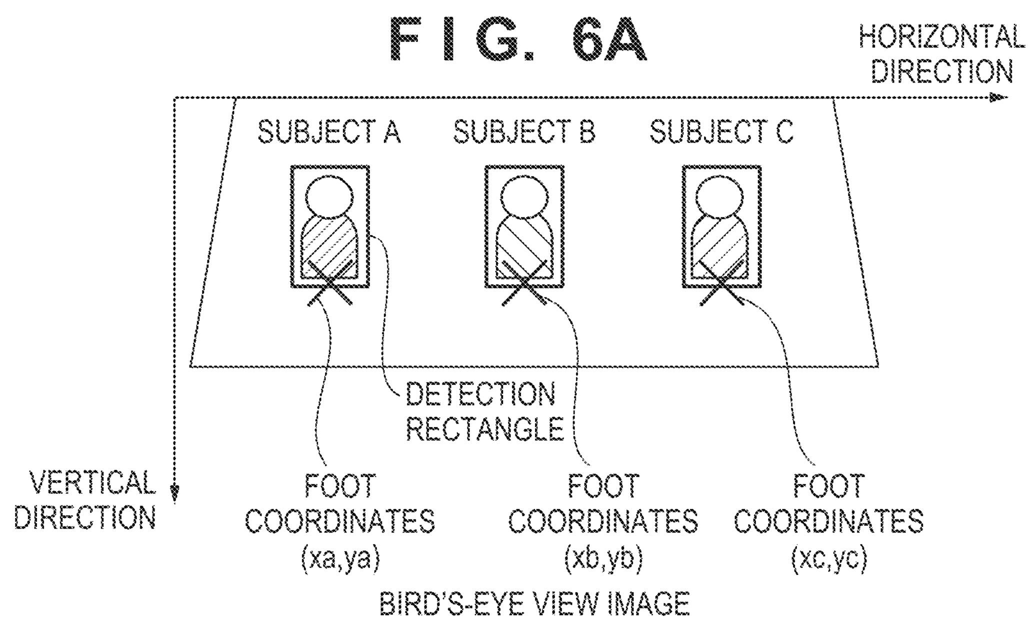
FIGS. 6A and 6B are views illustrating a subject detection method and a coordinate transformation method according to the first embodiment.

The control unit 101 reads out the reference position information REF_POSI from the volatile memory 102 and substitutes marker coordinates Mark_A to Mark_D shown in FIGS. 5A and 5B, which are included in the reference position information REF_POSI, into equation (1), thereby calculating the homography transformation matrix H. Note that the marker coordinates are values on the plane coordinate system. By using equation (1), arbitrary coordinates on the bird's-eye view camera coordinate system in FIG. 5A can be mapped to arbitrary coordinates on the plane coordinate system in FIG. 5B. In the example shown in FIGS. 5A and 5B, the control unit 101 can ascertain, on the plane coordinate system shown in FIG. 5B, the positions of the subject A, the subject B, and the subject C included in the bird's-eye view image IMG of the bird's-eye view camera 300. The control unit 101 stores the homography transformation matrix H calculated by equation (1) in the volatile memory 102.

A method of detecting a subject position using an inference model for subject detection and a method of transformation to the plane coordinate system will be described next.

In this embodiment, subject detection is performed by performing image recognition processing using a learned inference model for subject detection, which is created by performing machine learning such as deep learning.

The inference model for subject detection receives a bird's-eye view image as an input, and outputs coordinate information, on the image, of a subject included in the bird's-eye view image.

The control unit 101 receives, by the inference unit 104, the bird's-eye view image IMG of the bird's-eye view camera 300 as an input, and performs image recognition processing using the inference model for subject detection, thereby detecting a subject. FIG. 6A shows an example in which each subject detected by the inference unit 104 is displayed in a rectangular frame. As shown in FIG. 6A, the coordinates of rectangular portions bounding the subject A, the subject B, and the subject C detected from the bird's-eye view image are detected as subject positions. The control unit 101 stores, in the volatile memory 102, the coordinate information of the subjects detected from the bird's-eye view image. Note that in this embodiment, an example in which subject detection is performed by inference processing using a learned model has been described. However, the present invention is not limited to this. For example, a method called a SIFT method that performs detection by collating local feature points in an image or a method called a template matching method that performs detection by obtaining a similarity to a template image may be used.

Figure 6B:
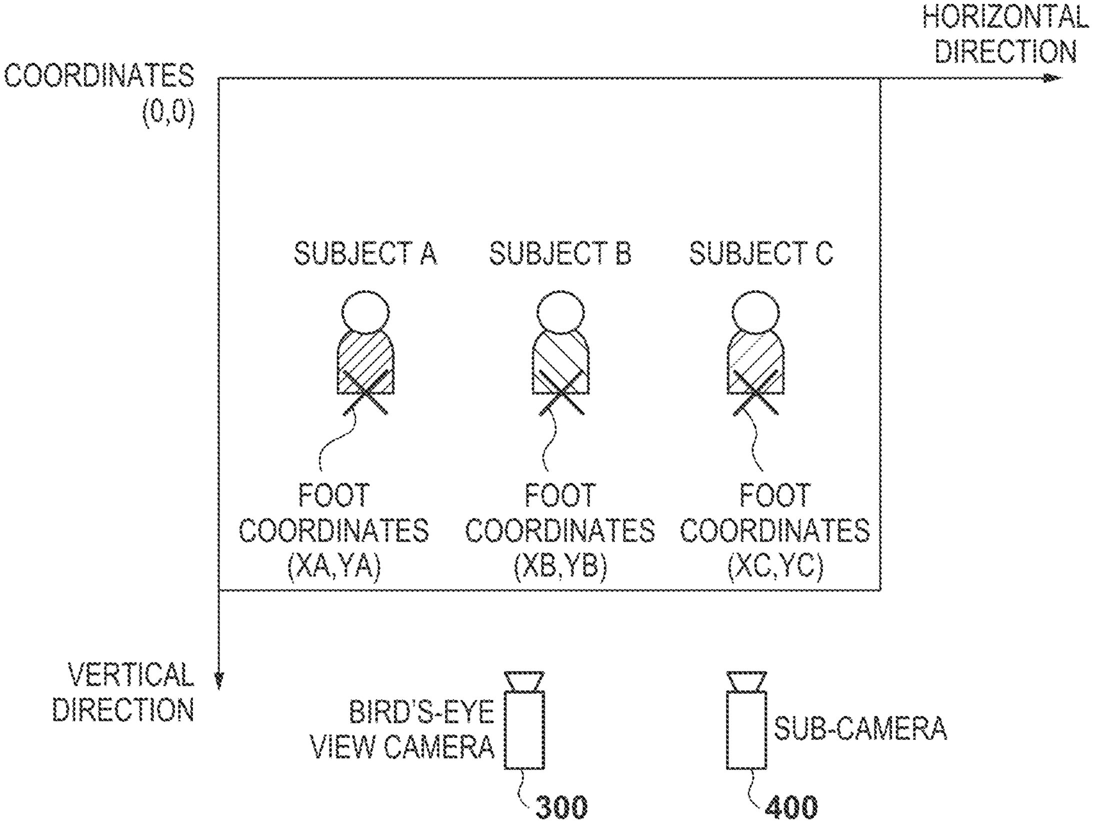

Furthermore, the control unit 101 transforms the lower end of the rectangular portion of each subject detected on the bird's-eye view camera coordinate system shown in FIG. 6A as a subject detection position (the foot coordinates of the person in the example shown in FIG. 6A) to the plane coordinate system shown in FIG. 6B. For example, the control unit 101 reads out the homography transformation matrix H from the volatile memory 102, and substitutes foot coordinates (xa, ya) of the subject A on the bird's-eye view camera coordinate system to x and y of equation (1), thereby transforming the coordinates to foot coordinates (XA, YA) on the plane coordinate system.

As for foot coordinates (xb, yb) of the subject B and foot coordinates (xc, yc) of the subject C as well, foot coordinates (XB, YB) of the subject B and foot coordinates (XC, YC) of the subject C on the plane coordinate system can be calculated. The control unit 101 writes the foot coordinates as the position coordinates POSITION of the subjects in the volatile memory 102.

A method of generating the subject identification information ID and the feature information STAT by the image recognition unit 121 will be described next.

The control unit 101 inputs, by the inference unit 104, the position coordinate POSITION of the subject that is the inference result of the inference model for subject detection and the bird's-eye view image of the bird's-eye view camera 300 to a learned inference model for subject specifying created by performing machine learning such as deep learning and performs inference processing, thereby outputting the identification information ID and the feature information STAT. The inference model for subject specifying is different from the inference model for subject detection.

The inference model for subject specifying will be described here.

The inference model for subject specifying according to this embodiment is a learned model that has learned using learning data obtained by collecting data that associates a set of images obtained by capturing a specific subject from a plurality of different image capture directions with information capable of identifying the specific subject as many as the number of a plurality of subjects such that the similarity of feature information is high between images of the same subject. When an image of a subject cut out based on the coordinate information POSITION of the subject as the output of the inference model for subject detection is input to the inference model for subject specifying, the feature information STAT is output.

When images of the same subject captured by different cameras are input, output feature information has a high similarity to the feature information STAT, as compared to a case where images of different subjects are input. As the feature information, a multidimensional vector of a response of a convolutional layer of a convolutional neural network can be used. The similarity will be described later.

The inference model for subject detection and the inference model for subject specifying are stored in the nonvolatile memory 103 before the start of control processing according to this embodiment.

Also, the image recognition unit 121 adds the identification information ID of the subject corresponding to the feature information that is the inference result of the inference model for subject specifying. Furthermore, the image recognition unit 121 calculates the similarity between feature information of images of each subject obtained by inputting, to the inference model for subject specifying, images of each subject detected by the inference model for subject detection using each of the image of a current frame and the image of a past frame as an input. The similarity is calculated using a cosine similarity.

The more similar the multidimensional vectors that are the feature information of subject images are, the closer the cosine similarity is to 1. The more different the multidimensional vectors are, the closer the cosine similarity is to 0. The same ID is added to subjects having the highest similarity between the past frame and the current frame. Note that the similarity calculation method is not limited to this, and any method is usable when it outputs a high numerical value when the pieces of feature information are close, and outputs a low numerical value when the pieces of feature information are far. Note that in this embodiment, feature information is used to add an ID, but the present invention is not limited to this. The positions or sizes of the rectangular information of the detected subjects may be compared between the current frame and the past frame using the rectangular information of the subjects obtained by the inference model for subject detection, and the same ID may be added to closest subjects. Alternatively, the position of the rectangular information of the current frame may be predicted using a Kalman filter or the like from the transition of the position of the rectangular information for the same ID in several past frames, and the same ID may be added to a subject closest to the predicted position of the rectangular information. The ID may be added by combining these methods.

When this method is used, it is possible to improve the correctness of ID addition in a case where a subject with a similar appearance abruptly enters the image capture angle of view.

As described above, the image recognition unit 121 receives the bird's-eye view image of the bird's-eye view camera 300 as an input and performs inference processing using the inference model for subject detection, thereby outputting the coordinate position of each subject and storing it in the volatile memory 102. Also, the image recognition unit 121 inputs the coordinate information POSITION of the subject that is the inference result of the inference model for subject detection and the bird's-eye view image of the bird's-eye view camera 300 to the inference model for subject specifying, and performs inference processing. The image recognition unit 121 outputs the identification information ID and the feature information STAT as the result of the inference processing, and stores these in the volatile memory 102.

Referring back to FIG. 4A, in step S103, the control unit 101 executes the function of the subject of interest decision unit 122 shown in FIG. 3, and advances the process to step S104.

The subject of interest decision unit 122 decides a subject of interest MAIN_SUBJECT from operation information input by the user via the operation unit 106 and the coordinate information of each subject, which is a subject recognition result by the image recognition unit 121 read out from the volatile memory 102.

The control unit 101 displays, on the display unit 111 of the WS 100, the bird's-eye view image of the bird's-eye view camera 300 and the subject recognition result stored in the volatile memory 102. The control unit 101 selects a subject of interest from the subjects displayed as the subject recognition result by the user via the operation unit 106. For example, when the operation unit 106 is a mouse, the user can select one of the subjects displayed on the display unit 111 by clicking it. The control unit 101 stores the identification information ID corresponding to the subject of interest selected by the user in the volatile memory 102 as the subject of interest MAIN_SUBJECT.

In step S104, the control unit 101 executes the function of the tracking target decision unit 123 shown in FIG. 3, and advances the process to step S105.

The tracking target decision unit 123 decides a tracking subject SUBJECT_ID of the sub-camera 400 from the subject of interest MAIN_SUBJECT decided by the subject of interest decision unit 122.

The method of deciding the tracking subject of the sub-camera 400 will be described here.

The control unit 101 reads out the subject of interest MAIN_SUBJECT decided by the subject of interest decision unit 122 from the volatile memory 102, and decides the subject of interest MAIN_SUBJECT as the tracking subject SUBJECT_ID of the sub-camera 400. When the same subject as the subject of interest MAIN_SUBJECT selected by the user is set to the tracking subject SUBJECT_ID of the sub-camera 400, the sub-camera 400 can be controlled using the subject selected by the user as the tracking target.

The tracking subject decision method is not limited to the above-described method and, for example, the tracking subject may be decided using the information of the subject of interest MAIN_SUBJECT and the identification information ID read out from the volatile memory 102. For example, in a case where the bird's-eye view image of the bird's-eye view camera 300 includes a plurality of subjects, and a plurality of sub-cameras 400 are installed, one sub-camera may set the same subject as the subject of interest as the tracking target, and another sub-camera may set a subject different from the subject of interest as the tracking target. When the tracking subject is decided in this way, the plurality of subjects included in the bird's-eye view image of the bird's-eye view camera 300 can comprehensively be tracked for each sub-camera.

Also, the reference position information REF_POSI including the coordinate information POSITION, the identification information ID, and the sub-camera position of the subject may be read out from the volatile memory 102, and among subjects detected from the bird's-eye view image of the bird's-eye view camera 300, a subject closest to the sub-camera may be decided as the tracking subject. When the tracking subject is decided in this way, a subject that can readily be set in the angle of view from the position of the sub-camera can be decided as the tracking subject. The control unit 101 stores the thus decided tracking subject SUBJECT_ID in the volatile memory 102, and stores the identification information ID of the tracking subject before storage in the volatile memory 102 as a tracking subject ID in the past.

In step S105, the control unit 101 executes the function of the feature information decision unit 125, and transmits feature information corresponding to the tracking subject of the sub-camera 400 to the EB 200. Also, the control unit 101 executes the function of the tracking state decision unit 126, updates tracking state information STATE, stores it in the volatile memory 102, and advances the process to step S106.

The tracking state information STATE includes information of one of "tracking by the WS 100" and "tracking by the EB 200". "Tracking by the WS 100" indicates a state in which the WS 100 is tracking the tracking subject by controlling the sub-camera 400. "Tracking by the EB 200" indicates a state in which the EB 200 is tracking the tracking subject by controlling the sub-camera 400. Details of the process of step S105 will be described later.

In step S106, the control unit 101 reads out the tracking state information STATE from the volatile memory 102, and determines, based on the tracking state information STATE, whether it indicates "tracking by the WS 100" or "tracking by the EB 200". Upon determining that the tracking state information STATE indicates "tracking by the WS 100", the control unit 101 advances the process to step S107. Upon determining that the tracking state information STATE indicates "tracking by the EB 200", the control unit 101 returns the process to step S101.

In step S107, the control unit 101 executes the function of the control information generation unit 124 shown in FIG. 3, and advances the process to step S108.

The control information generation unit 124 calculates a pan value/tilt value PT VALUE of the sub-camera 400 to track the tracking subject SUBJECT_ID decided by the tracking target decision unit 123 by the sub-camera 400. The control unit 101 reads out, from the volatile memory 102, the coordinate information of the sub-camera 400 on the plane coordinate system included in the reference position information REF_POSI and the coordinate information POSITION of the detected subject. The control unit 101 then calculates, from the coordinate information of the subject corresponding to the tracking subject SUBJECT_ID, the pan value/tilt value with which the image capture direction of the sub-camera 400 is the direction of the tracking subject.

The pan value calculation method will be described here with reference to FIG. 7.

As shown in FIG. 7, an angle θ made by the extended line of the optical axis center of the sub-camera 400 and a line that connects the sub-camera 400 and the tracking subject SUBJECT_ID can be calculated by $$\theta = \tan^{-1}\frac{px - subx}{py - suby} \quad \text{(rad)} \tag{2}$$

In equation (2), px and py are the horizontal and vertical coordinates of the position of the tracking subject, and subx and suby are the horizontal and vertical coordinates of the position of the sub-camera 400. px and py can be obtained by referring to coordinate information corresponding to the tracking subject SUBJECT_ID from the coordinate information POSITION of the detected subject.

The control information generation unit 124 calculates the pan value of the sub-camera 400 based on the angle θ.

A tilt control value calculation method will be described next with reference to FIG. 8.

As shown in FIG. 8, defining the height of the optical axis of the sub-camera 400 as h1, an angle ρ made by the extended line of the optical axis center of the sub-camera 400 and a line extended to a height h2 of a predetermined part of the tracking subject (the height of the face when the subject is a person) can be calculated by $$L = \sqrt{(px - subx)^2 + (py - suby)^2} \tag{3}$$

$$\rho = \tan^{-1}\frac{h2 - h1}{L} \quad \text{(rad)} \tag{4}$$

In equation (4), h1 is the height of the sub-camera 400 from the ground surface, and h2 is the height from the ground surface to a predetermined part of the tracking subject (the face when the subject is a person). h1 and h2 may be held in the volatile memory 102 in advance, or may be measured in real time using a sensor (not shown).

The control information generation unit 124 calculates the tilt control value of the sub-camera 400 based on the angle ρ.

Note that the pan value/tilt value may be a speed value to direct the sub-camera 400 toward the tracking subject. As for the method of calculating the pan value/tilt value, first, the control unit 101 obtains the current pan value/tilt value of the sub-camera 400 from the EB 200. Next, the control unit 101 obtains the angular velocity of pan proportional to the difference to the pan value 0 read out from the volatile memory 102. In addition, the control unit 101 obtains the angular velocity of tilt proportional to the difference to the tilt control value p read out from the volatile memory 102. The control unit 101 then stores the calculated control values in the volatile memory 102.

In step S108, the control unit 101 reads out the pan value/tilt value from the volatile memory 102, converts these into a control command in accordance with a predetermined protocol for controlling the sub-camera 400, stores it in the volatile memory 102, and advances the process to step S109.

In step S109, the control unit 101 transmits the control command according to the pan value/tilt value calculated in step S108 to the sub-camera 400 via the communication unit 105, and returns the process to step S101.

The basic operation of the WS 100 has been described above.

The functions and the basic operation of the EB 200 will be described next with reference to FIGS. 3 and 4B.

In step S201, the control unit 201 transmits an image capture command to the sub-camera 400 via the communication unit 205, receives a captured sub-image from the sub-camera 400, stores it in the volatile memory 202, and advances the process to step S202.

In step S202, the control unit 201 executes the function of the image recognition unit 221 shown in FIG. 3, and advances the process to step S203.

The image recognition unit 221 has the same function as the image recognition unit 121 of the WS 100.

The control unit 201 inputs, by the inference unit 204, the sub-image of the sub-camera 400 read out from the volatile memory 202 to a learned model created by performing machine learning such as deep learning, and performs inference processing. The inference result includes the coordinate information POSITION and feature information STAT_SUB[m] of each subject detected from sub-image of the sub-camera 400 and the identification information ID of each subject, and is stored in the volatile memory 202. Note that the learned model used for inference processing of the image recognition unit 221 is a model common to the learned model used by the image recognition unit 121 of the WS 100 (an inference model for subject detection and an inference model for subject specifying).

In step S203, the control unit 201 receives the feature information STAT of the subject from the WS 100 via the communication unit 205, and collates it with the feature information STAT_SUB calculated from the sub-image of the sub-camera 400 using the function of the tracking target decision unit 222 shown in FIG. 3. When a subject whose feature information STAT and feature information STAT_SUB have a high similarity exists in the image capture angle of view of the sub-camera 400, the control unit 201 decides the identification information ID of the subject as the identification information ID=SUBJECT_ID of the subject to be tracked by the sub-camera 400, stores it in the volatile memory 202, and advances the process to step S204. Details of the similarity calculation method will be described later.

In step S204, the control unit 201 performs, via the communication unit 205, tracking stop processing or confirmation of a communication state for continuing tracking for the WS 100 and processing according to communication contents, and advances the process to step S205. Details of the process of step S204 will be described later.

In step S205, the control unit 201 determines whether the information of the tracking subject SUBJECT_ID is stored in the volatile memory 202. Upon determining that the information of the tracking subject SUBJECT_ID is stored in the volatile memory 202, that is, the identification information ID of the tracking subject of the sub-camera 400 is stored in the volatile memory 202, the control unit 201 advances the process to step S206. Upon determining that the information of the tracking subject SUBJECT_ID is not stored in the volatile memory 202, that is, the identification information ID of the tracking subject of the sub-camera 400 is not stored in the volatile memory 202, the control unit 201 returns the process to step S201.

In step S206, the control unit 201 reads out the identification information ID of each subject, which is the subject recognition result in step S202, from the volatile memory 202, and determines whether the tracking subject SUBJECT_ID exists in the sub-image of the sub-camera 400. Upon determining that the tracking subject SUBJECT_ID exists in the sub-image, the control unit 201 advances the process to step S207. Upon determining that the tracking subject SUBJECT_ID does not exist (disappears), the control unit 201 returns the process to step S201.

In step S207, the control unit 201 executes the function of the control information generation unit 223 shown in FIG. 3, and advances the process to step S208.

The control information generation unit 223 has a function of calculating the pan value/tilt value of the sub-camera 400. The control unit 201 reads out the coordinate information POSITION and the tracking subject SUBJECT_ID of the subject from the volatile memory 202, and specifies the position of the current tracking subject corresponding to the tracking subject SUBJECT_ID. The control unit 201 reads out the position of the tracking subject in the past in the image capture angle of view from the volatile memory 202, performs calculation such that the angular velocity of pan becomes large when the difference between the current position of the tracking subject and the position of the tracking subject in the past is large in the horizontal direction, and performs calculation such that the angular velocity of tilt becomes large when the difference is large in the vertical direction. The control unit 201 stores the pan value/tilt value in the volatile memory 202.

In step S208, the control unit 201 converts the pan value/tilt value read out from the volatile memory 202 into a control command in accordance with a predetermined protocol for controlling the sub-camera 400, stores it in the volatile memory 202, and advances the process to step S209.

In step S209, the control unit 201 transmits the control command according to the pan value/tilt value calculated in step S208 to the sub-camera 400 via the communication unit 205, and returns the process to step S201.

The basic operation of the EB 200 has been described above.

As described above, the WS 100 performs image recognition processing for the bird's-eye view image of the bird's-eye view camera 300, and when the tracking state information STATE indicates "tracking by the WS 100", controls the pan operation/tilt operation of the sub-camera 400. When the tracking state information STATE indicates "tracking by the EB 200", the pan operation/tilt operation of the sub-camera 400 is not controlled. The EB 200 performs image recognition processing for the sub-image of the sub-camera 400, and when the tracking subject is set and detected from the sub-image, controls the pan operation/tilt operation of the sub-camera 400. When the tracking subject is not set, the pan operation/tilt operation of the sub-camera 400 is not controlled.

Also, the tracking state information STATE and the setting of the tracking subject are updated by control processing to be described later with reference to FIGS. 9A to 9C, thereby switching which one of the WS 100 and the EB 200 is to be used to control the sub-camera 400. Note that when the pan value/tilt value is transmitted by only one device controlling the sub-camera 400, and the pan value/tilt value is not transmitted during control by the other device, the communication amount can be decreased as compared to a case where the pan value/tilt value is transmitted for each of the processes shown in FIGS. 4A and 4B.

The operation of the bird's-eye view camera 300 upon receiving an image capture command from the WS 100 will be described next with reference to FIG. 4C.

In step S301, the control unit 301 receives an image capture command from the WS 100 via the communication unit 305, and advances the process to step S302.

In step S302, the control unit 301 starts image capture processing in accordance with reception of the image capture command by the communication unit 305, and advances the process to step S303. The control unit 301 captures an image by the image capture unit 306, and stores, in the volatile memory 302, image data generated by performing predetermined image processing by the image processing unit 307.

In step S303, the control unit 301 reads out the image data from the volatile memory 302 and transmits it to the WS 100 via the communication unit 305

The operation of the bird's-eye view camera 300 has been described above.

The operation of the sub-camera 400 upon receiving a control command from the WS 100 or the EB 200 will be described next with reference to FIG. 4D.

In step S401, the control unit 401 receives a control command via the communication unit 405, stores the control command in the volatile memory 402, and advances the process to step S402.

In step S402, the control unit 401 reads out the pan value/tilt value from the volatile memory 402 in accordance with reception of the control command from the communication unit 405, and advances the process to step S403.

In step S403, the control unit 401 calculates driving parameters for controlling the pan operation/tilt operation at a desired speed in a desired direction based on the pan value/tilt value read out from the nonvolatile memory 403, and advances the process to step S404. The driving parameters are parameters for controlling actuators in the pan/tilt direction included in the PTZ driving unit 409, and the pan value/tilt value included in the control command is converted into the driving parameters by looking up a conversion table stored in the nonvolatile memory 403.

In step S404, the control unit 401 controls the optical unit 408 by the PTZ driving unit 409 based on the driving parameters obtained in step S403, thereby changing the image capture direction of the sub-camera 400. The PTZ driving unit 409 drives the optical unit 408 in the pan/tilt direction based on the driving parameters, thereby changing the image capture direction of the sub-camera 400.

The operation of the sub-camera 400 has been described above.

Control processing of the WS 100 will be described next with reference to FIG. 9A.

FIG. 9A shows control processing of the WS 100, and shows the detailed process of step S105 shown in FIG. 4A.

A part of the processing shown in FIG. 9A is implemented by the control unit 101 executing the function of the tracking state decision unit 126 shown in FIG. 3.

The tracking state decision unit 126 has a function of updating the tracking state information STATE stored in the volatile memory 102.

In step S110, the control unit 101 reads out, from the volatile memory 102, the tracking subject SUBJECT_ID of the sub-camera 400 calculated in step S104 of FIG. 4A and the identification information ID indicating the tracking subject in the past. The control unit 101 then compares the identification information ID with the identification information read out from the volatile memory 102 and determines whether the tracking subject of the sub-camera 400 is changed. Upon determining that the tracking subject of the sub-camera 400 is changed, the control unit 101 advances the process to step S111. Upon determining that the tracking subject of the sub-camera 400 is not changed, the control unit 101 advances the process to step S113.

In step S111, the control unit 101 transmits a tracking stop command to the EB 200 via the communication unit 105, and advances the process to step S112.

In step S112, the control unit 101 executes the function of the tracking state decision unit 126 shown in FIG. 3, and changes the tracking state information STATE to "tracking by the WS 100".

When the tracking subject of the sub-camera 400 is changed, the possibility that the tracking subject does not exist (disappears) in the image capture angle of view of the sub-camera 400 is high. In this case, the processes of steps S111 and S112 are performed, and the WS 100 controls the sub-camera 400 based on the bird's-eye view image of the bird's-eye view camera 300 in place of the sub-camera 400.

In step S113, the control unit 101 reads out the tracking state information STATE from the volatile memory 102, and determines, based on the tracking state information STATE, whether it indicates "tracking by the WS 100" or "tracking by the EB 200". Upon determining that the tracking state information STATE indicates "tracking by the WS 100", the control unit 101 advances the process to step S117. Upon determining that the tracking state information STATE indicates "tracking by the EB 200", the control unit 101 returns the process to step S114.

In step S114, the control unit 101 transmits a tracking continuation confirmation request to the EB 200 via the communication unit 105, and inquires whether tracking of the tracking subject by the EB 200 can be continued. A response from the EB 200 is "tracking continuation OK" or "tracking continuation NG". Upon receiving a notification of "tracking continuation OK" from the EB 200, the control unit 101 returns the process to step S101. Upon receiving a notification of "tracking continuation NG" from the EB 200, the control unit 101 advances the process to step S115.

In step S115, the control unit 101 transmits the tracking stop command to the EB 200 via the communication unit 105, and advances the process to step S116.

In step S116, the control unit 101 executes the function of the tracking state decision unit 126 shown in FIG. 3, updates the tracking state information STATE to "tracking by the WS 100", and ends the processing.

By performing the processes of steps S114 to S116, even if the EB 200 cannot perform tracking any more in a case where the tracking state is "tracking by the EB 200", tracking can be continued by the WS 100.

In step S117, the control unit 101 determines whether the tracking subject exists in the image capture angle of view of the sub-camera 400. Upon determining that the tracking subject exists in the image capture angle of view of the sub-camera 400, the control unit 101 advances the process to step S118. Upon determining that the tracking subject does not exist (disappears) in the image capture angle of view of the sub-camera 400, the control unit 101 ends the processing.

Whether the tracking subject exists in the image capture angle of view of the sub-camera 400 can be determined by comparing the current pan value/tilt value the control unit 101 obtained from the sub-camera 400 with the new pan value/tilt value calculated in step S107 of FIG. 4A.

When the current pan value/tilt value is sufficiently close to the new pan value/tilt value, it can be determined that the tracking subject exists in the image capture angle of view of the sub-camera 400. Alternatively, when the speed value of pan/tilt calculated in step S108 is sufficiently small, the current pan value/tilt value is close to the new pan value/tilt value, and therefore, it can be determined that the tracking subject exists in the image capture angle of view of the sub-camera 400.

In step S118, the control unit 101 decides the presence/absence of trimming for the bird's-eye view image and a subject region to perform trimming processing by obtaining image capture information from the sub-camera 400, and advances the process to step S119. Details of trimming processing will be described later. The description will be continued here assuming that trimming processing is not to be performed for the sake of simplicity of explanation.

In step S119, the control unit 101 executes the function of the feature information decision unit 125 shown in FIG. 3, and advances the process to step S120.

The feature information decision unit 125 has a function of deciding the feature information of the tracking subject of the sub-camera 400, that is, the feature information of the subject to be transmitted to the EB 200. The feature information decision unit 125 reads out, from the volatile memory 102, the feature information STAT[n] of the subject detected by the image recognition unit 121 from the bird's-eye view image of the bird's-eye view camera 300. Also, the feature information decision unit 125 reads out, from the volatile memory 102, the identification information SUBJECT_ID of the tracking subject decided by the tracking target decision unit 123. The feature information decision unit 125 decides feature information STAT[i] corresponding to the tracking subject among the pieces of feature information STAT[n], and stores it in the volatile memory 102. i is an index indicating the tracking subject.

In step S120, the control unit 101 transmits a tracking start command and the feature information STAT[i] of the tracking subject to the EB 200 via the communication unit 105, and advances the process to step S121.

By the processes of steps S117 to S120, only when the possibility that the tracking subject exists in the image capture angle of view of the sub-camera 400 is high, the tracking start command and the feature information of the tracking subject can be transmitted to the EB 200. Hence, the communication amount can be decreased as compared to a case where the information is transmitted for each of the processes shown in FIGS. 4A and 9A.

In step S121, the control unit 101 receives the collation result of the subjects from the EB 200 via the communication unit 105. Upon receiving, from the EB 200, matching information indicating that the subjects match, the control unit 101 advances the process to step S122. Upon receiving non-matching information indicating that the subjects do not match, the control unit 101 ends the processing.

In step S122, the control unit 101 executes the function of the tracking state decision unit 126 shown in FIG. 3, changes the tracking state information STATE to "tracking by the EB 200", and ends the processing.

Control processing of the EB 200 will be described next with reference to FIGS. 9B, 9C, and 10A to 10F.

Figure 9B:
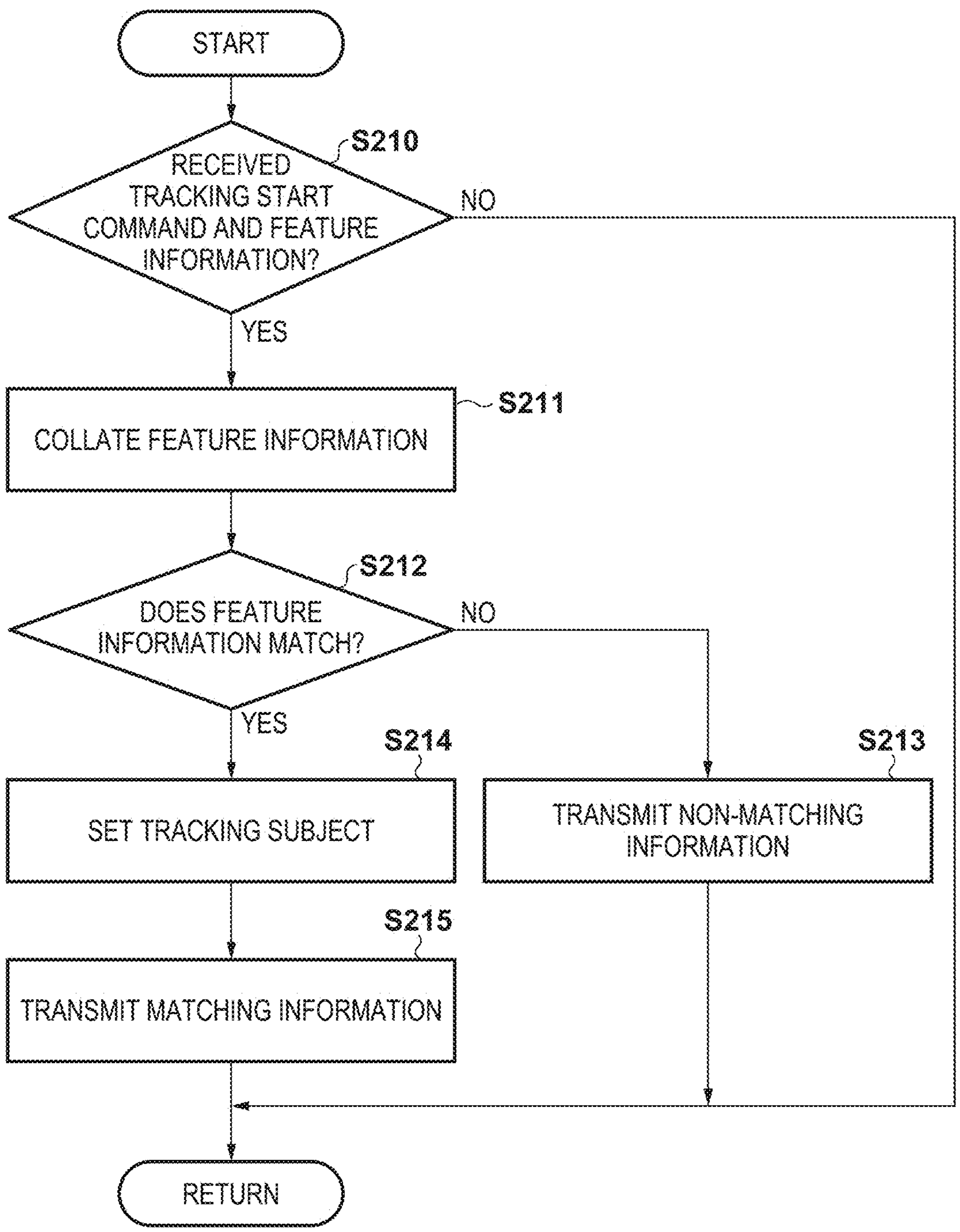

FIG. 9B shows control processing of the EB 200, and shows the detailed process of step S203 shown in FIG. 4B.

In step S210, the control unit 201 determines whether a tracking start command and the feature information STAT[i] of the tracking subject obtained from the bird's-eye view image of the bird's-eye view camera 300 are received from the WS 100 via the communication unit 205. When a tracking start command and the feature information STAT[i] of the tracking subject are received from the WS 100, the control unit 201 advances the process to step S211. When a tracking start command and the feature information STAT[i] of the tracking subject are not received, the control unit 201 ends the processing.

In steps S211 to S214, the control unit 201 executes the function of the tracking target decision unit 222 shown in FIG. 3, and determines whether the feature information STAT[i] received from the WS 100 and the feature information STAT_SUB[m] obtained from the sub-image of the sub-camera 400 satisfy a predetermined condition.

The tracking target decision unit 222 has a function of calculating a similarity from the feature information STAT[i] received from the WS 100 and the feature information STAT_SUB[m] obtained from the sub-image of the sub-camera 400. Also, the tracking target decision unit 222 has a function of comparing a threshold stored in the volatile memory 202 with the similarity of the feature information and storing the comparison result in the volatile memory 202.

For example, if two persons exist in the sub-image of the sub-camera 400, the tracking target decision unit 222 calculates the similarity between each of pieces of feature information (STAT_SUB[1] and STAT_SUB[2]) of the two persons and the feature information STAT[i] received from the WS 100. The similarity is calculated as the cosine similarity between feature information vectors, and a value of 0 to 1 is obtained as a similarity. The control unit 201 stores the similarities calculated for m subjects in the volatile memory 202.

In step S211, the control unit 201 executes the function of the tracking target decision unit 222 shown in FIG. 3, performs collation processing of feature information, and advances the process to step S212.

In step S212, the control unit 201 determines, in accordance with the collation result of step S211, whether there exist subjects having a high similarity between feature information. Existence of subjects having a high similarity between feature information means that the bird's-eye view camera 300 and the sub-camera 400 capture the same subject. Upon determining that there exist subjects having a high similarity between feature information, the control unit 201 advances the process to step S214. Upon determining that there does not exist subjects having a high similarity between feature information, the control unit 201 advances the process to step S213.

The control unit 201 reads out a predetermined threshold from the volatile memory 202. As a predetermined condition, when the similarity is equal to or larger than the threshold, or when there exists a subject with a higher similarity, or when subjects match, the control unit 201 determines that there exist subjects having a high similarity between feature information, and stores the identification information ID of the subject in the volatile memory 202.

In addition, the control unit 201 updates information MATCH representing whether there exist subjects having a high similarity between feature information, and stores it in the volatile memory 202. In this embodiment, when the value of MATCH is 0, there does not exist subjects having a high similarity between feature information, that is, the subjects do not match between the bird's-eye view camera 300 and the sub-camera 400. When the value of MATCH is 1, there exist subjects having a high similarity between feature information, that is, the subjects match between the bird's-eye view camera 300 and the sub-camera 400.

When there exist subjects having a high similarity between feature information, the control unit 201 stores MATCH=1 in the volatile memory 202, and advances the process to step S214. When there does not exist subjects having a high similarity between feature information, the control unit 201 stores MATCH=0 in the volatile memory 202, and advances the process to step S213.

The similarity between the pieces of feature information of subjects detected from the bird's-eye view image of the bird's-eye view camera 300 and the sub-image of the sub-camera 400 will be described here with reference to FIGS. 10A to 10F.

Figure 10A:
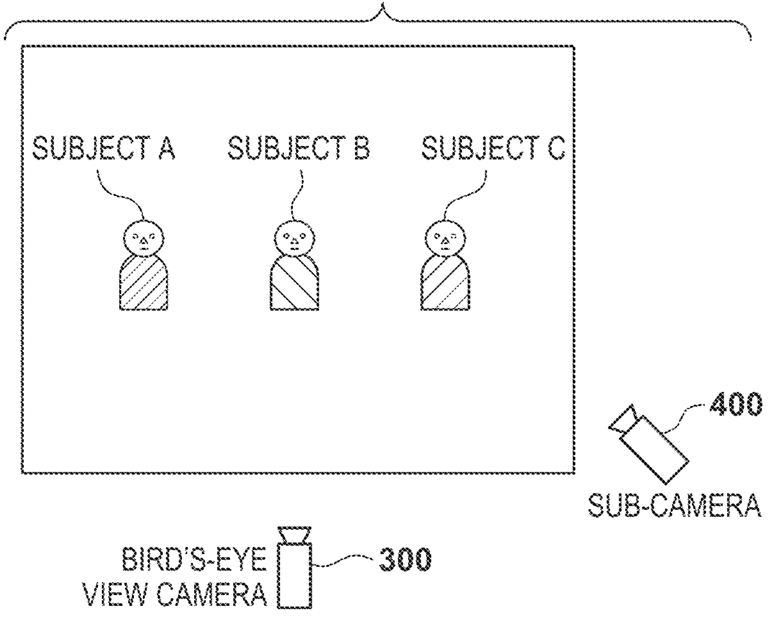
FIGS. 10A to 10F are views illustrating a tracking target subject decision method according to the first embodiment.
Figure 10B:
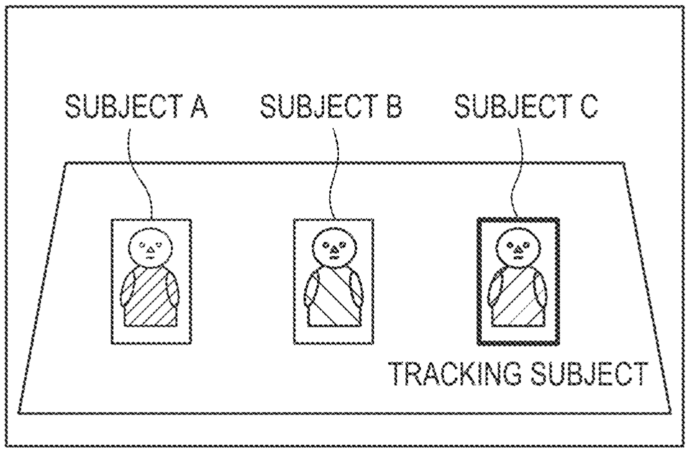

FIG. 10A shows the positional relationship between the image capture position and the image capture direction of the bird's-eye view camera 300 and the image capture position and the image capture direction of the sub-camera 400. FIG. 10B shows subjects detected from the bird's-eye view image of the bird's-eye view camera 300 and a tracking subject.

Figure 10C:
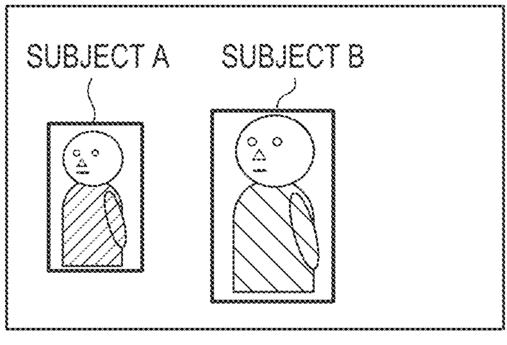
Figures 10D, 10E, 10F:
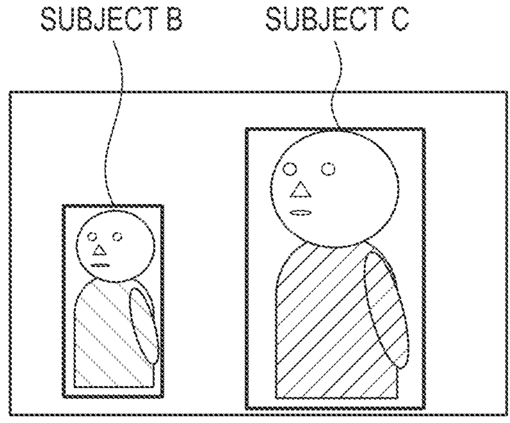

Assume that the subject A, the subject B, and the subject C are detected from the bird's-eye view image of the bird's-eye view camera 300, and the tracking subject of the sub-camera 400 is the subject C. Feature information of the tracking subject of the sub-camera 400, which is transmitted from the sub-camera 400 to the WS 100, is information corresponding to the subject C. FIGS. 10C and 10E each show the sub-image of the sub-camera 400, and FIGS. 10D and 10F each show the similarity between the feature information of the tracking subject of the sub-camera 400 and the feature information of each subject detected from the sub-image.

As shown in FIG. 10C, when the sub-camera 400 is capturing the subject A and the subject B, the similarity between the feature information of the subject C in the bird's-eye view image of the bird's-eye view camera 300 and the feature information of the subject A or the subject B in the sub-image of the sub-camera 400 is calculated. As shown in FIG. 10D, the similarity between the feature information of the subject C in the bird's-eye view image of the bird's-eye view camera 300 and the feature information of the subject A or the subject B in the sub-image of the sub-camera 400 is low. In this case, for example, when the threshold of the similarity of a subject is 0.7, both the subject A and the subject B obtain a result of non-matching.

As shown in FIG. 10E, when the sub-camera 400 is capturing the subject B and the subject C, the similarity between the feature information of the subject C in the bird's-eye view image of the bird's-eye view camera 300 and the feature information of the subject B or the subject C in the sub-image of the sub-camera 400 is calculated. Since the image capture position and the image capture direction of the camera are different between the subject C in the bird's-eye view image of the bird's-eye view camera 300 and the subject C in the sub-image of the sub-camera 400, forms in the images are also different.

For example, when the subject C has its face or body facing the bird's-eye view camera 300, the subject C faces front in the bird's-eye view image of the bird's-eye view camera 300 but substantially turns sideways in the sub-image of the sub-camera 400. The inference model for subject specifying in each of the image recognition unit 121 of the WS 100 and the image recognition unit 221 of the EB 200 is a model that learns images obtained by capturing the same subject from a plurality of different directions. For this reason, when the same subject is captured by a plurality of cameras with different image capture positions or image capture directions, forms in the captured images are different, but the similarity between feature information is high.

That is, as shown in FIG. 10F, the similarity between the feature information of the subject C in the bird's-eye view image of the bird's-eye view camera 300 and the feature information of the subject C in the sub-image of the sub-camera 400 is high. Hence, when the threshold of the similarity of a subject is 0.7, the subject B obtains a result of non-matching, and the subject C obtains a result of matching. Hence, the subject C can be determined as the same subject.

Referring back to FIG. 9B, in step S213, the control unit 201 reads out MATCH=0 from the volatile memory 202, transmits it to the WS 100 via the communication unit 205, and ends the processing.

In step S214, the control unit 201 reads out the identification information ID of the subject for which the highest similarity is calculated from the volatile memory 202, stores it as the tracking subject SUBJECT_ID in the volatile memory 202, and advances the process to step S215. When the subject for which the highest similarity is calculated is selected, for example, even if subjects with similar clothing exist, the most likely subject among these can be obtained as the tracking target.

In step S215, the control unit 201 reads out MATCH=1 from the volatile memory 202, transmits it to the WS 100 via the communication unit 205, and ends the processing.

Figure 9C:
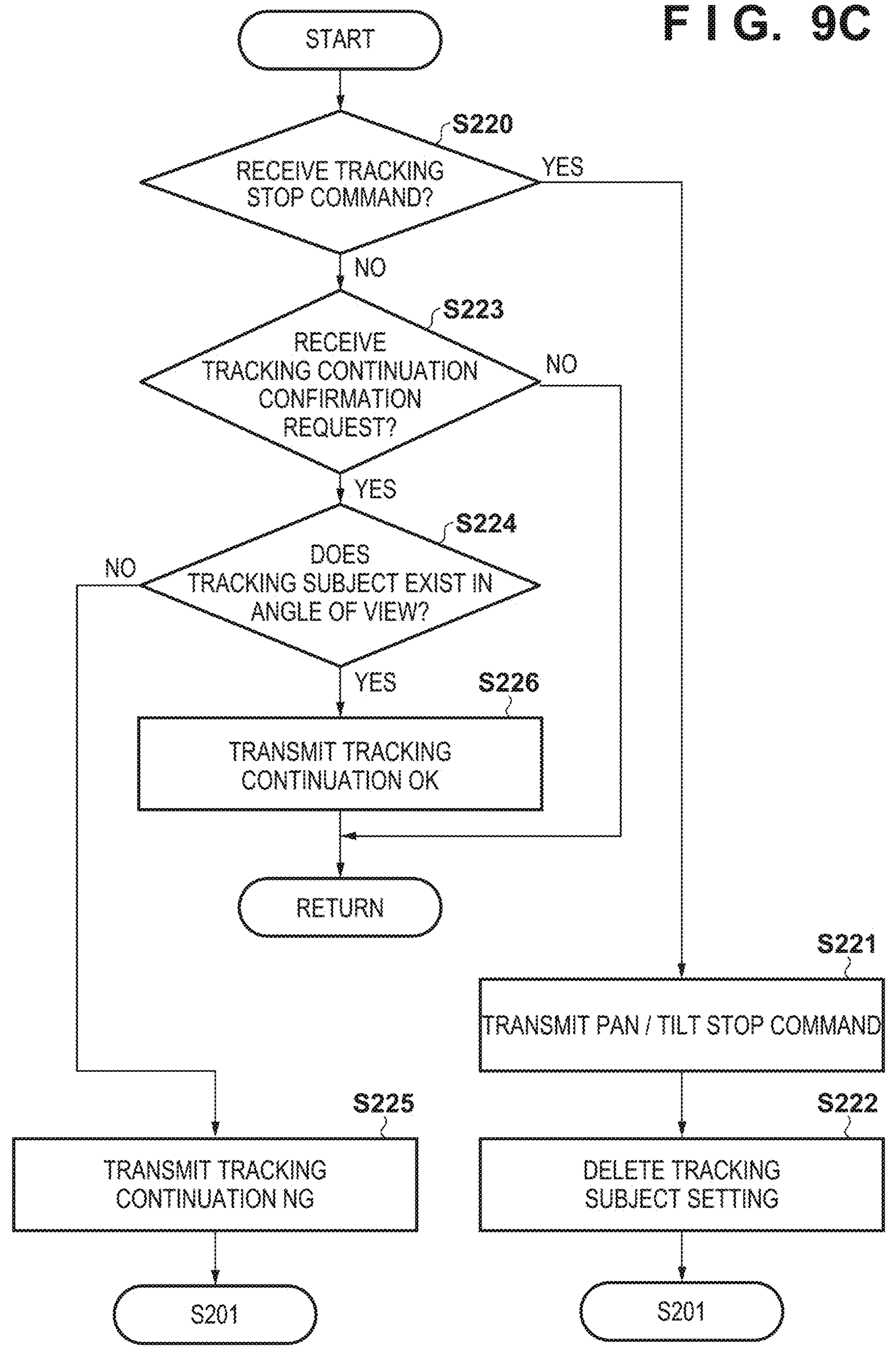

FIG. 9C shows control processing of the EB 200, and shows the detailed process of step S204 shown in FIG. 4B.

In step S220, the control unit 201 determines whether a tracking stop command is received from the WS 100 via the communication unit 205. When a tracking stop command is received from the WS 100, the control unit 201 advances the process to step S221. When a tracking stop command is not received, the control unit 201 advances the process to step S223.

In step S221, the control unit 201 transmits a control command for stopping the pan operation/tilt operation to the sub-camera 400 via the communication unit 305, and advances the process to step S222.

In step S222, the control unit 201 deletes the tracking subject SUBJECT_ID stored in the volatile memory 202, and returns the process to step S201.

In step S223, the control unit 201 determines whether a tracking continuation confirmation request is received from the WS 100 via the communication unit 205. When a tracking continuation confirmation request is received from the WS 100, the control unit 201 advances the process to step S224. When a tracking continuation confirmation request is not received, the control unit 201 ends the processing.

In step S224, the control unit 201 reads out the subject recognition result by the image recognition unit 221 from the volatile memory 202, and determines whether the tracking subject SUBJECT_ID is detected. Upon determining that the tracking subject SUBJECT_ID is detected by the image recognition unit 221, the control unit 201 advances the process to step S226. When the tracking subject SUBJECT_ID is not detected, the control unit 201 advances the process to step S225.

In step S225, the control unit 201 transmits "tracking continuation NG" to the WS 100 via the communication unit 205, and returns the process to step S201.

In step S226, the control unit 201 transmits "tracking continuation OK" to the WS 100 via the communication unit 205, and ends the processing.

Detailed control processing of the EB 200 has been described above.

Trimming processing in step S118 of FIG. 9A will be described next. FIGS. 11A to 11D are views illustrating the relationship between the tracking target subject and the image capture angle of view, and a method of calculating a trimming amount of a bird's-eye view image, with which the tracking subject size in the bird's-eye view image and the tracking subject size in the sub-image match, will be described. In this embodiment, an example in which control is performed based on the size in the vertical direction as the size of the tracking subject will be described.

Figure 11A:
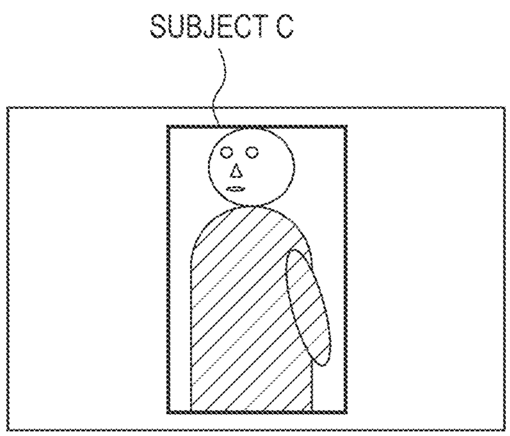
FIGS. 11A to 11D are views illustrating the relationship between a tracking target subject and an image capture angle of view.
Figure 11B:
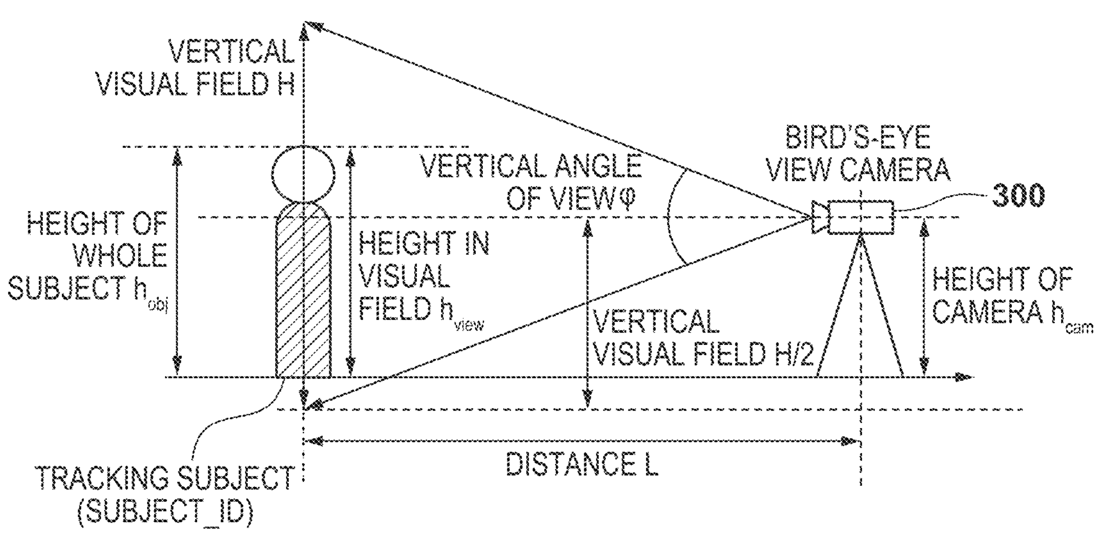
Figure 11C:
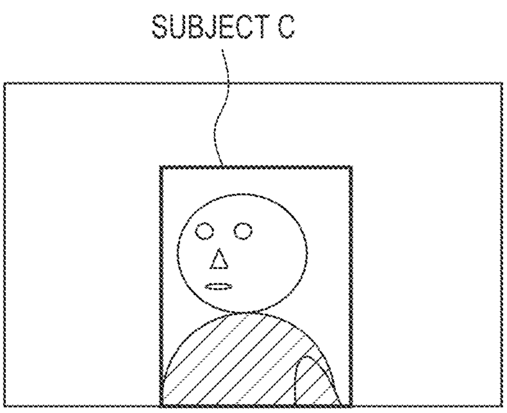

In a state in which in the bird's-eye view image of the bird's-eye view camera 300, the whole subject C is fitted in the image capture angle of view of the bird's-eye view camera 300, as shown in FIG. 11A, but like the sub-image of the sub-camera 400 shown in FIG. 11C, only a part of the subject C is in the image capture range (a part of the subject is out of the image capture angle of view (the subject is partially out of sight)), the similarity between the feature information of the tracking subject extracted from the bird's-eye view image of the bird's-eye view camera 300 and the feature information of the tracking subject extracted from the sub-image of the sub-camera 400 may lower. For example, this is like a case where the feature information of the whole body of a person is extracted as the tracking subject from the bird's-eye view image of the bird's-eye view camera 300, but the feature information of only the face of the tracking subject is extracted from the sub-image of the sub-camera 400.

When the difference between the size of the tracking subject in the bird's-eye view image of the bird's-eye view camera 300 (to be referred to as the tracking subject size in the bird's-eye view image hereinafter) and the size of the tracking subject in the sub-image of the sub-camera 400 (to be referred to as the tracking subject size in the sub-image hereinafter) is large, the similarity of feature information described with reference to FIG. 10F may lower, and a subject that should match may be determined as non-match.

In this embodiment, when the difference between the tracking subject size in the bird's-eye view image and the tracking subject size in the sub-image is large, the trimming amount of the bird's-eye view image is controlled such that the tracking subject size in the bird's-eye view image and the tracking subject size in the sub-image are close to each other. Since this makes a subject tend not to fall out of sight, lowering of the similarity of feature information when the subject falls out of sight can be reduced.

Figure 11D:
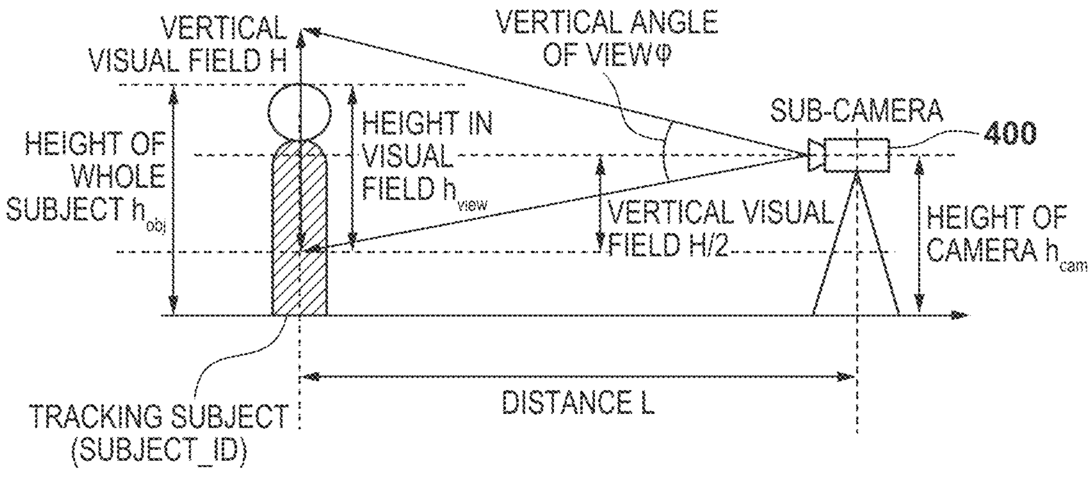

FIG. 11B shows the relationship between the tracking subject and the image capture angle of view of the bird's-eye view camera 300. FIG. 11D shows the relationship between the tracking subject and the image capture angle of view of the sub-camera 400. In FIGS. 11B and 11D, let hcam be the height of the camera, ϕ be the vertical angle of view, H be the vertical visual field, L be the distance to the tracking subject, and hobj be the height of the whole subject (the actual height of the subject in a real space). In FIG. 11B, at the position of the subject, the vertical visual field H includes the ground. For this reason, when the height hobj of the whole subject is less than the vertical visual field H, a state in which a part of the subject is out of the angle of view does not occur. In FIG. 11D, sine the vertical visual field H does not reach the ground at the position of the subject, a part of the subject is out of the angle of view. In FIGS. 11B and 11D, a height hview of the subject in the vertical visual field, which is the tracking subject size in the bird's-eye view camera 300 and the sub-camera 400, can be calculated by $$h_{view} = \begin{cases} h_{obj} - \left(h_{cam} - \frac{H}{2}\right) & \text{if } \quad h_{cam} - \frac{H}{2} \geq 0, \\ h_{obj} & \text{if } h_{cam} - \frac{H}{2} < 0. \end{cases} \tag{5}$$

In this embodiment, the trimming amount is decided from the relationship between the size information hview of the subject in the vertical visual field H and the size information hobj of the whole subject in equation (5). This makes it possible to decide a subject region used to calculate feature information in accordance with the size information of the subject in the vertical visual field H.

Figure 12:
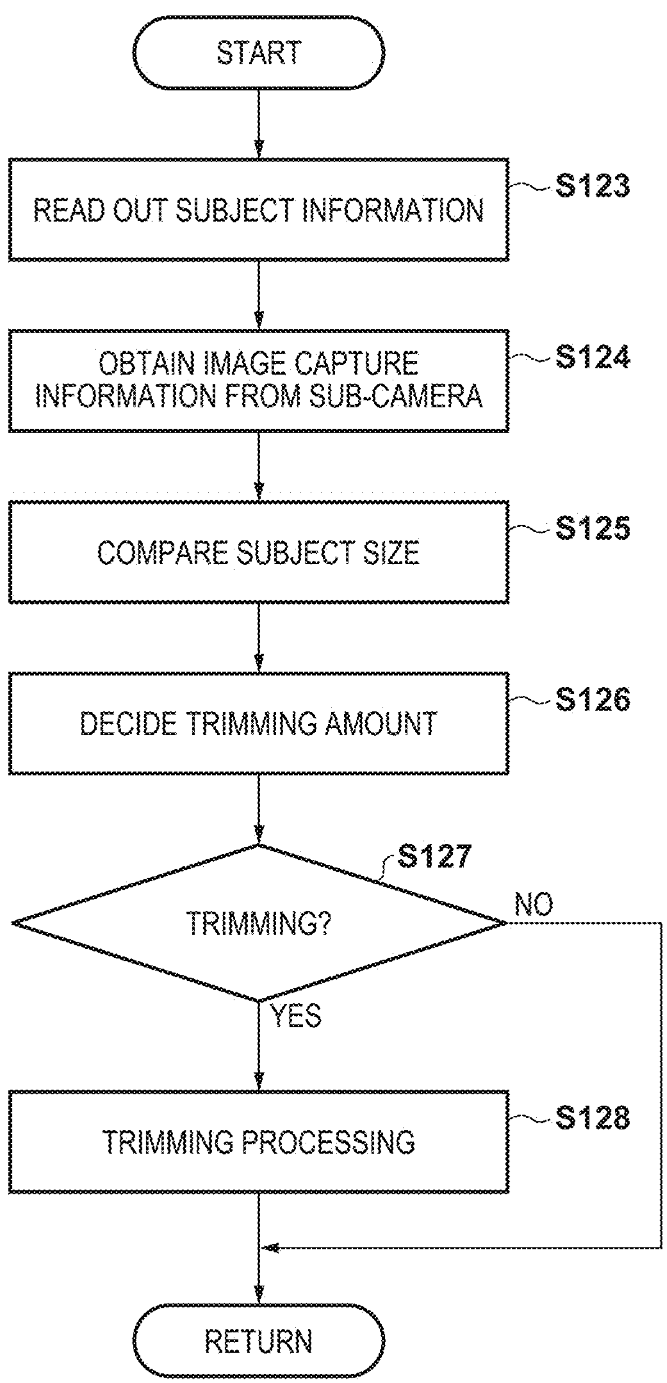
FIG. 12 is a flowchart exemplifying trimming processing according to the first embodiment.

FIG. 12 exemplarily shows trimming processing in step S118 of FIG. 9A.

In step S123, the control unit 101 reads out subject information from the volatile memory 102. The subject information is the height hobj of the whole subject described with reference to FIGS. 11A to 11D. The subject information is set in advance by a user operation via the operation unit 106 or a setting instruction via the communication unit 105, and stored in the volatile memory 102. Note that the subject information may be read out from the volatile memory 102 or the nonvolatile memory 103 such that it is automatically selected in accordance with the type of the subject. The control unit 101 stores the subject information in the volatile memory 102, and advances the process to step S124.

In step S124, the control unit 101 obtains image capture information from the bird's-eye view camera 300 and the sub-camera 400 via the communication unit 105. The image capture information is information used to calculate the vertical visual field H shown in FIGS. 11B and 11D. The vertical visual field H can be calculated by equations (6) and (7) below. The distance L can be calculated from equation (3) above, and the vertical angle ϕ of view can be calculated from a vertical direction size s of the image sensor of the bird's-eye view camera 300 and the sub-camera 400 and a focal length f at the time of information obtaining. Hence, the control unit 101 can calculate the vertical visual field H by obtaining the information of the vertical direction size s of the image sensor and the focal length f from the bird's-eye view camera 300 and the sub-camera 400.

$$H = 2L\tan\left(\frac{\varphi}{2}\right) \tag{6}$$

$$\varphi = 2\tan^{-1}\left(\frac{s}{2f}\right) \tag{7}$$

The control unit 101 stores the subject information obtained from the bird's-eye view camera 300 and the sub-camera 400 in the volatile memory 102, and advances the process to step S125.

In step S125, the control unit 101 compares the size information hobj of the whole subject with the size information hview of the subject in the vertical visual field H. The control unit 101 reads out the information stored in steps S123 and S124 from the volatile memory 102, and calculates the vertical visual field H. Next, the control unit 101 calculates the height hview of the subject in the visual field using the vertical visual field H. The control unit 101 then calculates the ratio of the height hview of the subject to the height hobj of the subject, by equation (8) below, as a degree r of matching to the bird's-eye view image, stores the calculated degree r of matching to the bird's-eye view image in the volatile memory 102, and advances the process to step S126.

$$r = \frac{h_{view}}{h_{obj}} \tag{8}$$

In step S126, the control unit 101 decides the trimming amount based on a table read out from the nonvolatile memory 103 in accordance with the degree r of matching to the bird's-eye view image.

A method of deciding the table indicating the relationship between the degree r of matching and the trimming amount and the trimming amount will be described here with reference to FIGS. 13A to 13E.

In FIG. 13A, when the degree r of matching to the bird's-eye view image is ½ or more and 1 or less, it is determined that more than half of the whole subject is in the visual field, and the trimming amount is set to 0. When the degree r of matching to the bird's-eye view image is ⅓ or more and less than ½, it is determined that more than half of the whole subject is out of the visual field, and the trimming amount is set to ½ of the whole subject at maximum, as shown in FIG. 13B. When the degree r of matching to the bird's-eye view image is less than ⅓, it is determined that not less than ⅔ of the subject is out of the visual field, and the trimming amount is set up to ⅔ of the whole subject at maximum. In this embodiment, since the sub-camera 400 is capturing the face of a person as a subject, the direction of trimming is vertically upward direction with respect to the foot as a starting point.

Note that depending on the characteristic of the subject or the image capture method, a plurality of trimming directions may be set in consideration of the width of the subject in the horizontal direction. The trimming amount may be defined not as the degree r of matching to the bird's-eye view image but as a ratio according to the degree r of matching to the bird's-eye view image and thus dynamically calculated from the subject region. For example, a trimming amount T may be calculated by $$T = 1 - r\ (0 \le r \le 1) \tag{9}$$

The control unit 101 stores the thus decided trimming amount in the volatile memory 102, and advances the process to step S127.

In step S127, the control unit 101 determines, based on the result of trimming amount decision processing in step S126, whether to perform trimming. When the trimming amount decided in step S126 is not stored in the volatile memory 102, the control unit 101 determines not to perform trimming, ends the processing shown in FIG. 12, and advances the process to step S119 in FIG. 9A. When the trimming amount decided in step S126 is stored in the volatile memory 102, the control unit 101 determines to perform trimming, and advances the process to step S128.

In step S128, the control unit 101 performs, by the inference unit 104, subject detection using the above-described inference model for subject detection. That is, as shown in FIG. 6A, the coordinates of a rectangle bounding on the subject are obtained from the bird's-eye view image of the bird's-eye view camera 300. The control unit 101 performs, by the image processing unit 307, trimming processing as shown in FIGS. 13A to 13E for the bounding rectangle based on the trimming amount decided in step S126.

The image processing unit 307 generates a subject image by cutting out a portion out of the visual field from the whole subject, as shown in FIG. 11C, and inputs it to the image recognition unit 121. The control unit 101 stores, in the volatile memory 102, the coordinate information of the subject in the subject image that has undergone the trimming processing ends the processing shown in FIG. 12, and advances the process to step S119 in FIG. 9A. In this embodiment, the description will be made assuming that the trimming amount decided in step S126 is ½.

Referring back to FIG. 9A, in step S119, when there exists a subject image that has undergone the trimming processing in step S128, the control unit 101 reads out it from the volatile memory 102, and executes the function of the feature information decision unit 125. Using the subject image that has undergone the trimming processing as an input, the feature information STAT[n] of the subject and the identification information SUBJECT_ID of the tracking subject decided by the tracking target decision unit 123 are read out from the volatile memory 102. The control unit 101 decides STAT[i] corresponding to the tracking subject among the pieces of feature information STAT[n], stores it in the volatile memory 102, and advances the process to step S120.

By the processes of steps S123 to S128 in FIG. 12 and step S119 in FIG. 9A, the feature information of a part of the subject that has undergone the trimming processing can be calculated. The control unit 201 of the EB 200 receives the feature information of the part of the subject that has undergone the trimming processing from the WS 100, and performs the same processing as in FIG. 4B. The control unit 201 of the EB 200 then compares the feature information with the feature information of the subject detected by the sub-camera 400 in a state in which a part of the subject is out of the visual field of the sub-camera 400, as shown in FIG. 11C.

For example, when the bird's-eye view image of the bird's-eye view camera 300 is the image shown in FIG. 13C, and the sub-image of the sub-camera 400 is the image shown in FIG. 13D, trimming processing is performed for the bird's-eye view image shown in FIG. 13C, thereby cutting out a subject portion on the upper side of a broken line portion. A state close to the subject image shown in FIG. 13D is obtained, and then, the feature information of the subject is calculated and compared with the feature information of the subject in the sub-image shown in FIG. 13D.

In the example shown in FIG. 13E, when trimming processing is not performed, the similarity of the feature information is 0.4. When trimming processing is performed using a trimming amount of ½, the similarity of the feature information is 0.8, and it is determined that the subjects match between the bird's-eye view image and the sub-image.

According to the above-described first embodiment, the same subject can be recognized by the plurality of cameras 300 and 400 having different image capture positions or image capture directions. Hence, it is possible to track a specific subject while appropriately switching between control of the sub-camera 400 by the WS 100 and control of the sub-camera 400 by the EB 200.

When the tracking subject does not exist (disappears) in the sub-image of the sub-camera 400, control of the sub-camera 400 by the WS 100 is performed. When the tracking subject exists in the image capture angle of view of the sub-camera 400, control of the sub-camera 400 can be transferred from the WS 100 to the EB 200. Also, when the tracking subject moves at a high speed and is lost, or when changing the tracking subject, tracking can be continued by controlling the sub-camera 400 by the WS 100.

Note that in the first embodiment, an example in which whether to transmit the pan value/tilt value from the WS 100 or the EB 200 to the sub-camera 400 is switched has been described, but the present invention is not limited to this example. For example, regardless of the tracking state, the pan value/tilt value may be transmitted from the WS 100 and the EB 200 to the sub-camera 400, and from which device the sub-camera 400 receives the pan value/tilt value used to perform the pan operation/tilt operation may be controlled. In this case, in the processing of the WS 100, the process of step S106 in FIG. 4A is omitted, and processing of transmitting the tracking state information STATE from the control unit 101 to the sub-camera 400 is added before the process of step S107 in FIG. 4A. In the processing of the EB 200, the processes of steps S205 and S206 in FIG. 4B and the process of step S221 in FIG. 9C are omitted.

When the tracking state information STATE received from the WS 100 indicates "tracking by the EB 200", the sub-camera 400 performs control to perform the pan operation/tilt operation in accordance with the control command received from the EB 200. When the tracking state information STATE received from the WS 100 indicates "tracking by the WS 100", the sub-camera 400 performs control to perform the pan operation/tilt operation in accordance with the control command received from the WS 100.

Second Embodiment

In the first embodiment, the feature information of the subject transmitted from the WS 100 to the EB 200 is one piece of feature information of the tracking subject. In the second embodiment, an example in which a WS 100 generates a plurality of candidates of feature information and transmits these to an EB 200, and the EB 200 collates the feature information will be described.

In the first embodiment, a trimming amount is decided by trimming processing shown in FIG. 12, and in step S119, feature information is calculated for the subject image that has undergone the trimming processing in step S119. In the second embodiment, a plurality of subject images that have undergone trimming processing based on a plurality of trimming amounts set in advance are created, and feature information is calculated from each subject image.

Differences from the first embodiment will mainly be described below.

The operation of the WS 100 will be described first.

The WS 100 executes trimming processing of step S118 in FIG. 9A independently of subject information obtained in step S123 and S124 of FIG. 12 or image capture information of a sub-camera 400.

In step S118, a control unit 101 creates subject images according to three patterns of trimming amounts in the table shown in FIG. 13A, and stores these in a volatile memory 102.

In step S119, the control unit 101 calculates the feature information of the three patterns of subject images created in step S118. In the first embodiment, one piece of feature information STAT[i] is decided in correspondence with a tracking subject. In the second embodiment, three pieces of feature information STAT[i][0], STAT[i][1], and STAT[i][2] are calculated for one subject. Note that the trimming amounts are not limited to the three patterns, and an arbitrary number of patterns may be set. For example, when there are p patterns of trimming amounts, and the number of detected subjects is n, (n×p) pieces of feature information are calculated. Hence, pieces of feature information STAT[i][0] to STAT[i][p−1] are calculated for a specific tracking subject SUBJECT_ID=i.

In step S120, the control unit 101 transmits a tracking start instruction and the feature information STAT[i][0] to STAT[i][2] to the EB 200 via a communication unit 105.

The operation of the EB 200 will be described next.

The second embodiment is different in receiving and collating a plurality of pieces of feature information in processing shown in FIG. 9B.

In step S210, a control unit 201 determines whether the tracking start command and the pieces of feature information STAT[i][0] to STAT[i][2] of the tracking subject in the bird's-eye view image of a bird's-eye view camera 300 are received from the WS 100 via a communication unit 205. Upon determining that the tracking start command and the pieces of feature information STAT[i][0] to STAT[i][2] of the tracking subject in the bird's-eye view image of the bird's-eye view camera 300 are received from the WS 100, the control unit 201 advances the process to step S211. When these are not received, the control unit 201 ends the processing.

In step S211, the control unit 201 executes the function of a tracking target decision unit 222 shown in FIG. 3. Unlike the first embodiment, the tracking target decision unit 222 collates the feature information STAT[i][0] to STAT[i][2] received in step S210 with feature information STAT_SUB.

In step S212, the control unit 201 determines, based on the result of collation in step S211, whether there exist subjects having a high similarity between feature information, as shown in FIG. 13E. Upon determining that there exist subjects having a high similarity between feature information, the control unit 201 advances the process to step S214. Upon determining that there does not exist subjects having a high similarity between feature information, the control unit 201 advances the process to step S213.

According to the above-described second embodiment, pieces of feature information according to a plurality of patterns of trimming amounts are calculated without using the subject information or the image capture information of the sub-camera 400, thereby obtaining the same effect as in the first embodiment.

Third Embodiment

In the first and second embodiments, trimming processing is performed for the bird's-eye view image, thereby making the feature information of the subject detected from the bird's-eye view image of the bird's-eye view camera 300 close to the feature information of the subject detected from the sub-image of the sub-camera 400.

In the third embodiment, an example in which when the pieces of feature information of a tracking subject do not match between a bird's-eye view camera 300 and a sub-camera 400, zoom control is performed such that a part of the subject is not out of the image capture angle of view of the sub-camera 400 will be described. When the image capture angle of view of the sub-camera 400 is changed, and the feature information of the subject is calculated again, the feature information of the whole subject can be obtained from the sub-image. This control is effective when placing greater importance on tracking the subject than changing image capture angle of view.

Control processing according to the third embodiment will be described with reference to FIGS. 14 and 15.

The processes of steps S110 to S122 in FIG. 14 are the same as the processes of steps S110 to S122 in FIG. 9A.

In step S121, when non-matching information representing that subjects do not match is received from an EB 200, a control unit 101 advances the process to step S130.

Zoom control of the sub-camera 400 in step S130 of FIG. 14 will be described here with reference to FIG. 15.

In step S134, the control unit 101 reads out subject information from a volatile memory 102, like step S123, and advances the process to step S135.

In step S135, the control unit 101 obtains image capture information from the bird's-eye view camera 300 and the sub-camera 400 via a communication unit 105, and advances the process to step S136.

In step S136, the control unit 101 calculates a zoom value of the sub-camera 400 with which the image capture angle of view of the sub-camera 400 is close to the image capture angle of view of the bird's-eye view camera 300 that is capturing the tracking subject. The control unit 101 calculates a vertical visual field H of the bird's-eye view camera 300 based on the information obtained in steps S134 and S135.

Next, the control unit 101 calculates a height hview of the subject in the visual field of the bird's-eye view camera 300 based on the vertical visual field H of the bird's-eye view camera 300. By equation (5) described above, the control unit 101 calculates the vertical visual field H of the sub-camera 400, with which the size information hview of the tracking subject in the vertical visual field H of the bird's-eye view camera 300 and the size information hview of the subject of the sub-camera 400 match.

Furthermore, the control unit 101 calculates a focal length f from the vertical visual field H of the sub-camera 400 and equations (6) and (7), and calculates a zoom value corresponding to the focal length f. The control unit 101 stores the zoom value in the volatile memory 102, and advances the process to step S137.

Note that the height hview of the subject in the visual field of the sub-camera 400 need not always equal the height hview of the subject in the visual field of the bird's-eye view camera 300, and these may be made closer (the difference is made smaller) than before processing. When a plurality of subjects exist in the image capture angle of view of the sub-camera 400, the control unit 101 selects a subject closest to the center of the angle of view as a tracking subject.

In step S137, the control unit 101 reads out, from the volatile memory 102, the zoom value calculated in step S136, the focal length f of the sub-camera 400 calculated in step S135, and a threshold stored in the volatile memory 102 in advance. The control unit 101 calculates the difference between a zoom value corresponding to the focal length f of the sub-camera 400 obtained in step S135 and the zoom value calculated in step S136. Upon determining that the calculated difference is smaller than the threshold, the control unit 101 advances the process to step S131 of FIG. 14. Upon determining that the calculated difference is equal to or larger than the threshold, the control unit 101 advances the process to step S138.

In step S138, the control unit 101 reads out the zoom value calculated in step S136 from the volatile memory 102, and transmits a zoom control command according to the zoom value from the WS 100 to the sub-camera 400 via the communication unit 105. Upon receiving the zoom control command via a communication unit 405, a control unit 401 of the sub-camera 400 controls a PTZ driving unit 409 such that the received zoom value is set.

This can make the image capture angle of view of the sub-camera 400 close to the image capture angle of view of the bird's-eye view camera 300 that is capturing the tracking subject, that is, make the state shown in FIG. 11C close to the state shown in FIG. 11D. Hence, the difference of the size of the tracking subject between the bird's-eye view image of the bird's-eye view camera 300 and the sub-image of the sub-camera 400 becomes small, and even in a case where the plurality of cameras are arranged with separate image capture positions or image capture directions, and a part of the subject is out of the image capture angle of view, or even in a case where the subject is too small, the specific subject can be tracked by cooperation of the plurality of cameras.

Note that trimming processing performed before the zoom processing can cope, to some extent, with a case where a part of the specific subject is out of the image capture angle of view in the captured image of one (normally, the sub-camera 400) of the bird's-eye view camera 300 and the sub-camera 400. However, for example, it is found by examinations of the present inventors that in a case where the whole body of the specific subject is captured small by the bird's-eye view camera 300, and the face of the same subject is captured by the sub-camera 400, the similarity of feature information may lower even if trimming processing is performed.

In this embodiment, when the subjects do not match yet even after trimming processing (NO in step S121), the possibility that the subjects match can be increased by performing zoom processing in a case where the same subject is being captured. Also, when the zoom value of the sub-camera 400 is changed only when the difference between the current zoom value of the sub-camera 400 and the zoom value of the sub-camera 400 with which the size information hview of the tracking subject in the vertical visual field H of the bird's-eye view camera 300 matches the size information hview of the subject of the sub-camera 400 exceeds a threshold, the image capture angle of view of the sub-camera 400 can be changed only when the difference of the subject size is so large that increases the possibility of affecting the determination of the similarity of feature information.

The control unit 101 ends the processing shown in FIG. 15 after transmission of the zoom control command, and advances the process to step S131.

The processes of steps S131 to S133 are the same as the processes of steps S119 to S121 in FIG. 9A.

According to the above-described third embodiment, the feature information of the whole subject can be obtained by controlling the image capture angle of view of the sub-camera 400 such that the subject is not out of the visual field.

Fourth Embodiment

In the first to third embodiments, an example in which the sub-camera 400 is controlled by one of the WS 100 and the EB 200 has been described. In the fourth embodiment, an example in which the EB 200 is omitted, and a WS 100 controls a sub-camera 400 based on the bird's-eye view image of a bird's-eye view camera 300 and the sub-image of the sub-camera 400 will be described.

In the fourth embodiment, the sub-camera 400 is controlled using one of a pan value/tilt value calculated based on the bird's-eye view image of the bird's-eye view camera 300 and a pan value/tilt value calculated based on the sub-image of the sub-camera 400.

The system configuration according to the fourth embodiment is obtained by omitting the EB 200 from the system configuration shown in FIG. 1, and the sub-image of the sub-camera 400 is input to the WS 100, unlike the first embodiment. The operation is the same as in the first embodiment, except the WS 100.

As the basic operation, the bird's-eye view camera 300 transmits a bird's-eye view image to the WS 100. The sub-camera 400 transmits a sub-image to the WS 100. Also, the sub-camera 400 has a PTZ function.

The WS 100 detects a subject from the bird's-eye view image of the bird's-eye view camera 300 and the sub-image of the sub-camera 400, and changes the image capture direction of the sub-camera 400 to the direction of the tracking subject based on a subject recognition result. The WS 100 controls the sub-camera 400 based on the subject recognition result of the bird's-eye view image of the bird's-eye view camera 300 until the image capture direction of the sub-camera 400 changes to the direction of the tracking subject.

After the image capture direction of the sub-camera 400 changes to the direction of the tracking subject, the WS 100 calculates the feature information of the tracking subject from the bird's-eye view image of the bird's-eye view camera 300, and calculates the feature information of the subject from the sub-image of the sub-camera 400. Based on these pieces of feature information, the WS 100 controls the sub-camera 400. The feature information is information capable of specifying that the subject is the same subject in a case where the same subject is captured by a plurality of cameras having different image capture positions and/or image capture directions.

According to the fourth embodiment, it is possible to control the sub-camera 400 and track the tracking subject based on the subject recognition result of one of the bird's-eye view image of the bird's-eye view camera 300 and the sub-image of the sub-camera 400.

The hardware configurations of the WS 100, the bird's-eye view camera 300, and the sub-camera 400 are the same as in FIGS. 2A and 2B of the first embodiment.

The functional configuration of the WS 100 configured to implement control processing according to this embodiment will be described first with reference to FIG. 16.

The function of the WS 100 is implemented by hardware and/or software. Note that when the function units shown in FIG. 16 are not implemented by software but configured by hardware, a circuit configuration corresponding to each function unit shown in FIG. 16 is provided.

The WS 100 includes an image recognition unit 121, a subject of interest decision unit 122, a tracking target decision unit 123, a control information generation unit 124, a feature information decision unit 125, a tracking state decision unit 126, an image recognition unit 127, and a tracking target decision unit 128. The pieces of software configured to implement these functions are stored in a nonvolatile memory 103, and a control unit 101 loads these into a volatile memory 102 and executes them.

The functions of the image recognition unit 121, the subject of interest decision unit 122, the tracking target decision unit 123, and the feature information decision unit 125 are the same as in FIG. 3 of the first embodiment.

First, the functions and the basic operation of the WS 100 will be described with reference to FIGS. 17 and 18.

The processes of steps S501 to S504 are the same as the processes of steps S101 to S104 in FIG. 4A of the first embodiment.

In step S505, the control unit 101 transmits an image capture command to the sub-camera 400 via a communication unit 105, receives a captured sub-image from the sub-camera 400, stores it in the volatile memory 102, and advances the process to step S506.

In step S506, the control unit 101 executes the function of the image recognition unit 127 shown in FIG. 16, and advances the process to step S507.

As for the function of the image recognition unit 127, in the description of the image recognition unit 221 of the EB 200 according to the first embodiment, the control unit 201 is replaced with the control unit 101, the volatile memory 202 is replaced with the volatile memory 102, and the nonvolatile memory 203 is replaced with the nonvolatile memory 103.

In step S507, the control unit 101 executes the functions of the tracking target decision unit 128 and the tracking state decision unit 126 shown in FIG. 16, collates feature information calculated in steps S502 and S506, and updates tracking state information STATE. Also, the control unit 101 stores a tracking subject SUBJECT_ID and the tracking state information STATE in the volatile memory 102, and advances the process to step S508.

The tracking state information STATE includes information of one of "tracking based on the bird's-eye view image" and "tracking based on the sub-image". "Tracking based on the bird's-eye view image" indicates a state in which the tracking subject is tracked by controlling the sub-camera 400 based on the subject recognition result of the bird's-eye view image of the bird's-eye view camera 300. "Tracking based on the sub-image" indicates a state in which the tracking subject is tracked by controlling the sub-camera 400 based on the subject recognition result of the sub-image of the sub-camera 400. Details of the process of step S507 will be described later.

The processes of steps S508 to S510 are executed by the function of the control information generation unit 124 shown in FIG. 16.

In step S508, the control unit 101 reads out the tracking state information STATE from the volatile memory 102, and determines, based on the tracking state information STATE, whether it indicates "tracking based on the bird's-eye view image" or "tracking based on the sub-image". Upon determining that the tracking state information STATE indicates "tracking based on the bird's-eye view image", the control unit 101 advances the process to step S510. Upon determining that the tracking state information STATE indicates "tracking based on the sub-image", the control unit 101 returns the process to step S509.

In step S509, the control unit 101 calculates the pan value/tilt value of the sub-camera 400 based on the subject recognition result of the sub-image of the sub-camera 400, and advances the process to step S511. As for the process of step S509, in the processing of the control information generation unit 223 shown in FIG. 3, the control unit 201 is replaced with the control unit 101, and the volatile memory 202 is replaced with the volatile memory 102.

In step S510, the control unit 101 calculates the pan value/tilt value of the sub-camera 400 based on the subject recognition result of the bird's-eye view image of the bird's-eye view camera 300, and advances the process to step S511. As for the process of step S510, in the processing of the control information generation unit 223 shown in FIG. 3, the control unit 201 is replaced with the control unit 101, and the volatile memory 202 is replaced with the volatile memory 102.

In step S511, the control unit 101 executes the function of the control information generation unit 124 shown in FIG. 3, and advances the process to step S512.

The processes of steps S511 and S512 are the same as the processes of steps S108 and S109 in FIG. 4A.

The basic operation of the WS 100 has been described above.

Control processing of the WS 100 will be described next with reference to FIG. 18.

FIG. 18 shows control processing of the WS 100, and shows the detailed process of step S507 shown in FIG. 17.

The process of step S520 is the same as the process of step S110 in FIG. 9A.

In step S521, the control unit 101 executes the function of the tracking state decision unit 126 shown in FIG. 16, and changes the tracking state information STATE to "tracking based on the image of the bird's-eye view camera".

The tracking state decision unit 126 has a function of updating the tracking state information STATE stored in the volatile memory 102.

In step S522, the control unit 101 reads out the tracking state information STATE from the volatile memory 102, and determines, based on the tracking state information STATE, whether it indicates "tracking based on the bird's-eye view image" or "tracking based on the sub-image". Upon determining that the tracking state information STATE indicates "tracking based on the bird's-eye view image", the control unit 101 advances the process to step S525. Upon determining that the tracking state information STATE indicates "tracking based on the sub-image", the control unit 101 returns the process to step S523.

As for the process of step S523, in the process of step S224 in FIG. 9B, the control unit 201 is replaced with the control unit 101, and the volatile memory 202 is replaced with the volatile memory 102.

In step S524, the control unit 101 executes the function of the tracking state decision unit 126 shown in FIG. 16, and changes the tracking state information STATE to "tracking based on the bird's-eye view image".

The processes of steps S525, S526*a*, and S527 are the same as the processes of steps S117, S118, and S119 in FIG. 9A.

As for the processes of steps S528 to S530, in the processes of steps S211 to S214 in FIG. 9B, the control unit 201 is replaced with the control unit 101, and the volatile memory 202 is replaced with the volatile memory 102.

In step S531, the control unit 101 executes the function of the tracking state decision unit 126 shown in FIG. 16, changes the tracking state information STATE to "tracking based on the sub-image", and ends the processing.

According to the above-described fourth embodiment, the WS 100 switches which one of the subject recognition result of the bird's-eye view image of the bird's-eye view camera 300 and the subject recognition result of the sub-image of the sub-camera 400 is to be used to control the sub-camera 400. This can obviate the necessity of the EB 200 in the first embodiment, simplify the system configuration, and obtain the same effect as in the first embodiment.

Fifth Embodiment

In the first to fourth embodiments, control is performed to make the feature information of the subject detected from the bird's-eye view image of the bird's-eye view camera 300 close to the feature information of the subject detected from the sub-image of the sub-camera 400 by performing trimming processing for the bird's-eye view image. In the fifth embodiment, an example in which zoom control is performed such that a part of the subject is not out of the image capture angle of view of a sub-camera 400 will be described.

Differences from the first to fourth embodiments will mainly be described below. The operation of a WS 100 will be described first.

Control processing according to the fifth embodiment will be described with reference to FIG. 19.

The processes of steps S110 to S117 and S119 to S122 in FIG. 19 are the same as the processes of steps S110 to S117 and S119 to S122 in FIG. 9A.

In step S150, a control unit 101 obtains the subject information of a tracking subject included in the bird's-eye view image, subject information included in the sub-image, and image capture information from the sub-camera 400, thereby deciding the zoom value of the sub-camera 400 and performing zoom control of the sub-camera 400.

A method of calculating the zoom value of the sub-camera 400 with which the tracking subject size in the bird's-eye view image matches the tracking subject size in the sub-image in zoom control of step S150 shown in FIG. 19 will be described here with reference to FIGS. 11A to 11D. In this embodiment, an example in which zoom control is performed based on the size in the vertical direction as the size of the tracking subject will be described.

In this embodiment, when the difference between the tracking subject size in the bird's-eye view image and the tracking subject size in the sub-image is large, the zoom value of the sub-camera 400 is controlled such that the tracking subject size in the bird's-eye view image and the tracking subject size in the sub-image are close to each other. Since this makes a subject tend not to fall out of sight, lowering of the similarity of feature information when the subject falls out of sight can be reduced.

In this embodiment, the zoom value of the sub-camera 400 with which the tracking subject size in the sub-image matches the tracking subject size in the bird's-eye view image is calculated. Then, the calculated zoom value and the current zoom value of the sub-camera 400 are compared. When the difference between the calculated zoom value and the current zoom value of the sub-camera 400 exceeds a threshold, the zoom value of the sub-camera 400 is controlled such that the tracking subject size in the sub-image is close to the tracking subject size in the bird's-eye view image. Note that "the tracking subject size in the sub-image is close to the tracking subject size in the bird's-eye view image" includes "the tracking subject size in the sub-image matches the tracking subject size in the bird's-eye view image". This can reduce the possibility that a subject that originally matches is erroneously determined as non-match.

In this embodiment, the zoom value of the sub-camera 400 is controlled such that the difference between size information hview of the tracking subject in a vertical visual field H of the bird's-eye view camera 300 and the size information hview of the subject in the vertical visual field H of the sub-camera 400, which are calculated by equation (5) described above, does not become too large.

When the difference between the current zoom value and the zoom value of the sub-camera 400 with which the size information hview of the tracking subject in the vertical visual field H of the bird's-eye view camera 300 matches the size information hview of the subject in the vertical visual field H of the sub-camera 400 exceeds a threshold, the zoom value of the sub-camera 400 is controlled such that the difference becomes equal to or less than the threshold. On the other hand, when the difference between the zoom value of the sub-camera 400 and the current zoom value is equal to or less than the threshold, control of the zoom value of the sub-camera 400 is not performed. Hence, the image capture angle of view of the sub-camera 400 can be controlled only when the difference between the feature information of the tracking subject detected from the bird's-eye view image and the feature information of the subject detected from the sub-image is large and affects determination of the similarity.

Zoom control processing of the sub-camera 400 in step S150 of FIG. 19 is the same as described with reference to FIG. 15.

By zoom control according to this embodiment, the image capture angle of view of the sub-camera 400 can be controlled such that the difference between the tracking subject size in the bird's-eye view image and the tracking subject size in the sub-image is not too large. Hence, even in a case where the plurality of cameras are arranged with separate image capture positions or image capture directions, and a part of the subject is out of the image capture angle of view, or even in a case where the subject is too small, a specific subject can be tracked by cooperation of the plurality of cameras.

Also, after the similarity of feature information of the subject is determined, or when the similarity of the feature information of the subject is high, the zoom value of the sub-camera 400 may be returned to the zoom value before the change. In this case, when changing the zoom value of the sub-camera 400 in step S138, the zoom value before the change is stored, and the zoom value before the change is transmitted to the sub-camera 400 before the process of step S122, thereby starting tracking using the zoom value before the change.

In this case, the control unit 101 obtains the current zoom value of the sub-camera 400 and stores it in the volatile memory 102 in step S135, reads out the zoom value stored in step S135 from the volatile memory 102 before the start of the process of step S122, and transmits it to the sub-camera 400. Hence, tracking can be started after the image capture angle of view that is changed to increase the similarity of the feature information of the subject is returned to the image capture angle of view before the change.

Also, when returning the zoom value that is changed to increase the similarity of the feature information of the subject to the zoom value before the change, the sub-camera 400 may notify the WS 100 or an EB 200 that control to set the zoom value before the change is completed. In this case, upon receiving a notification of completion of the zoom operation from a PTZ driving unit 409, a control unit 401 of the sub-camera 400 notifies the WS 100 or the EB 200, via a communication unit 405, that the zoom operation is completed. Thus, after completion of zoom control of the sub-camera 400, the image to be output to the WS 100 or the EB 200 can quickly be switched to the sub-image of the sub-camera 400. In addition, the image to be output from the WS 100 or the EB 200 to an external apparatus can quickly be switched to the sub-image of the sub-camera 400.

Instead of returning the zoom value to that before the change, the WS 100 or the EB 200 may store the zoom value before the change and create the sub-image of the zoom value before the change by trimming processing. In this case, the WS 100 or the EB 200 obtains the sub-image from the sub-camera 400, calculates an image region according to the image capture angle of view corresponding to the zoom value before the change, and performs trimming processing of the sub-image by an image processing unit 307 or 407. Thus, after completion of zoom control of the sub-camera 400, the image to be output to the WS 100 or the EB 200 can quickly be switched to the sub-image of the sub-camera 400. In addition, the image to be output from the WS 100 or the EB 200 to an external apparatus can quickly be switched to the sub-image of the sub-camera 400.

Note that the trimming processing may be executed by the sub-camera 400. In this case, the WS 100 or the EB 200 instructs the sub-camera 400 to perform trimming processing. Thus, after completion of zoom control of the sub-camera 400, the image to be output to the WS 100 or the EB 200 can quickly be switched to the sub-image of the sub-camera 400. In addition, the image to be output from the WS 100 or the EB 200 to an external apparatus can quickly be switched to the sub-image of the sub-camera 400.

According to the above-described fifth embodiment, the same subject can be recognized by the plurality of cameras 300 and 400 having different image capture positions or image capture directions. Hence, it is possible to track a specific subject while appropriately switching between control of the sub-camera 400 by the WS 100 and control of the sub-camera 400 by the EB 200.

When the tracking subject does not exist (disappears) in the sub-image of the sub-camera 400, control of the sub-camera 400 by the WS 100 is performed. When the tracking subject exists in the image capture angle of view of the sub-camera 400, control of the sub-camera 400 can be transferred from the WS 100 to the EB 200. Also, when the tracking subject moves at a high speed and is lost, or when changing the tracking subject, tracking can be continued by controlling the sub-camera 400 by the WS 100.

Note that in the fifth embodiment, an example in which whether to transmit the pan value/tilt value from the WS 100 or the EB 200 to the sub-camera 400 is switched has been described, but the present invention is not limited to this example. For example, regardless of the tracking state, the pan value/tilt value may be transmitted from the WS 100 and the EB 200 to the sub-camera 400, and from which device the sub-camera 400 receives the pan value/tilt value used to perform the pan operation/tilt operation may be controlled.

In this case, in the processing of the WS 100, the process of step S106 in FIG. 4A is omitted, and processing of transmitting tracking state information STATE from the control unit 101 to the sub-camera 400 is added before the process of step S107 in FIG. 4A. In the processing of the EB 200, the processes of steps S205 and S206 in FIG. 4B and the process of step S221 in FIG. 9C are omitted.

When the tracking state information STATE received from the WS 100 indicates "tracking by the EB 200", the sub-camera 400 performs control to perform the pan operation/tilt operation in accordance with the control command received from the EB 200. When the tracking state information STATE received from the WS 100 indicates "tracking by the WS 100", the sub-camera 400 performs control to perform the pan operation/tilt operation in accordance with the control command received from the WS 100.

Also, in this embodiment, an example in which control is performed to make the tracking subject size in the sub-image close to the tracking subject size in the bird's-eye view image has been described, but the present invention is not limited to this example. For example, when the bird's-eye view camera 300 includes an optical unit and a PTZ driving unit, the image capture angle of view of the bird's-eye view camera 300 may be controlled to make the tracking subject size in the sub-image and the tracking subject size in the bird's-eye view image close to each other.

Also, in this embodiment, an example in which control is performed to make the tracking subject size in the sub-image close to the tracking subject size in the bird's-eye view image has been described, but the present invention is not limited to this example. For example, when the bird's-eye view camera 300 includes an optical unit and a PTZ driving unit, the image capture angle of view of the bird's-eye view camera 300 may be controlled to make the tracking subject size in the bird's-eye view image close to the tracking subject size in the sub-image.

Also, in this embodiment, an example in which the height hview of the subject is calculated by the WS 100 performing inference processing of recognizing the subject based on the bird's-eye view image of the bird's-eye view camera 300 or the sub-image of the sub-camera 400 has been described, but the present invention is not limited to this example. For example, the bird's-eye view camera 300 or the sub-camera 400 may perform inference processing for recognizing the subject, and the WS 100 may obtain the subject detection result by the inference processing from the bird's-eye view camera 300 or the sub-camera 400 via the communication unit 105 and calculate the height hview of the subject.

Also, in this embodiment, an example in which a threshold is provided for the difference between the current zoom value and the zoom value of the sub-camera 400 with which the tracking subject size in the bird's-eye view image and the tracking subject size in the sub-image match has been described, but the present invention is not limited to this. Any other form is possible if control can be performed to make the difference of the height hview of the tracking subject in the vertical visual field between the bird's-eye view camera 300 and the sub-camera 400 small. For example, a threshold may be provided for the difference between the tracking subject size information hview in the bird's-eye view image and the size information hview of the subject in the sub-camera 400, and the zoom value of the sub-camera 400 may be controlled when the difference of the size information hview of the subject exceeds the threshold.

Also, in this embodiment, the zoom value of the sub-camera 400 is controlled using the size in the vertical direction as the tracking subject size in each of the bird's-eye view camera 300 and the sub-image. However, the zoom value may be controlled using the size in the horizontal direction.

Sixth Embodiment

In the fifth embodiment, an example in which the sub-camera 400 is controlled by one of the WS 100 and the EB 200 has been described. In the sixth embodiment, an example in which the EB 200 is omitted, and a WS 100 controls a sub-camera 400 based on the bird's-eye view image of a bird's-eye view camera 300 and the sub-image of the sub-camera 400, like the fourth embodiment, will be described.

Control processing of the WS 100 will be described next with reference to FIG. 20.

FIG. 20 shows control processing of the WS 100, and shows the detailed process of step S507 shown in FIG. 17.

The process of step S520 is the same as the process of step S110 in FIG. 19.

In step S521, a control unit 101 executes the function of a tracking state decision unit 126 shown in FIG. 16, and changes tracking state information STATE to "tracking based on the image of the bird's-eye view camera".

The tracking state decision unit 126 has a function of updating the tracking state information STATE stored in a volatile memory 102.

In step S522, the control unit 101 reads out the tracking state information STATE from the volatile memory 102, and determines, based on the tracking state information STATE, whether it indicates "tracking based on the bird's-eye view image" or "tracking based on the sub-image". Upon determining that the tracking state information STATE indicates "tracking based on the bird's-eye view image", the control unit 101 advances the process to step S525. Upon determining that the tracking state information STATE indicates "tracking based on the sub-image", the control unit 101 returns the process to step S523.

As for the process of step S523, in the process of step S224 in FIG. 9B, the control unit 201 is replaced with the control unit 101, and the volatile memory 202 is replaced with the volatile memory 102.

In step S524, the control unit 101 executes the function of the tracking state decision unit 126 shown in FIG. 16, and changes the tracking state information STATE to "tracking based on the bird's-eye view image".

The processes of steps S525, **S526*b*, and S527 are the same as the processes of steps S117, S150, and S119 in FIG. 19**.

As for the processes of steps S528 to S530, in the processes of steps S211 to S214 in FIG. 9B, the control unit 201 is replaced with the control unit 101, and the volatile memory 202 is replaced with the volatile memory 102.

In step S531, the control unit 101 executes the function of the tracking state decision unit 126 shown in FIG. 16, changes the tracking state information STATE to "tracking based on the sub-image", and ends the processing.

According to the above-described sixth embodiment, the WS 100 switches which one of the subject recognition result of the bird's-eye view image of the bird's-eye view camera 300 and the subject recognition result of the sub-image of the sub-camera 400 is to be used to control the sub-camera 400. This can obviate the necessity of the EB 200 in the fifth embodiment, simplify the system configuration, and obtain the same effect as in the fifth embodiment.

Seventh Embodiment

In the first to sixth embodiments, an example of a system including the bird's-eye view camera 300 and the sub-camera 400 has been described.

In the seventh embodiment, an example of a system including a main camera 500 in addition to a bird's-eye view camera 300 and a sub-camera 400 will be described.

Figures 21, 22:
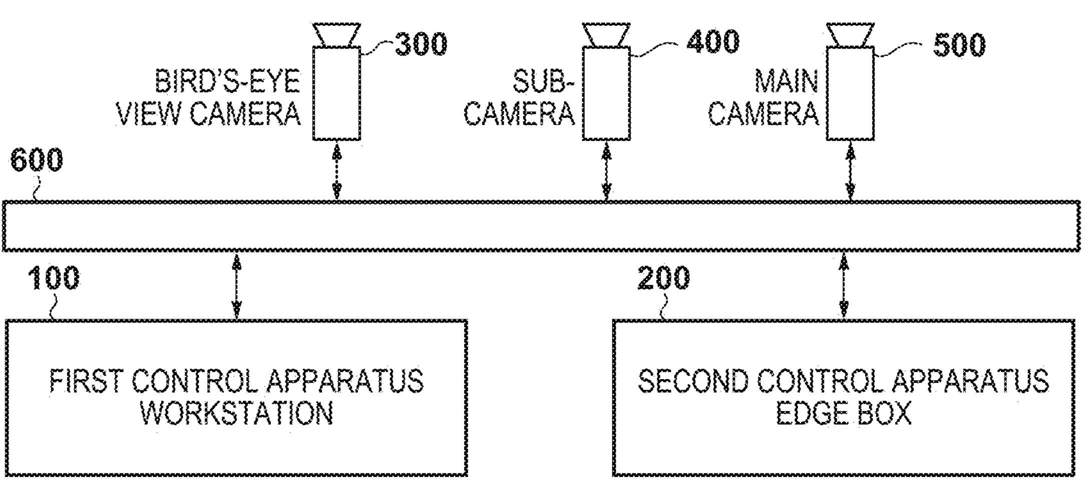
FIG. 21 is a view exemplifying a system configuration according to the seventh embodiment.
FIG. 22 is a view exemplifying roles and contents that can be set in an image capture apparatus according to the seventh embodiment.

FIG. 21 is a view showing a system configuration according to the seventh embodiment.

The seventh embodiment is different from the first to sixth embodiments in that the system includes the main camera 500, and the tracking subject of the sub-camera 400 is decided based on a main image captured by the main camera 500. Differences from the first to sixth embodiments will mainly be described below.

In the seventh embodiment, the main camera 500 has a PTZ function. A subject of interest decision unit 122 of the WS 100 decides (estimates) the subject of interest of the main camera 500 from the image capture range of the main camera 500, and decides the tracking subject of the sub-camera 400 based on the subject of interest of the main camera 500. The tracking subject of the sub-camera 400 may be the same as the subject of interest of the main camera 500 or may be another subject.

An example in which the tracking subject of the sub-camera 400 is decided based on a role set in the sub-camera 400 will be described next.

The role of the sub-camera 400 indicates the control contents of the subject of interest of the main camera 500, the tracking subject of the sub-camera 400 associated with a zoom operation, and the zoom operation. The role of the sub-camera 400 can be set by a user via an operation unit provided on a WS 100 or an EB 200.

Also, when a plurality of sub-cameras are installed, one of the plurality of sub-cameras can be set to the main camera. The user may be allowed to set the main camera via the operation unit provided on the WS 100 or the EB 200. The role of the sub-camera 400 and the main camera setting method are not limited to the above-described methods, and any methods can be used.

FIG. 22 exemplarily shows roles and contents that can be set in the sub-camera 400.

When the role is "main follow", the role (CAMERA_ROLE) of the sub-camera 400 is to track the same subject as the subject focused by the main camera 500 and perform zoom control in the same phase as the zoom operation of the main camera 500. Based on this role (CAMERA_ROLE), the zoom control value of the sub-camera 400 is calculated. Here, the same phase in the zoom operation means that the zoom operation of the main camera 500 and that of the sub-camera 400 are controlled in the same direction. For example, when the zoom control value of the main camera 500 is changed from the wide angle side to the telephoto side, the zoom of the sub-camera 400 is also changed from the wide angle side to the telephoto side.

When the role is "main counter", the role (CAMERA_ROLE) of the sub-camera 400 is to track the same subject as the subject focused by the main camera 500 and perform zoom control in the phase opposite to the zoom operation of the main camera 500. Based on this role (CAMERA_ROLE), the PTZ value of the sub-camera 400 is calculated. Here, the opposite phase in the zoom operation means that the zoom operation of the main camera 500 and that of the sub-camera 400 are controlled in opposite directions. For example, when the zoom control value of the main camera 500 is changed from the wide angle side to the telephoto side, the zoom of the sub-camera 400 is changed from the telephoto side to the wide angle side.

When the role is "assist follow", the sub-camera 400 tracks a subject different from the subject focused by the main camera 500 and performs zoom control in the same phase as the zoom operation of the main camera 500. Based on this role (CAMERA_ROLE), the zoom control value of the sub-camera 400 is calculated.

When the role is "assist counter", the sub-camera 400 tracks a subject different from the subject focused by the main camera 500 and performs zoom control in the phase opposite to the zoom operation of the main camera 500. Based on this role (CAMERA_ROLE), the zoom control value of the sub-camera 400 is calculated. In the example shown in FIG. 22, "different from the main (left side)" is exemplified as the control contents of the tracking subject in "assist follow" and "assist counter". However, there may be "assist follow" and "assist counter" in which the tracking subject is controlled to "different from the main (right side)".

Also, in a case where the tracking subject is controlled to "different from the main", there may be a role for controlling the subject to positions (upper/lower and front/rear sides) other than the left and right sides.

When a plurality of sub-cameras exist, a role may be set for each sub-camera.

In the seventh embodiment, an example in which the control contents of the tracking subject and zoom are set as the role has been described. However, the control contents of only the tracking subject may be set as a role, or another item may be added.

Also, in the seventh embodiment, an example in which the tracking subject of the sub-camera 400 is set based on the main image of the main camera 500, and the seventh embodiment is combined with the first to fifth embodiments has been described. However, the seventh embodiment may be combined with the sixth embodiment.

Eighth Embodiment

In the eighth embodiment, an example in which a dummy region is added to a sub-image such that a subject region corresponding to a bird's-eye view image is obtained, thereby making the feature information of the subject in the sub-image close to the feature information of the subject in the bird's-eye view image will be described. In this embodiment, the dummy region is called a "letter", and connecting the dummy region to the subject region is called "add a letter". Note that in the eighth embodiment, an image that is wholly black will be exemplified as the dummy region, but the present invention is not limited to this.

Control processing according to the eighth embodiment will be described with reference to FIGS. 23A, 23B, and 24.

The processes of steps S110 to S122 in FIG. 23A except steps S140 to S142 are the same as the processes of steps S110 to S122 in FIG. 9A.

Letter addition processing of a sub-camera in step S140 of FIG. 23A will be described first with reference to FIG. 24.

In step S143, a control unit 101 reads out subject information from a volatile memory 102, like step S123, and advances the process to step S144.

In step S144, the control unit 101 obtains image capture information from a bird's-eye view camera 300 and a sub-camera 400 via a communication unit 105, and advances the process to step S145. In the eighth embodiment, as the information obtained from the sub-camera 400, the information of a subject region in which a subject is detected by a control unit 201 performing image recognition processing using an inference model for subject detection is included.

In step S145, the control unit 101 calculates a letter size based on the ratio of the subject region included in the bird's-eye view image to the subject region included in the sub-image within the image capture angle of view.

Processing of calculating the letter size will be described here with reference to FIGS. 25A to 25E.

FIG. 25A exemplarily shows the subject region in the bird's-eye view image, and its size is w0 in the horizontal direction×h0 in the vertical direction. FIGS. 25B and 25C exemplarily show the subject regions in the sub-image, and the sizes are wc1 in the horizontal direction×hc1 in the vertical direction and wc2 in the horizontal direction×hc2 in the vertical direction. In the eighth embodiment, since the face of the subject is captured, a letter needs to be added in the downward direction. A letter may be added in a direction according to a predetermined part of the subject and, for example, when the foot is captured, a letter needs to be added in the upward direction. In addition, the direction of adding the letter may be decided in accordance with the position of the subject region. As shown in FIG. 25C, when the subject region is contact with the lower side of the sub-image, the letter is added in the downward direction, and when the subject region is contact with the right side of the sub-image, the letter is added in the rightward direction. Sizes hr and wr of the letter to be added can be calculated by equations (10) below. In step S145, the control unit 101 stores the letter size calculation result in the volatile memory 102, and advances the process to step S141 of FIG. 23A.

$$h_r = \frac{h_0}{w_0} w_{c1} - h_{c1} \quad \text{if vertical direction} \tag{10}$$
$$w_r = \frac{w_0}{h_0} w_{c2} - w_{c2} \quad \text{if horizontal direction}$$

Also, a degree r of matching may be calculated using equation (8) described above, and the letter size may be calculated by $$h_r = h_0(1 - r) \quad \text{if horizontal direction} \tag{11}$$

In step S141, the control unit 101 executes the function of a feature information decision unit 125 shown in FIG. 3, like step S119 in FIG. 9A, and advances the process to step S142.

In step S142, the control unit 101 transmits a tracking start command and feature information STAT[i] of the tracking subject to an EB 200 via the communication unit 105, and advances the process to step S121. Here, the control unit 101 reads out the letter size calculated in step S145 from the volatile memory 102. When the letter size is a positive number, the control unit 101 transmits the letter size to the EB 200 via the communication unit 105. When the letter size is equal to or less than 0, the letter is not transmitted because it is unnecessary.

Control of the EB 200 will be described next with reference to FIG. 23B.

In the eighth embodiment, the difference is that the letter size is received and processed in the processing shown in FIG. 23B.

In step S230, a control unit 201 determines whether the tracking start command, the feature information STAT[i] of the tracking subject obtained from the bird's-eye view image of the bird's-eye view camera 300, and the letter size are received from a WS 100 via a communication unit 205. When the tracking start command and the feature information STAT[i] of the tracking subject are received from the WS 100, the control unit 201 advances the process to step S231. When these are not received, the control unit 201 ends the processing. When the letter size is received, the control unit 201 stores it in a volatile memory 202. When the letter size is not received, the control unit 201 advances the process to step S231 without performing anything.

In step S231, the control unit 201 determines, by readout from the volatile memory 202, whether the letter size is received in step S230. When the letter size is received, the control unit 201 advances the process to step S232. When the letter size is not received, the control unit 201 advances the process to step S233.

In step S232, the control unit 201 executes the function of an image recognition unit 221, and executes letter addition processing described with reference to FIG. 24 for the subject region in the sub-image, unlike step S202 in FIG. 4B. The control unit 201 determines the direction in which the subject region in the sub-image contacts the sub-image. The control unit 201 calculates feature information STAT_SUB[m] in the subject region to which the letter is added in the determined direction based on the information of the letter size received from the WS 100. The control unit 201 overwrites the newly calculated feature information STAT_SUB[m] in the volatile memory 202, and advances the process to step S233.

In steps S233 to S237, the control unit 201 performs the same processes as in step S211 to S214 in FIG. 9B. The control unit 201 executes the function of a tracking target decision unit 222 shown in FIG. 3, and determines whether the feature information STAT[i] received from the WS 100 and the feature information STAT_SUB[m] obtained from the sub-image of the sub-camera 400 satisfy predetermined conditions.

According to the above-described eighth embodiment, feature information is calculated from the subject region to which a letter is added based on the image capture information of the sub-camera 400, thereby obtaining the same effect as in the first to fifth embodiments.

Ninth Embodiment

In the first to eighth embodiments, as described with reference to FIGS. 11A to 11D, the height hview of the subject is calculated from the height hcam of the bird's-eye view camera 300 and the sub-camera 400, the vertical angle ϕ of view, the vertical visual field H, the distance L to the tracking subject, and the height hobj of the whole subject. In the ninth embodiment, an example in which skeleton information of a subject is calculated, instead of calculating the height hview of the subject, will be described.

FIGS. 26A to 26F exemplarily show skeleton information of a subject.

FIG. 26A exemplarily shows a subject in a bird's-eye view image. FIG. 26B exemplarily shows a result of executing skeleton estimation processing for the subject shown in FIG. 26A. Skeleton estimation processing is added as a function of an image recognition unit 121. A control unit 101 inputs, by an inference unit 104, an image read out from a volatile memory 102 to a learned model for skeleton estimation created by performing machine learning such as deep learning and performs inference processing. As exemplarily shown in FIG. 26C, the inference result is a score indicating the coordinates of each part of a body in the image and a likelihood thereof. In a case of nose, the coordinates are oxnose and oynose, and the score is osnose. The same function is provided in an EB 200 as well.

Similarly, FIG. 26D exemplarily shows a subject in a sub-image. FIG. 26E exemplarily shows a result of executing skeleton estimation processing for the subject shown in FIG. 26D. Since the subject shown in FIG. 26D has its lower half outside the angle of view, as the coordinates and score information shown in FIG. 26F, information up to the waist is obtained.

In the first to eighth embodiments, the height hview of the subject is calculated. In the ninth embodiment, the pieces of skeleton information exemplified in FIGS. 26C and 26F are calculated. That is, the height hview of the subject in FIG. 11D can be replaced with the difference of the coordinates of each part of the skeleton information in FIGS. 26A to 26F.

As an example, in FIG. 26C, assume that, among the y-coordinates, the difference between the y-coordinate oynose of the nose and a y-coordinate oyLancle of the left ankle is largest. In the image shown in FIG. 26E including only a portion to the waist, assume that among the y-coordinates, the difference between a y-coordinate cynose of the nose and a y-coordinate cyLwaist of the left waist is largest. In this case, the degree r of matching obtained by equation (8) can be calculated from $$r = \frac{oy_{Lwaist} - oy_{nose}}{oy_{Lankle} - oy_{nose}} \tag{12}$$

Figure 27A:
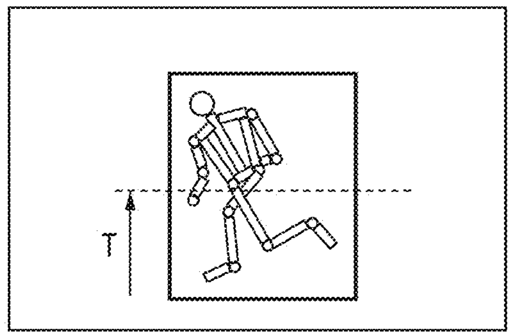
FIGS. 27A to 27C are views exemplifying processing using skeleton estimation processing according to the ninth embodiment.
Figure 27B:
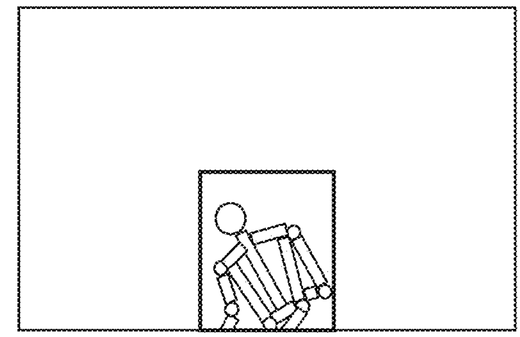

A trimming amount T obtained from equations (12) and (9) is exemplified in FIG. 27A. When trimming is performed for the bird's-eye view image shown in FIG. 27A using the skeleton information shown in FIGS. 26C and 26F, an image that captures the same range as the sub-image shown in FIG. 27B is obtained.

Figure 27C:
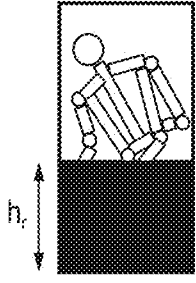

Also, similarly as for the letter size calculated in the eighth embodiment, the letter size hr shown in FIG. 27C can be calculated by equation (11) described above.

In the ninth embodiment, the coordinate information of each part is replaced in accordance with the change of the posture of the subject, thereby calculating the trimming amount. However, considering a case where skeleton estimation fails, it is preferable to perform trimming amount calculation according to the first to fourth embodiments and confirm consistency with the trimming amount calculated in the eighth and ninth embodiments. The inference model used in this embodiment is skeleton estimation for a person. For an animal or an object, the model may be replaced with a model corresponding to that, and the same processing may be performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2023-145577, filed Sep. 7, 2023, 2023-145578, filed Sep. 7, 2023 and 2024-079718, filed May 15, 2024 which are hereby incorporated by reference herein in their entireties.

What is claimed is:

1. A system which includes a first image capture apparatus and a second image capture apparatus, which have different image capture directions, and a first control apparatus and a second control apparatus, which control the second image capture apparatus such that a predetermined subject is tracked based on one of a first image captured by the first image capture apparatus and a second image captured by the second image capture apparatus, wherein the first control apparatus comprises:

a first decision unit that decides the predetermined subject from subjects included in the first image;

a first generation unit that generates first feature information of a first region of the predetermined subject; and a first control unit that controls the second image capture apparatus to track the predetermined subject, and the second control apparatus comprises:
a second generation unit that generates second feature information of a subject included in the second image;
a second decision unit that decides the predetermined subject based on the first feature information and the second feature information obtained from the first control apparatus; and
a second control unit that controls the second image capture apparatus to track the predetermined subject.

2. The system according to claim 1, wherein
the first feature information and the second feature information are information capable of specifying the same subject when the same subject is captured by a plurality of image capture apparatuses having different image capture directions.

3. The system according to claim 1, wherein
the first control apparatus switches between a first state in which the first control apparatus controls the second image capture apparatus such that the predetermined subject is tracked based on the first feature information and a second state in which the second control apparatus controls the second image capture apparatus such that the predetermined subject is tracked based on the second feature information.

4. The system according to claim 3, wherein
when the first feature information and the second feature information satisfy a predetermined condition, the first control unit switches to the second state, and
when the first feature information and the second feature information do not satisfy the predetermined condition, the first control unit switches to the first state.

5. The system according to claim 4, wherein
the predetermined condition is a case where a similarity between the first feature information and the second feature information is not less than a threshold, and
the second control unit determines the similarity between the first feature information and the second feature information and notifies the first control apparatus of a result of the determination.

6. The system according to claim 3, wherein
when the predetermined subject is changed, the first control unit switches from the second state to the first state.

7. The system according to claim 3, wherein
when the predetermined subject exists in an image capture range of the second image capture apparatus, the second control unit controls the second image capture apparatus to track the predetermined subject,
when the predetermined subject disappears in the image capture range of the second image capture apparatus any more, the first control apparatus is notified that tracking of the predetermined subject cannot be continued, and
the first control unit switches from the second state to the first state upon receiving the notification.

8. The system according to claim 3, wherein
when the predetermined subject exists in an image capture angle of view of the second image capture apparatus, the second control unit controls the second image capture apparatus to track the predetermined subject,
when the predetermined subject disappears in the image capture angle of view of the second image capture apparatus any more, the first control apparatus is notified that tracking of the predetermined subject cannot be continued, and
the first control unit switches from the second state to the first state upon receiving the notification.

9. The system according to claim 1, wherein
the first generation unit generates the first feature information by receiving the first image as an input and performing inference processing using a learned model, and
the second generation unit generates the second feature information by receiving the second image as an input and performing inference processing using the learned model.

10. The system according to claim 9, wherein
the learned model includes a first model for subject detection and a second model for subject specifying,
the first generation unit generates first information indicating a position of the subject included in the first image by receiving the first image as an input and performing inference processing using the first model, and
generates feature information of the subject included in the first image by receiving the first image and the first information as an input and performing inference processing using the second model, and
the second generation unit generates second information indicating a position of the subject included in the second image by receiving the second image as an input and performing inference processing using the first model, and
generates feature information of the subject included in the second image by receiving the second image and the second information as an input and performing inference processing using the second model.

11. The system according to claim 10, wherein
the second inference model for subject specifying is a learned model that has learned using, as learning data, images obtained by capturing a plurality of subjects from a plurality of different image capture directions such that the similarity of feature information becomes high for images of the same subject.

12. The system according to claim 1, wherein
the first control apparatus further comprises an image processing unit that cuts out a first region of the predetermined subject included in the first image based on an image capture range of the second image obtained from the second image capture apparatus.

13. The system according to claim 12, wherein
the image processing unit decides a cutout amount to cut out the first region based on first size information indicating a size of the entire predetermined subject and second size information indicating a size of the subject in the image capture range of the second image capture apparatus.

14. The system according to claim 13, wherein
the image processing unit obtains the second size information based on the first size information and position information and the image capture range of the second image capture apparatus.

15. The system according to claim 14, wherein
the first size information is a height of the subject from a reference position, the second size information is a height of the subject in the image capture range of the second image capture apparatus, and the image capture range is a vertical angle of view of the second image capture apparatus.

16. The system according to claim 13, wherein
the image processing unit decides the cutout amount based on a table that associates a ratio of the second size information to the first size information with the cutout amount.

17. The system according to claim 13, wherein the cutout amount is calculated from a ratio of the second size information to the first size information.

18. The system according to claim 12, wherein the image processing unit sets a plurality of cutout amounts, generates a plurality of pieces of first feature information of a plurality of first regions cut out in accordance with the plurality of cutout amounts, and transmits the plurality of pieces of first feature information to the second control apparatus, and the second control apparatus compares the plurality of pieces of first feature information received from the first control apparatus with the second feature information.

* * * * *